United States Patent
Lerner et al.

(10) Patent No.: US 11,562,729 B2
(45) Date of Patent: Jan. 24, 2023

(54) DEVICES, METHODS, AND USER INTERFACES FOR ADAPTIVELY PROVIDING AUDIO OUTPUTS

(71) Applicant: Apple Inc., Cupertino, CA (US)

(72) Inventors: Mitchell R. Lerner, San Francisco, CA (US); Pedro Mari, Santa Cruz, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/355,047

(22) Filed: Jun. 22, 2021

(65) Prior Publication Data
US 2021/0319778 A1  Oct. 14, 2021

Related U.S. Application Data

(63) Continuation of application No. 16/862,376, filed on Apr. 29, 2020, now Pat. No. 11,100,909.

(60) Provisional application No. 62/843,891, filed on May 6, 2019.

(51) Int. Cl.
G10K 11/178  (2006.01)

(52) U.S. Cl.
CPC .. *G10K 11/17827* (2018.01); *G10K 11/17873* (2018.01); *G10K 11/17885* (2018.01); *G10K 2210/1081* (2013.01); *G10K 2210/3056* (2013.01)

(58) Field of Classification Search
None
See application file for complete search history.

(56) References Cited

U.S. PATENT DOCUMENTS

| | | |
|---|---|---|
| 2013/0022218 A1 | 1/2013 | Miyazawa et al. |
| 2017/0330548 A1 | 11/2017 | Singaraju |
| 2018/0279086 A1 | 9/2018 | Bradley et al. |
| 2019/0030277 A1* | 1/2019 | Espi Maques ........ A61M 21/02 |
| 2019/0052987 A1 | 2/2019 | Lyren et al. |
| 2020/0357374 A1 | 11/2020 | Verweij et al. |
| 2020/0366986 A1 | 11/2020 | Ono |

(Continued)

OTHER PUBLICATIONS

Office Action, dated Dec. 9, 2020, received in U.S. Appl. No. 16/862,376 (7606), 9 pages.

(Continued)

*Primary Examiner* — Kenny H Truong
(74) *Attorney, Agent, or Firm* — Morgan, Lewis & Bockius LLP

(57) ABSTRACT

An electronic device includes one or more pose sensors for detecting a pose of a user of the electronic device relative to a first physical environment and is in communication with one or more audio output devices. While a first pose of the user meets first presentation criteria, the electronic device provides audio content at a first simulated spatial location relative to the user. The electronic device detects a change in the pose of the user from the first pose to a second pose. In response to detecting the change in the pose of the user, and in accordance with a determination that the second pose of the user does not meet the first presentation criteria, the electronic device provides audio content at a second simulated spatial location relative to the user that is different from the first simulated spatial location.

33 Claims, 34 Drawing Sheets

(56) References Cited

U.S. PATENT DOCUMENTS

2021/0044915 A1* 2/2021 Roach ................... H04S 7/303
2021/0084357 A1* 3/2021 Tajik ................ H04N 21/42203

OTHER PUBLICATIONS

Notice of Allowance, dated Apr. 23, 2021, received in U.S. Appl. No. 16/862,376 (7606), 9 pages.
Invitation to Pay Additional Fees, dated Aug. 12, 2020, received in International Patent Application No. PCT/US2020/031414 (7606WO), which corresponds with U.S. Appl. No. 16/862,376, 24 pages.
International Search Report and Written Opinion, dated Oct. 9, 2020, received in International Patent Application No. PCT/US2020/031414 (7606WO), which corresponds with U.S. Appl. No. 16/862,376, 28 pages.

* cited by examiner

720 Detect, via one or more microphones, sound in the physical environment, wherein providing the audio content at the second simulated spatial location includes reducing an output level of the audio content relative to the detected sound from the physical environment

722 Determine an event associated with the change in the pose of the user from the first pose to the second pose;
    in response to detecting the change in the pose of the user, and in accordance with the determination that the second pose of the user does not meet the first presentation criteria:
        perform an operation to assist the user to respond to the event

724 While the first pose of the user meets the first presentation criteria:
    display, via a display generation component, video content corresponding to the audio content; and
    in response to detecting the change in the pose of the user, and in accordance with a determination that the second pose of the user does not meet the first presentation criteria:
        cease to display at least a portion of the video content

726 While the first pose of the user meets the first presentation criteria:
    display, via a display generation component, a simulated three-dimensional environment that includes one or more virtual objects; and
    in response to detecting the change in the pose of the user, and in accordance with a determination that the second pose of the user does not meet the first presentation criteria:
        cease to display at least a portion of one or more virtual objects in the simulated three-dimensional environment

728 In response to detecting the change in the pose of the user, and in accordance with the determination that the second pose of the user does not meet the first presentation criteria:
    display, via the display generation component, a representation of at least a portion of the first physical environment

730 In response to detecting the change in the pose of the user, and in accordance with the determination that the second pose of the user does not meet the first presentation criteria:
    change respective positions of one or more virtual objects in the simulated three-dimensional environment

Figure 7B

812 While the one or more audio properties of the respective physical environment satisfy the first audio criteria, the audio output further includes audio configured to cancel at least a portion of ambient sound from the respective physical environment at a first audio-cancelling audio level; and
    in response to detecting the change in the one or more audio properties of the respective physical environment, provide audio configured to cancel at least a portion of ambient sound from the respective physical environment at a second audio-cancelling audio level that is different from the first audio-cancelling audio level 814 Detecting the change in the one or more audio properties of the respective physical environment includes detecting an increase in speech in the physical environment; and
    in response to detecting the change in the one or more audio properties of the respective physical environment, the second audio-cancelling audio level is zero 816 The audio configured to cancel at least a portion of ambient sound from the respective physical environment is based on an amount by which ambient sound from the respective physical environment is reduced by the one or more wearable audio output devices when worn by a user 818 While providing audio corresponding to audio content from the electronic device, audio corresponding to ambient sound from the respective physical environment is provided at an ambient-sound audio level that is lower than an ambient-sound audio level at which audio corresponding to ambient sound from the respective physical environment is provided while not providing audio corresponding to audio content from the electronic device 820 Prior to detecting a second change in the one or more audio properties of the respective physical environment, detect a user input via the one or more wearable audio output devices;
    detect the second change in the one or more audio properties of the respective physical environment;
    in accordance with a determination that the second change in the one or more audio properties of the respective physical environment is detected after a predefined time period since detecting the user input, change a respective audio level of respective audio; and
    in accordance with a determination that the second change in the one or more audio properties of the respective physical environment is detected within the predefined time period since detecting the user input, forgo changing the respective audio level of the respective audio

Figure 8B

DEVICES, METHODS, AND USER INTERFACES FOR ADAPTIVELY PROVIDING AUDIO OUTPUTS

RELATED APPLICATION

This application is a continuation of U.S. application Ser. No. 16/862,376, filed Apr. 29, 2020, which claims priority to U.S. Provisional Application Ser. No. 62/843,891, filed May 6, 2019, both of which are incorporated by reference herein in their entireties.

TECHNICAL FIELD

This relates generally to electronic devices with audio output devices such as wearable audio output devices, including but not limited to electronic devices that provide audio outputs adaptively based on changes in context of the audio output devices.

BACKGROUND

Audio output devices, including wearable audio output devices such as headphones and earphones, are widely used to provide audio outputs to a user. But conventional methods of providing audio outputs are cumbersome, inefficient, and limited. In some cases, conventional methods provide audio outputs in a manner that hinders a user's ability to interact with his surrounding physical environment. In some cases, audio outputs are provided in a static manner irrespective of a user's position, orientation, or movement. In some cases, audio outputs are provided in a static manner irrespective of changes in ambient audio, thereby interfering with a user's ability to understand when spoken to, particularly when wearing headphones or earphones. In addition, conventional methods take longer and require more user interaction than necessary to adjust audio outputs for such context changes, thereby wasting energy. This latter consideration is particularly important in battery-operated devices.

SUMMARY

According, there is a need for electronic devices with improved methods and interfaces for providing audio outputs adaptively based on changes in context of the audio output devices. Such methods and interfaces optionally complement or replace conventional methods of providing audio outputs. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with providing audio outputs are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has (and/or is in communication with) one or more audio output devices (e.g., wearable audio output devices, such as in-ear earphones, earbuds, over-ear headphones, etc.). In some embodiments, the device has (and/or is in communication with) a touchpad. In some embodiments, the device has (and/or is in communication with) a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music/audio playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device including one or more pose sensors for detecting a pose of a user of the electronic device relative to a first physical environment. The electronic device is in communication with one or more audio output devices. The method includes, while a first pose of the user meets first presentation criteria: providing audio content at a first simulated spatial location relative to the user. The method includes detecting a change in the pose of the user from the first pose to a second pose; and, in response to detecting the change in the pose of the user, and in accordance with a determination that the second pose of the user does not meet the first presentation criteria: providing audio content at a second simulated spatial location relative to the user that is different from the first simulated spatial location.

In accordance with some embodiments, a method is performed at one or more wearable audio output devices that are in a respective physical environment and that are in communication with an electronic device. The method includes, while one or more audio properties of the respective physical environment satisfy first audio criteria, providing audio output corresponding to the first audio criteria. The audio output includes: audio corresponding to audio content from the electronic device at a first device-content audio level; and audio corresponding to ambient sound from the respective physical environment at a first ambient-sound audio level. The method includes detecting a change in the one or more audio properties of the respective physical environment; and, in response to detecting the change in the one or more audio properties of the respective physical environment, providing audio corresponding to ambient sound from the respective physical environment at a second ambient-sound audio level that is different from the first ambient-sound audio level.

In accordance with some embodiments, an electronic device includes or is in communication with one or more audio output devices, optionally one or more pose sensors (e.g., to detect pose of the electronic device, of the audio output devices, or of a user of the electronic device relative to a first physical environment), optionally one or more audio input devices, optionally a display, optionally a touch-sensitive surface or other input device, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions that, when executed by an electronic device as described herein, cause the device to perform or cause performance of the operations of any of the methods described herein. In accordance with some embodiments, a graphical user interface on an electronic device as described herein includes one or more of the elements displayed in any of the methods described herein, which are updated in response to inputs, as described in any of the methods described herein. In accordance with some embodiments, an electronic device as described herein includes means for performing or causing performance of the operations of any of the methods described herein. In accordance with some embodiments, an information processing apparatus, for use in an electronic device as described herein, includes means for performing or causing performance of the operations of any of the methods described herein.

Thus, electronic devices that include or are in communication with one or more audio output devices, optionally one or more pose sensors (e.g., to detect pose of the electronic device, of the audio output devices, or of a user of the electronic device relative to a first physical environment), optionally one or more audio input devices, optionally a display, and optionally a touch-sensitive surface or other input device, are provided with improved methods and interfaces for adaptively providing audio outputs, thereby increasing the effectiveness, efficiency, and user satisfaction with such devices. Such methods and interfaces may complement or replace conventional methods for providing audio outputs.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7B are flow diagrams of a process for adaptively changing simulated spatial locations of audio outputs in response to changes in user pose in accordance with some embodiments.

FIGS. 8A-8B are flow diagrams of a process for adaptively changing audio output levels in response to changes in the audio properties of a surrounding physical environment in accordance with some embodiments.

DESCRIPTION OF EMBODIMENTS

As noted above, audio output devices such as wearable audio output devices are widely used to provide audio outputs to a user. Many audio output devices provide audio outputs in a static manner that does not adapt to changes in a user's pose or changes in the audio properties of the surrounding physical environment. The methods, devices, and user interfaces/interactions described herein improve how audio outputs are provided in multiple ways. For example, embodiments disclosed herein describe ways to provide audio outputs adaptively based on changes in context of the audio output devices, such as changes in the user's pose or changes in the audio properties of the surrounding physical environment, so that the user can better interact with his surrounding physical environment.

Figure 7A:
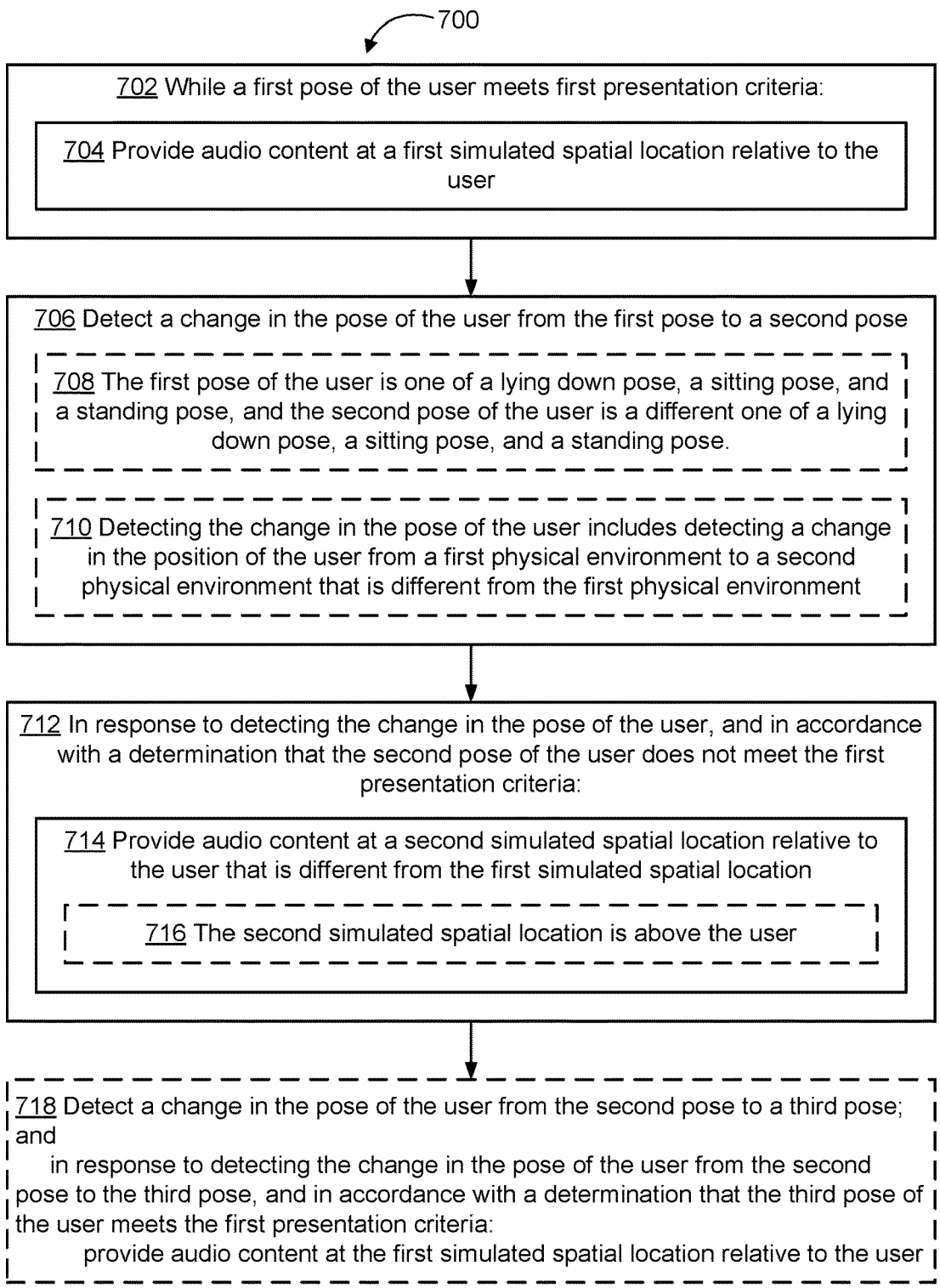
Figure 8A:
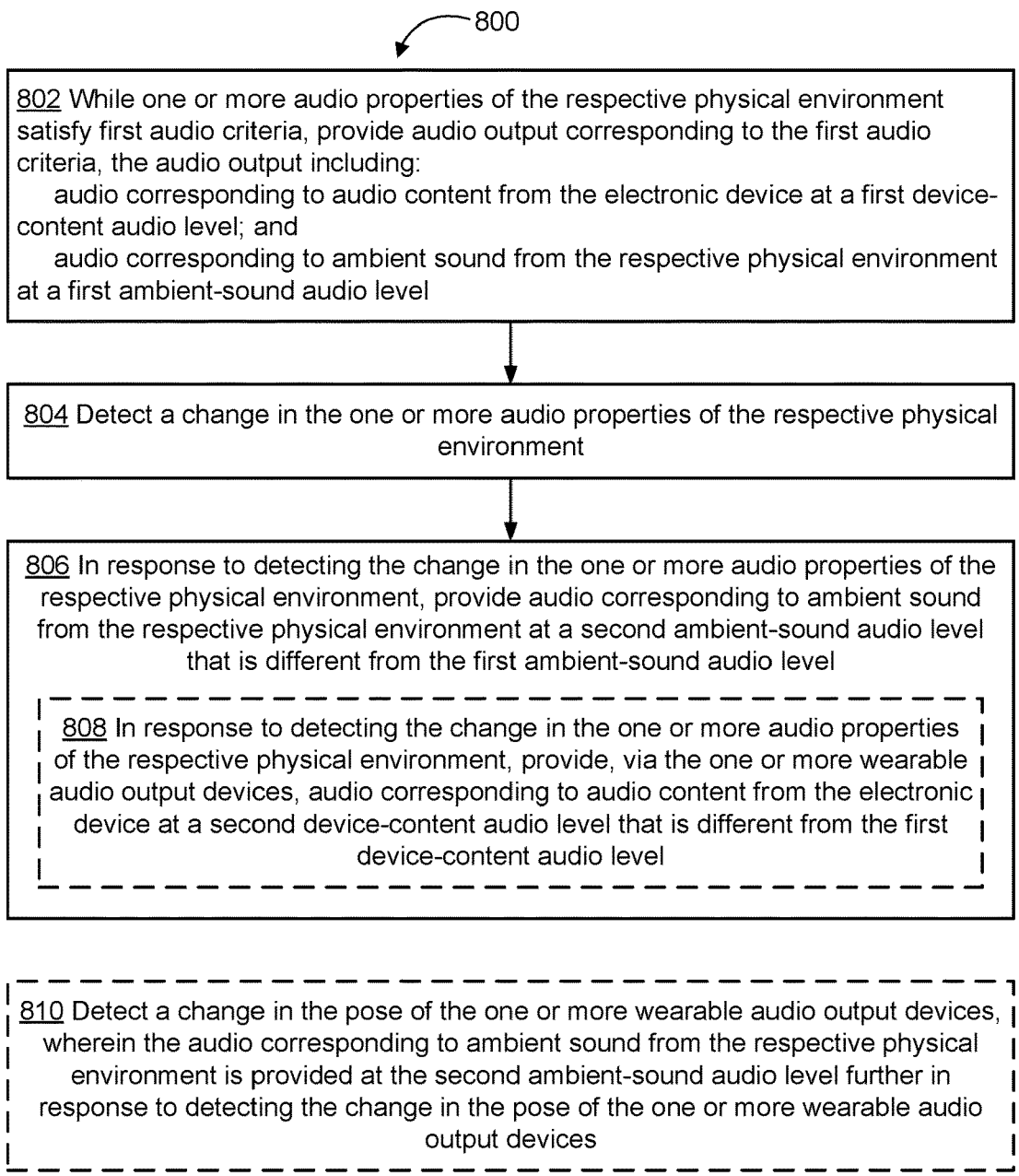

Below, FIGS. 1A-1B, 2, and 3A-3C provide a description of example devices and examples of their operation. FIGS. 4A-4B illustrate example user interface for example devices on which the embodiments disclosed herein are implemented. FIGS. 5A-5L illustrate example adaptive audio outputs in response to example user interactions with wearable audio output devices. FIGS. 6A-6J illustrate example adaptive audio outputs in response to example changes in the audio properties of a surrounding physical environment. FIGS. 7A-7B illustrate a flow diagram of a method of adaptively changing simulated spatial locations of audio outputs in response to changes in user pose. FIGS. 8A-8B illustrate a flow diagram of a method of adaptively changing audio output levels in response to changes in the audio properties of a surrounding physical environment. The user interfaces in FIGS. 5A-5L and 6A-6J are used to illustrate the processes in FIGS. 7A-7B and 8A-8B.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first audio output could be termed a second audio output, and, similarly, a second audio output could be termed a first audio output, without departing from the scope of the various described embodiments. The first audio output and the second audio output are both audio outputs, but they are not the same audio output, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
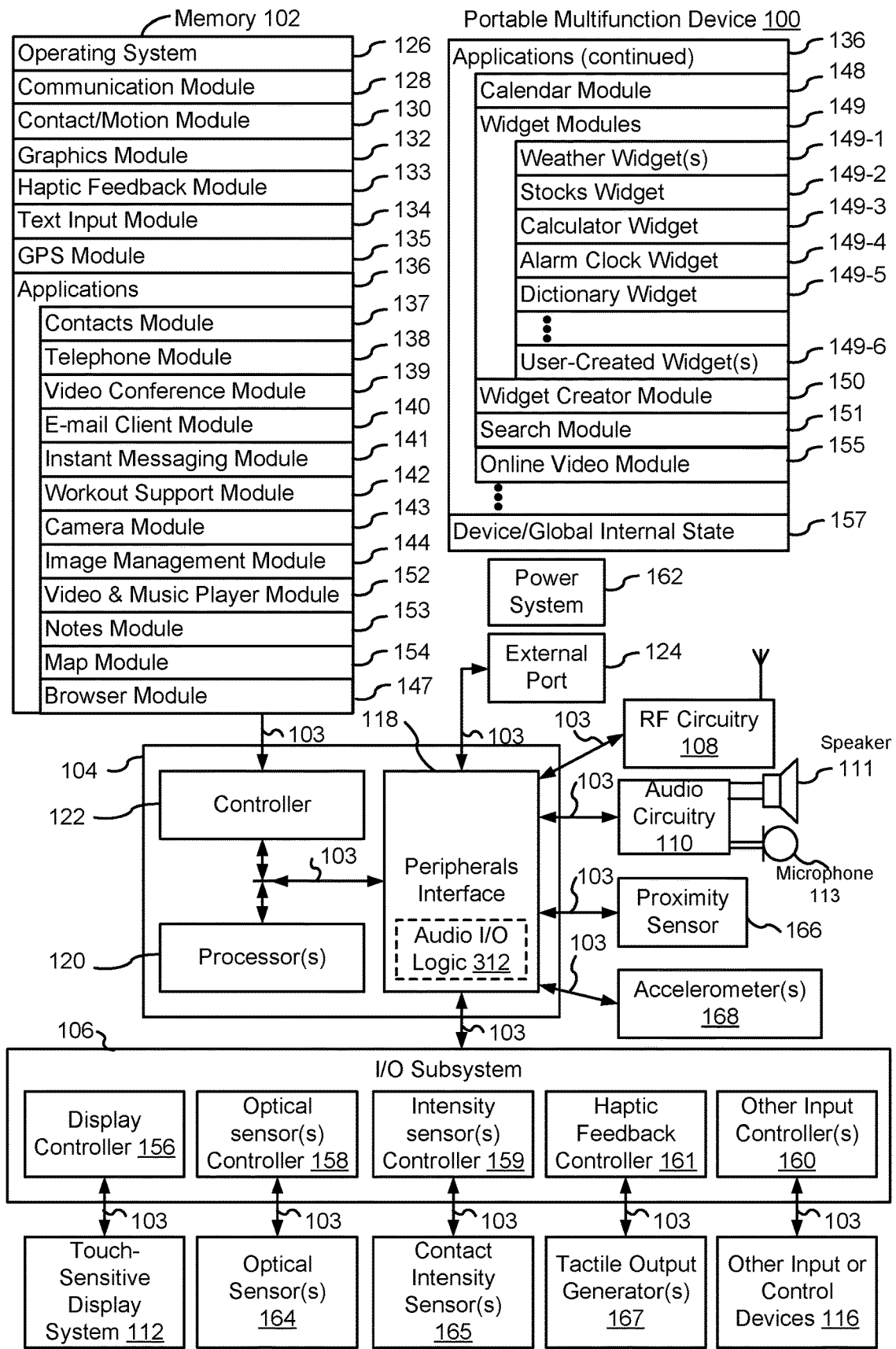
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100.

Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. In some embodiments, touch-sensitive display system 112 or display controller 156, or a combination of touch-sensitive display 112 and display controller 156, are referred to as a display generation component of device 100. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
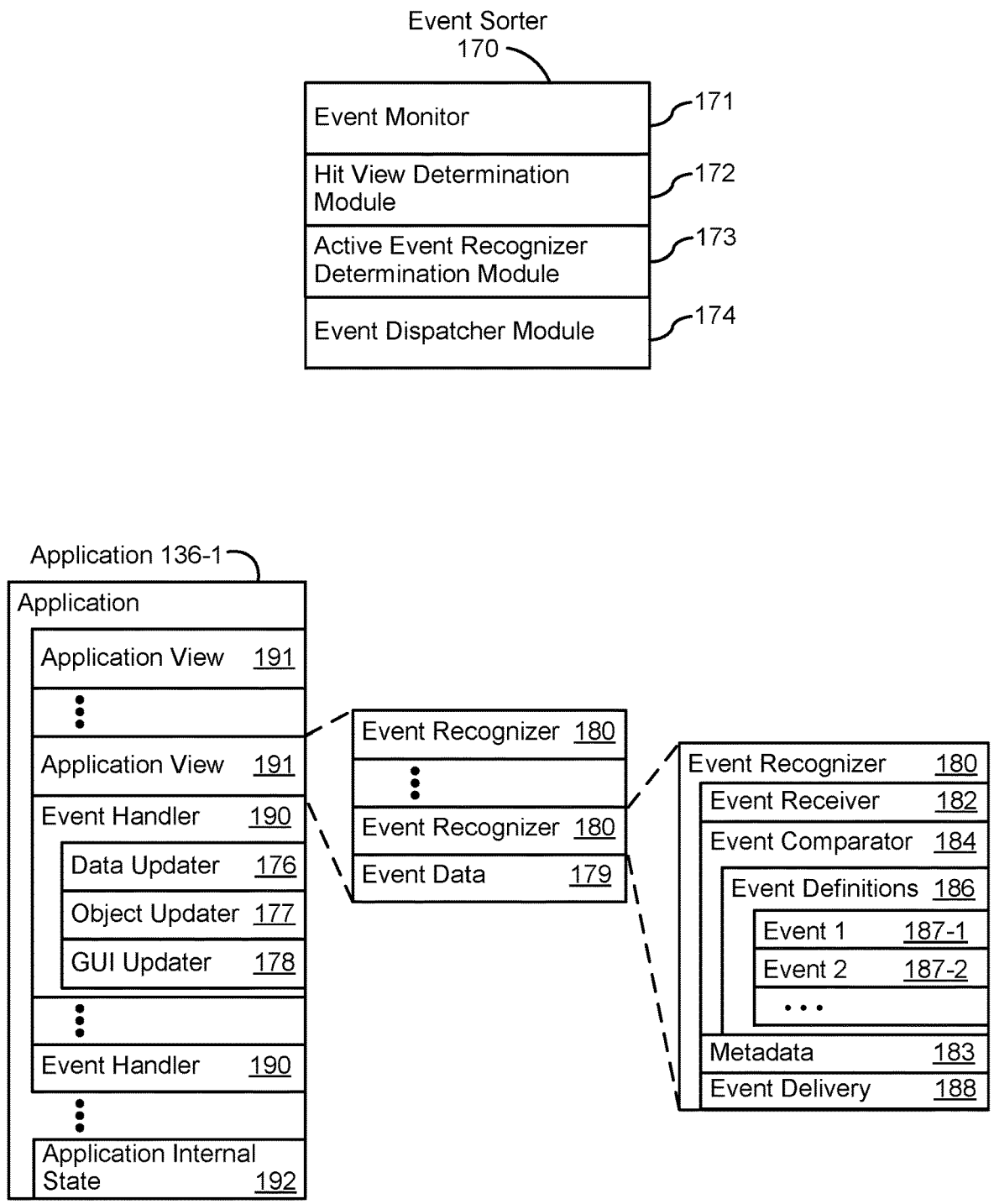
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
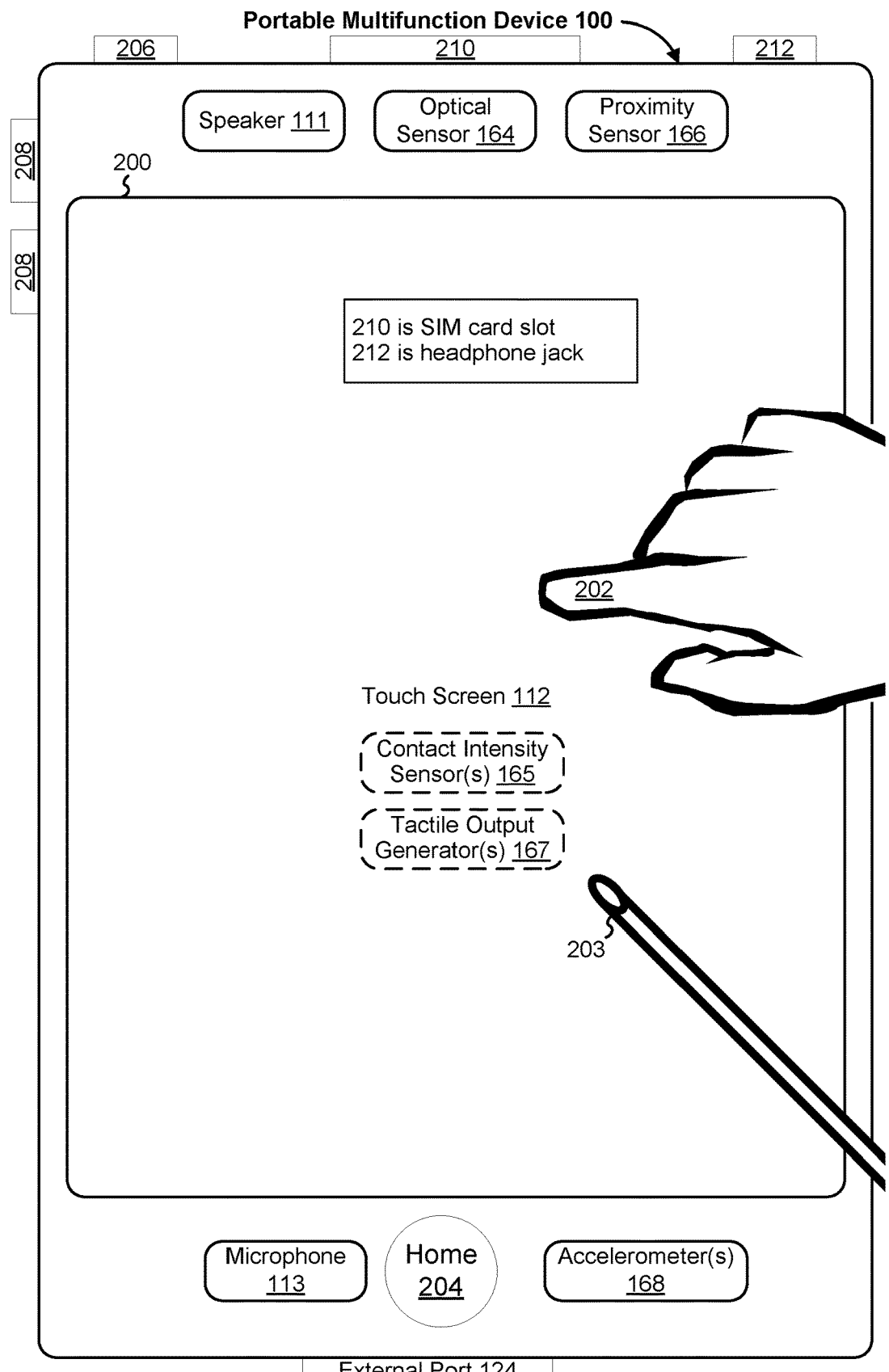
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

Figure 3A:
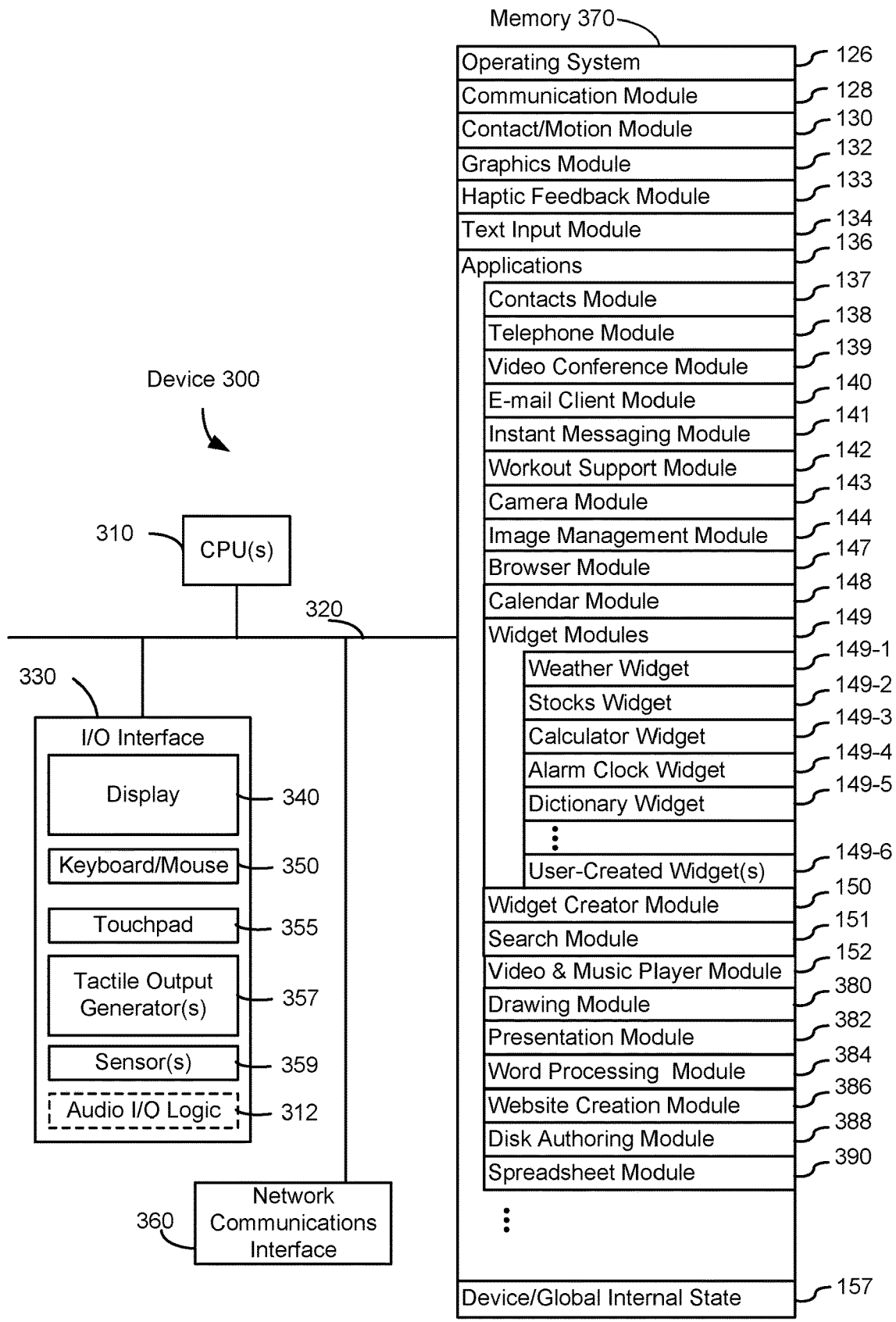
FIG. 3A is a block diagram of an example multifunction device with a display and a touch-sensitive surface in accordance with some embodiments.
Figure 4A:
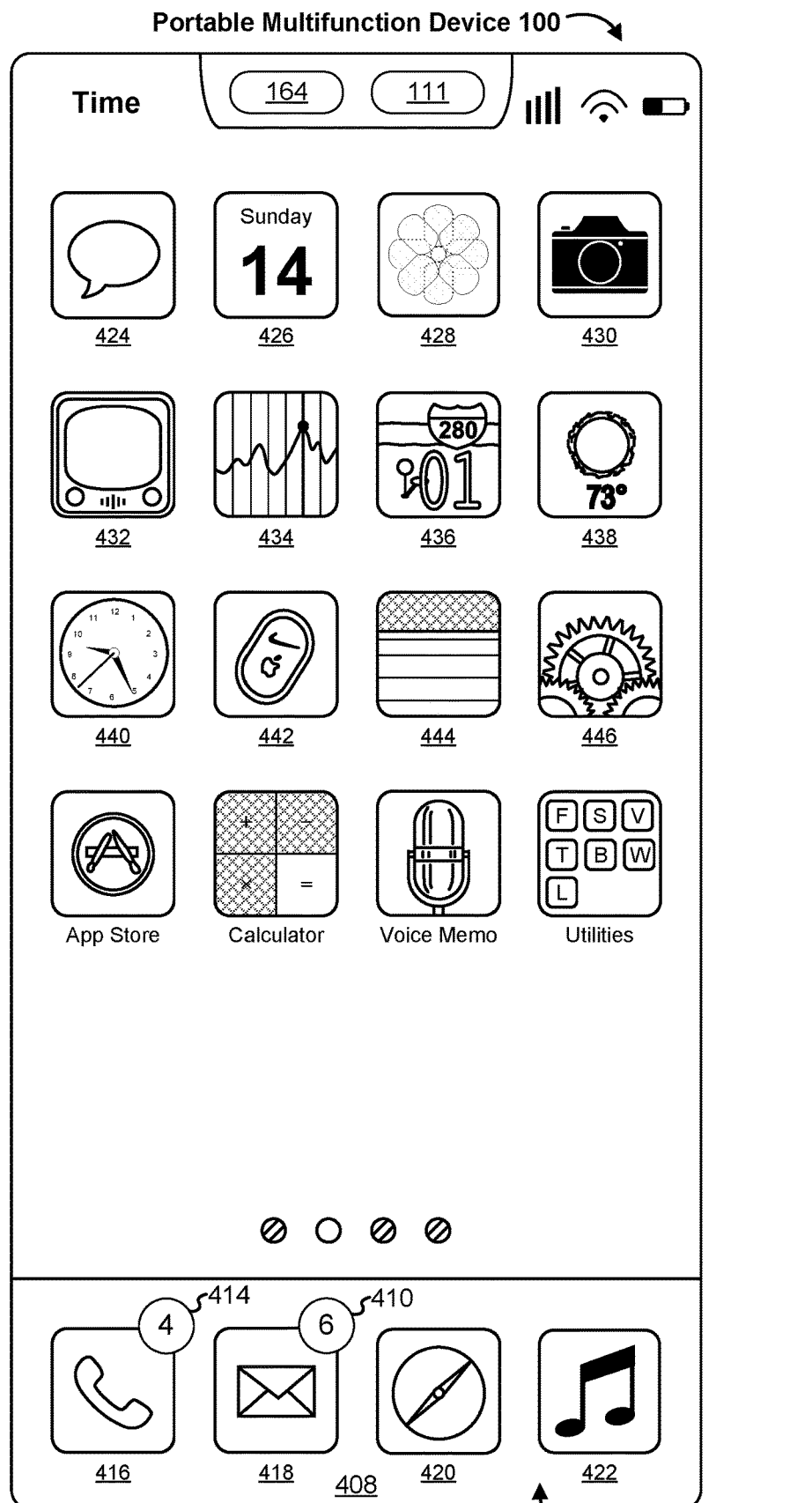
FIG. 4A illustrates an example user interface for a menu of applications on a portable multifunction device in accordance with some embodiments.
Figure 4B:
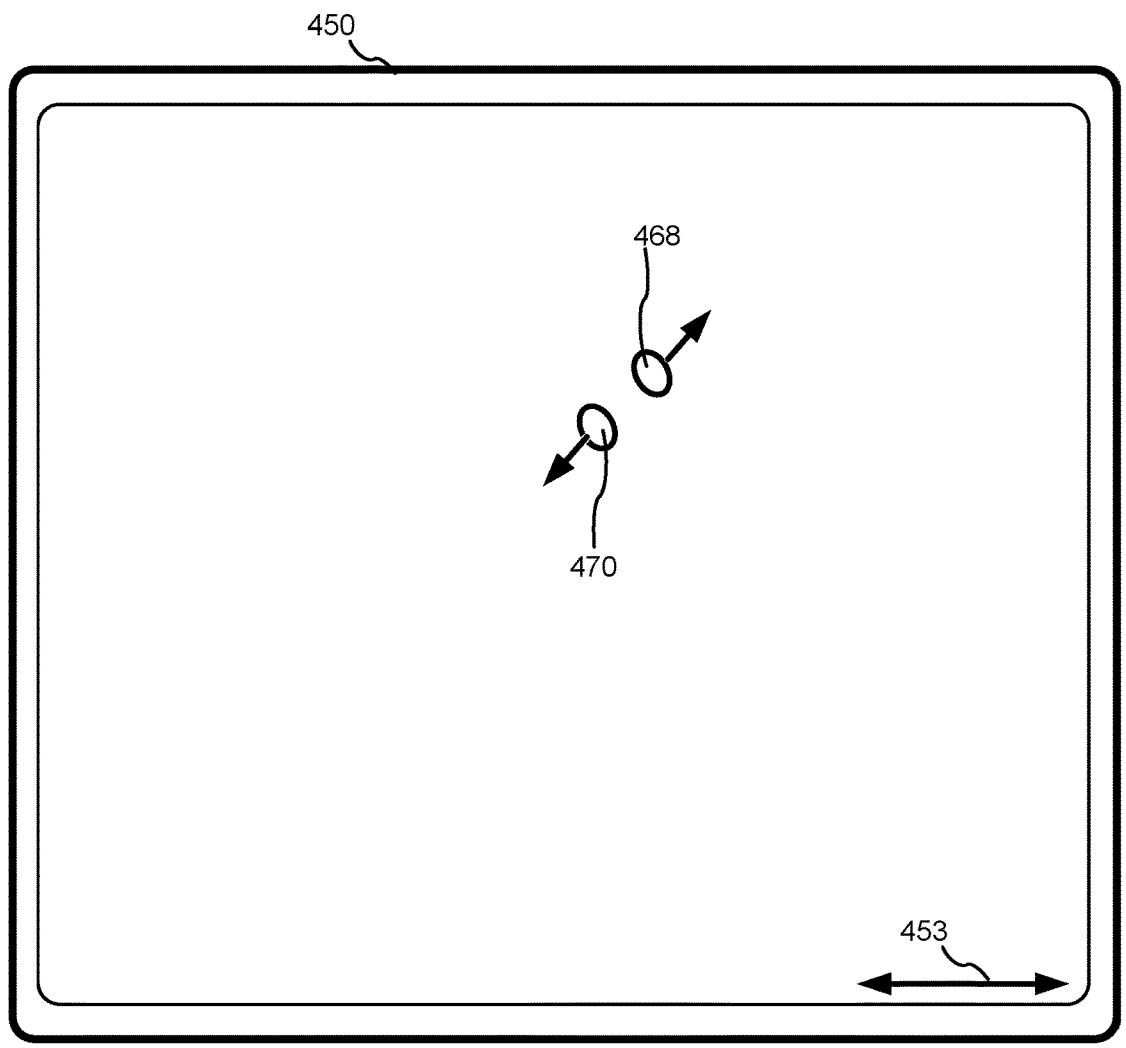
FIG. 4B illustrates an example user interface for a multifunction device with a touch-sensitive surface that is separate from the display in accordance with some embodiments.
Figure 4B:
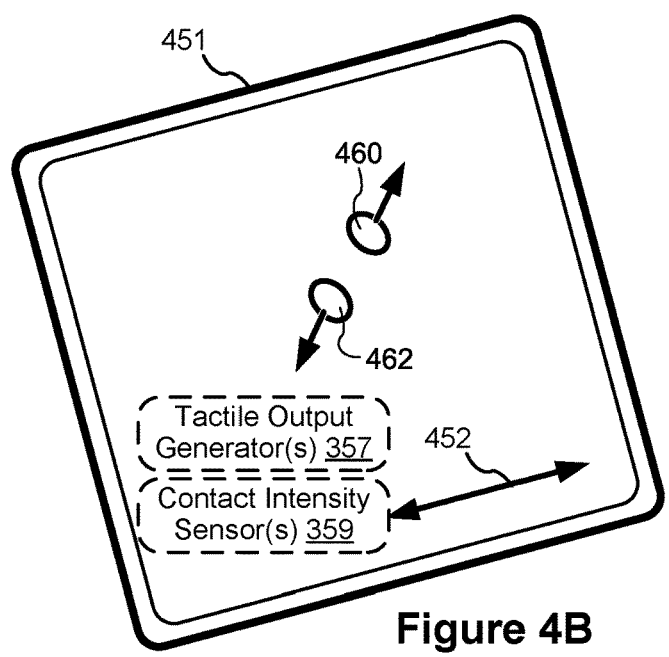

FIG. 3A is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. In some embodiments, display 340 is referred to as a display generation component. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3A are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 3B:
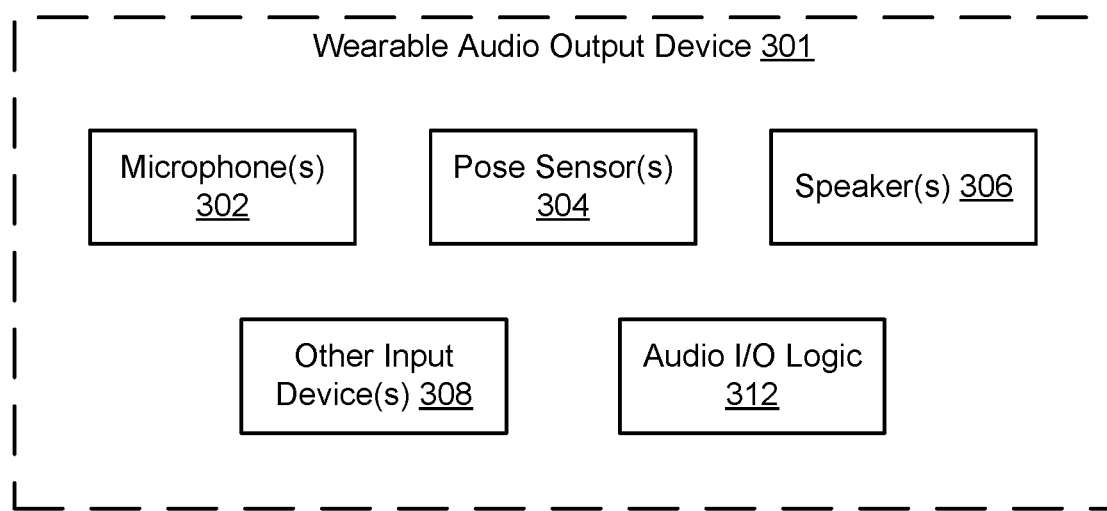
FIG. 3B is a block diagram of an example wearable audio output device in accordance with some embodiments.

FIG. 3B is a block diagram of an example wearable audio output device 301 in accordance with some embodiments. In some embodiments, wearable audio output device 301 is one or more in-ear earphone(s), earbud(s), over-ear headphone(s), or the like. In some examples, wearable audio output device 301 is a single earphone or earbud. In some examples, wearable audio output device 301 includes a pair of earphones or earbuds (e.g., one for each of a user's ears). In some examples, wearable audio output device 301 includes over-ear headphones (e.g., headphones with two over-ear earcups to be placed over a user's ears and optionally connected by a headband). In some embodiments, wearable audio output device 301 includes one or more speakers 306 for providing audio output (e.g., to a user's ear). In some embodiments, wearable audio output device 301 includes one or more pose sensors 304 (e.g., including accelerometer(s) and/or attitude sensor(s)) to detect a pose (e.g., position and/or orientation) and changes in the pose of wearable audio output device 301, or of a user (e.g., a wearer) of wearable audio output device 301, relative to a physical environment. In some embodiments, wearable audio output device 301 conditionally outputs audio based on a pose of wearable audio output device 301 as determined by pose sensor(s) 304. In some embodiments, audio I/O logic 312 determines the pose of wearable audio output device 301 or of the wearer of wearable audio output device 301, and, in some embodiments, audio I/O logic 312 controls the resulting conditional outputting of audio.

In some embodiments, wearable audio output device 301 includes one or more microphones 302 for receiving audio input. In some embodiments, microphone(s) 302 detect speech from a user wearing wearable audio output device 301 and/or ambient noise around wearable audio output device 301. In some embodiments, as described in more detail herein with reference to FIG. 3C, multiple microphones of microphones 302 are positioned at different locations on wearable audio output device 301 to measure speech and/or ambient noise at different locations around wearable audio output device 301. In some embodiments, audio I/O logic 312 detects or recognizes speech or ambient noise based on information received from microphone(s) 302.

In some embodiments, wearable audio output device 301 includes one or more other input devices 308, such as a touch-sensitive surface (for detecting touch inputs), one or more placement sensors to detect positioning or placement of wearable audio output device 301 relative to a user's ear (such as to detect placement of wearable audio output device 301 in or on a user's ear), and/or other input device by which a user can interact with and provide inputs to wearable audio output device 301. In some embodiments, inputs provided via input device(s) 308 are processed by audio I/O logic 312. In some embodiments, audio I/O logic 312 is in communication with a separate device (e.g., device 100, FIG. 1A, or device 300, FIG. 3A) that provides instructions or content for audio output, and that optionally receives and processes inputs (or information about inputs) provided via microphone(s) 302, pose sensor(s) 304, and/or input device(s) 308, or via one or more input devices of the separate device. In some embodiments, audio I/O logic 312 is located in device 100 (e.g., as part of peripherals interface 118, FIG. 1A) or device 300 (e.g., as part of I/O interface 330, FIG. 3A), instead of device 301, or alternatively is located in part in device 100 and in part in device 301, or in part in device 300 and in part in device 301.

Figure 3C:
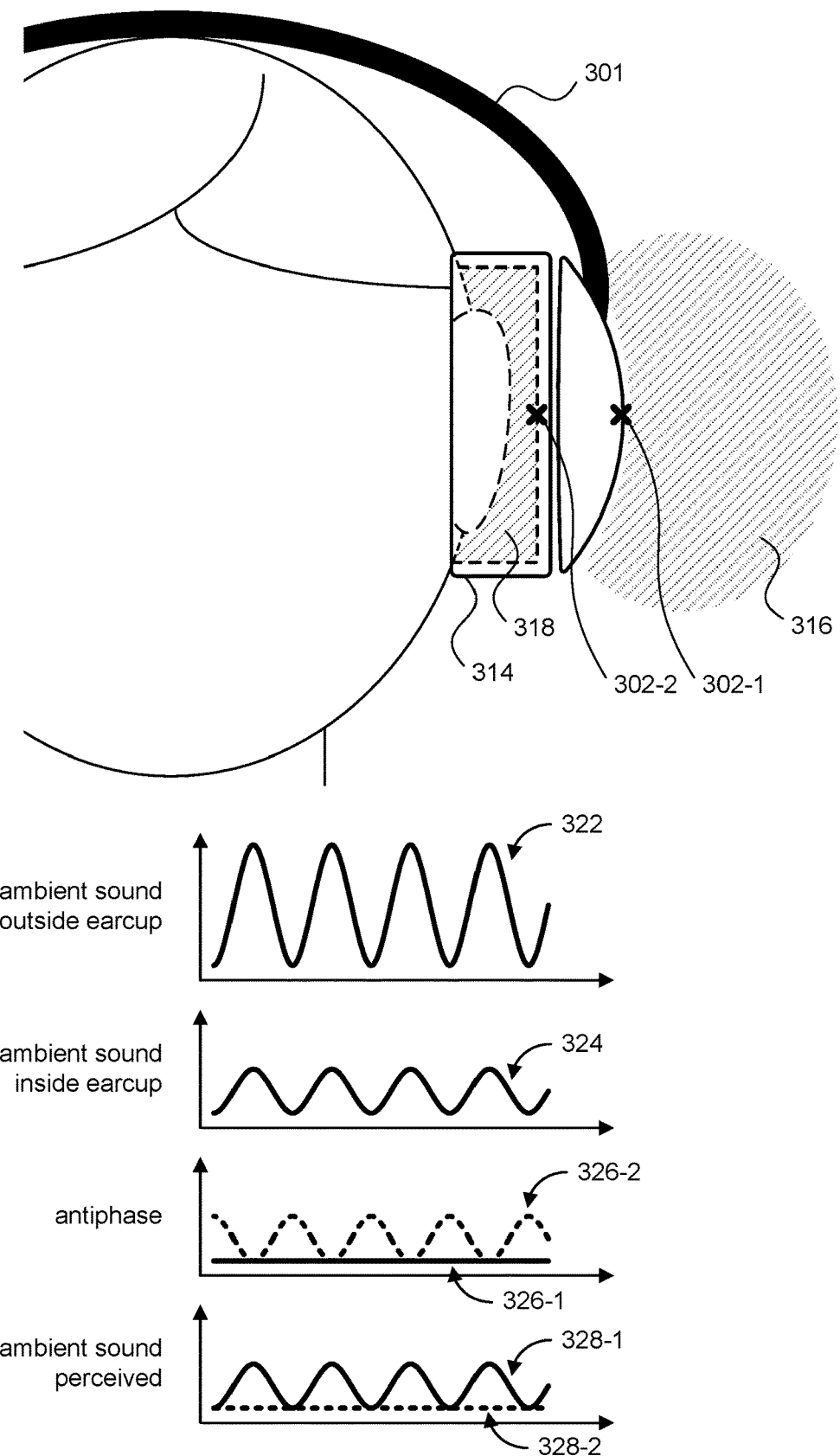
FIG. 3C illustrates example audio control by a wearable audio output device in accordance with some embodiments.

FIG. 3C illustrates example audio control by a wearable audio output device in accordance with some embodiments. In some embodiments, when a wearable audio output device having over-ear earcups is worn over a user's ear, the earcups act as physical barriers that block at least some ambient sound from the surrounding physical environment from reaching the user's ear. For example, in FIG. 3C, wearable audio output device 301 is worn by a user such that earcup 314 is over the user's left ear. In some embodiments, a first microphone (or, in some embodiments, a first set of one or more microphones) 302-1 (e.g., of microphones 302, FIG. 3B) is located on wearable audio output device 301 so as to detect ambient sound, represented by waveform 322, in region 316 of a physical environment surrounding (e.g., outside of) earcup 314. In some embodiments, earcup 314 blocks some, but not necessarily all, of the ambient sound in the surrounding physical environment from reaching the user's ear. In some embodiments, a second microphone (or, in some embodiments, a second set of one or more microphones) 302-2 (e.g., of microphones 302, FIG. 3B) is located on wearable audio output device 301 so as to detect any ambient sound, represented by waveform 324, that is not completely blocked by earcup 314 and that can be heard in region 318 inside earcup 314. Accordingly, in some circumstances in which wearable audio output device 301 is not producing a noise-cancelling (also called "antiphase") audio signal to cancel (e.g., attenuate) ambient sound from the surrounding physical environment, as indicated by waveform 326-1, ambient sound waveform 324 is perceivable by the user, as indicated by waveform 328-1. In some circumstances in which wearable audio output device 301 is producing an antiphase audio signal to cancel ambient sound, as indicated by waveform 326-2, ambient sound waveform 324 is not perceivable by the user, as indicated by waveform 328-2.

In some embodiments, ambient sound waveform 322 is compared to attenuated ambient sound waveform 324 (e.g., by wearable audio output device 301 or a component of wearable audio output device 301, such as audio I/O logic 312, or by an electronic device that is in communication with wearable audio output device 301) to determine the passive attenuation provided by wearable audio output device 301. In some embodiments, the amount of passive attenuation provided by wearable audio output device 301 is taken into account when providing the antiphase audio signal to cancel ambient sound from the surrounding physical environment. For example, antiphase audio signal waveform 326-2 is configured to cancel attenuated ambient sound waveform 324 rather than unattenuated ambient sound waveform 322.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
  Icon 416 for telephone module 138, labeled "Phone," which optionally includes an indicator 414 of the number of missed calls or voicemail messages;
  418 for e-mail client module 140, labeled "Mail," which optionally includes an indicator 410 of the number of unread e-mails;
  Icon 420 for browser module 147, labeled "Browser;" and 422 for video and music player module 152, labeled "Music;" and Icons for other applications, such as:

424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Although in some examples, inputs may be received on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

User Interfaces and Associated Processes

Attention is now directed towards embodiments of user interfaces ("UI") and associated processes that may be implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

FIGS. 5A-5L illustrate example adaptive audio outputs in response to example user interactions with wearable audio output devices in accordance with some embodiments.

FIGS. 6A-6J illustrate example adaptive audio outputs in response to example changes in the audio properties of a surrounding physical environment in accordance with some embodiments. The audio outputs, user interactions, and ambient audio changes in these figures are used to illustrate the processes described below, including the processes in FIGS. 7A-7B and 8A-8B. For convenience of explanation, some of the embodiments will be discussed with reference to operations performed using a wearable audio output device that is worn by a user and that is in communication with and separate from an electronic device having a touch-sensitive display system 112 or display 340 that is separate from a touch-sensitive input device such as touchpad 355. In some embodiments, the operations are performed in response to instructions received by the wearable audio output device from the electronic device, based on processing performed at the electronic device. In some embodiments, the operations are performed by the wearable audio output device based on processing performed at the wearable audio output device. However, in some cases, analogous operations are optionally performed using audio output devices that are part of a device having a display generation component and/or touch-sensitive input device (e.g., a wearable device, such as headphones or a headset, that integrates the one or more audio output devices with a display and/or touch-sensitive input device).

FIGS. 5A-5L illustrate example adaptive audio outputs in response to example user interactions with wearable audio output devices, including changes in user pose, in accordance with some embodiments.

Figure 5A:
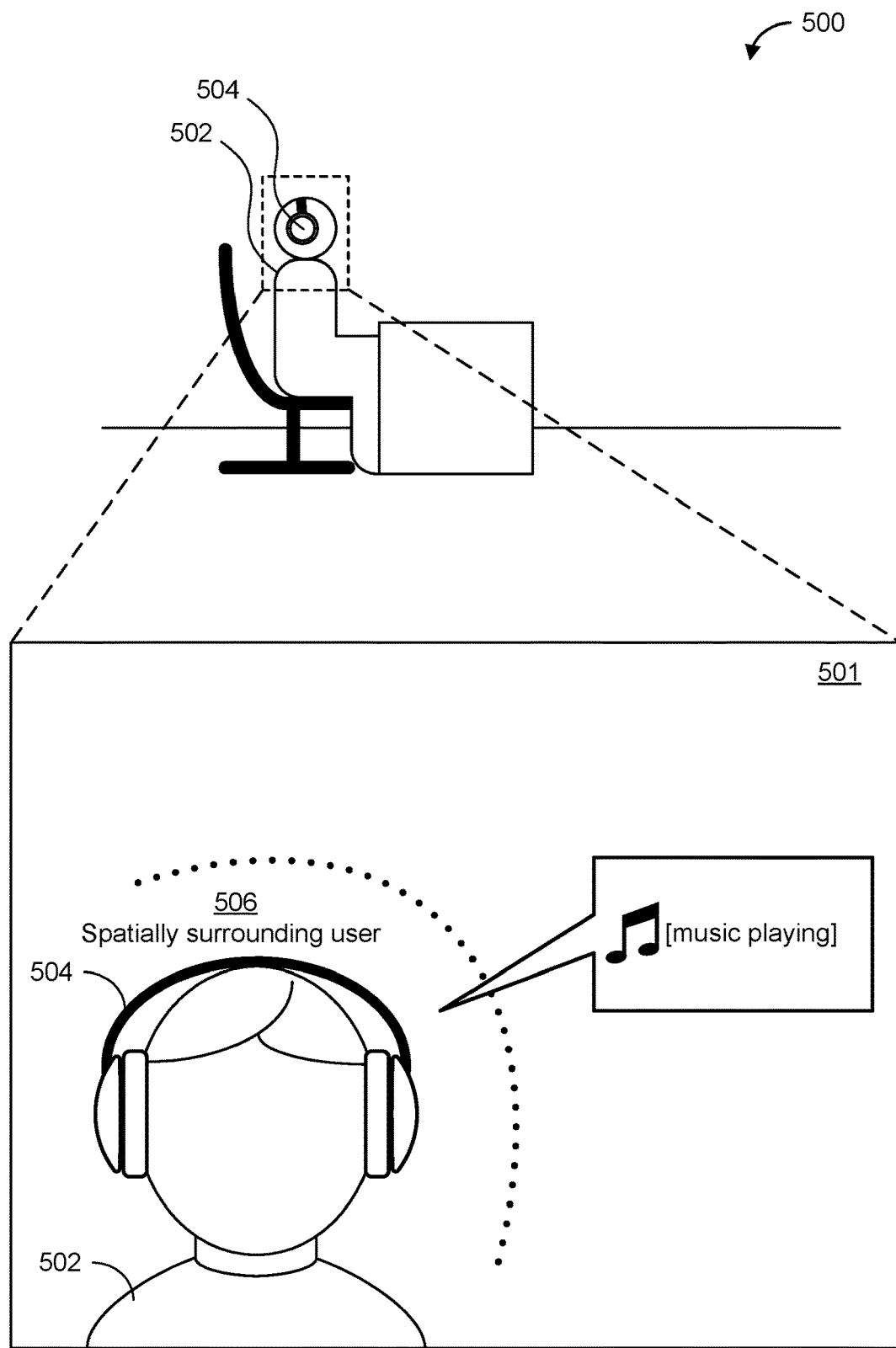
FIGS. 5A-5L illustrate example adaptive audio outputs in response to example user interactions with wearable audio output devices in accordance with some embodiments.

FIGS. 5A-5E illustrate changes in audio outputs provided by headphones worn by a user in response to changes in the pose of the user between sitting and standing positions. FIG. 5A illustrates user 502 seated and sitting upright, and wearing headphones 504, in physical environment 500. Expanded view 501 illustrates headphones 504 playing music so that the music sounds as if it is coming from simulated spatial region 506 surrounding user 502's head.

Figure 5B:
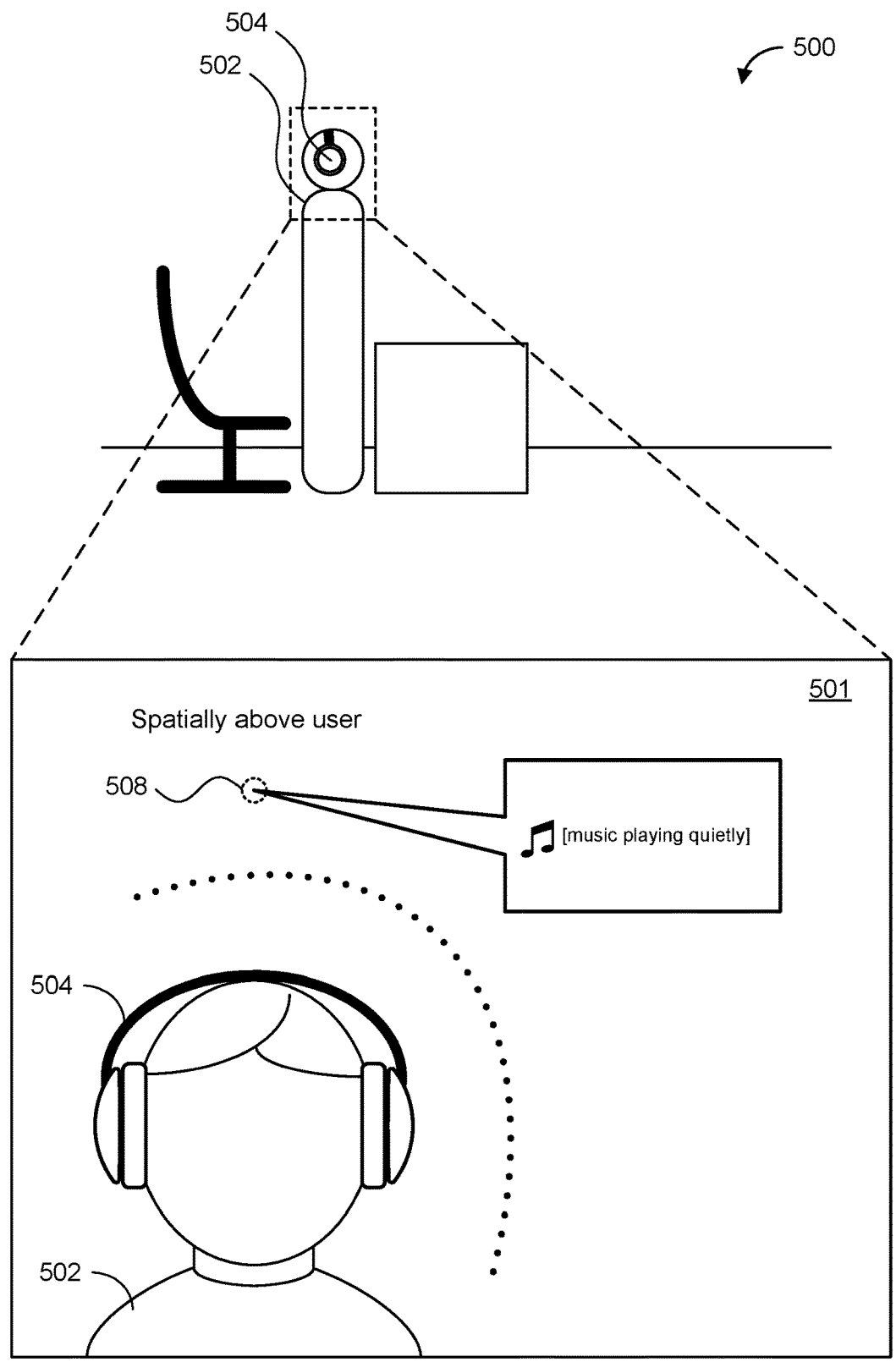
Figure 5C:
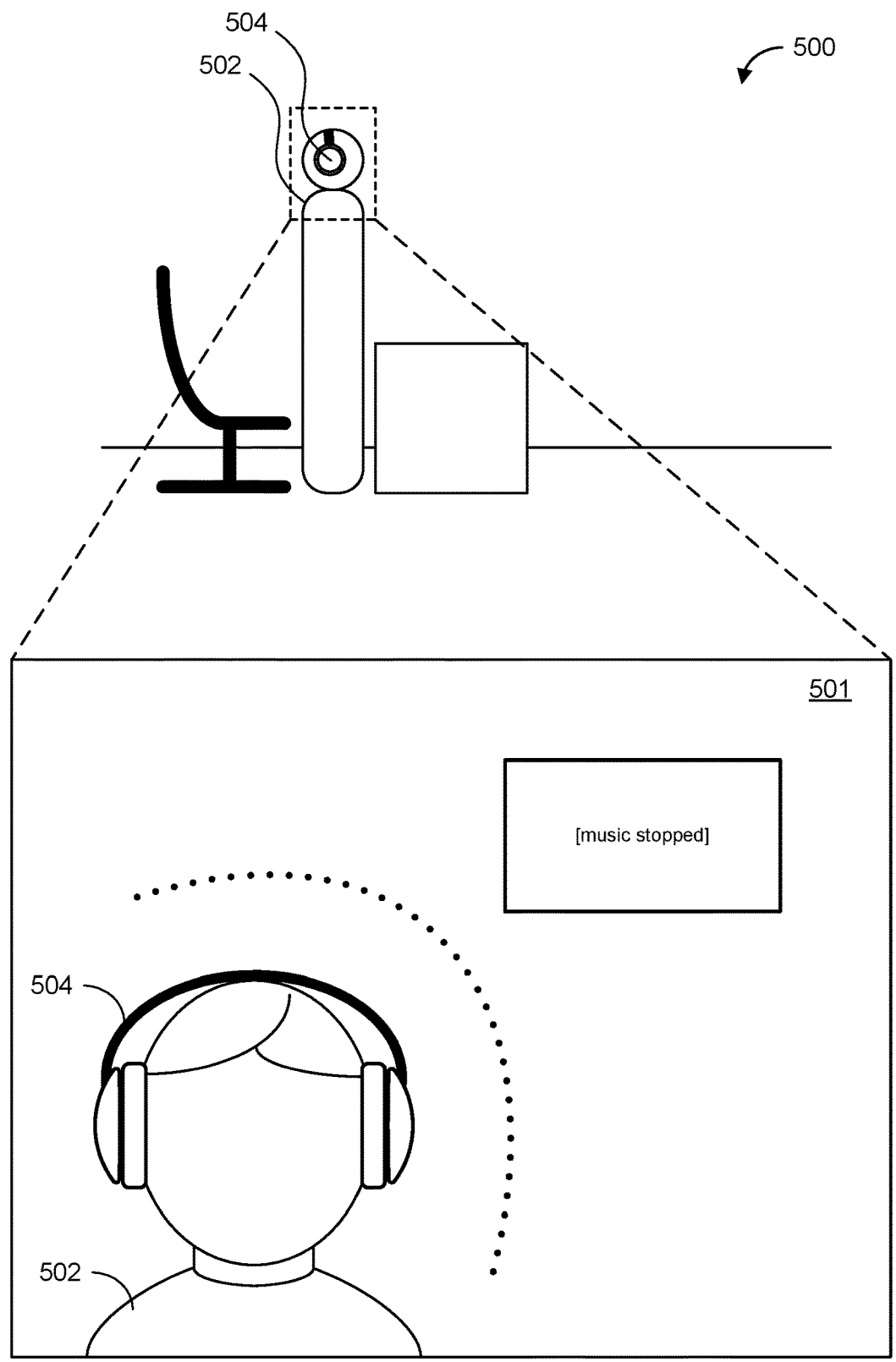

FIGS. 5B-5C illustrate a transition from FIG. 5A. In particular, FIG. 5B illustrates that user 502 has assumed a standing position. Expanded view 501 in FIG. 5B illustrates that, in response to the change in the pose of user 502 from sitting (FIG. 5A) to standing (FIG. 5B), headphones 504 move the simulated spatial location of the music being played so that the music sounds as if it is coming from simulated spatial location 508 that is above user 502's head, which is distinct from simulated spatial region 506 surrounding user 502's head, and decrease the volume at which the music is being played.

In some embodiments, in response to the change in the pose of user 502 from sitting (FIG. 5A) to standing (FIG. 5B), headphones 504 fade music playback out completely. Accordingly, FIG. 5C illustrates an optional further transition where, after the simulated spatial location of the music is moved to above user 502's head and after the volume at which the music is being played is decreased (as shown in FIG. 5B and described above), headphones 504 stop playing music entirely (e.g., the music volume is decreased to zero or paused/stopped), as shown in expanded view 501 in FIG. 5C.

In other words, in FIGS. 5B-5C, user 502 is provided with a less immersive and thus less obstructive audio experience in response to standing up from a seated position (or, in other embodiments, in response to sitting or standing up from a reclining or laying down position), to make it easier for user 502 to interact with his surrounding physical environment, as the change in pose may indicate user 502's intention to interact with his surrounding physical environment. In contrast, in FIG. 5A, user 502 is provided with a more immersive audio experience while seated (or, in other embodiments, while reclining or laying down), in which case user 502 may be less likely to interact with his surrounding physical environment.

Figure 5D:
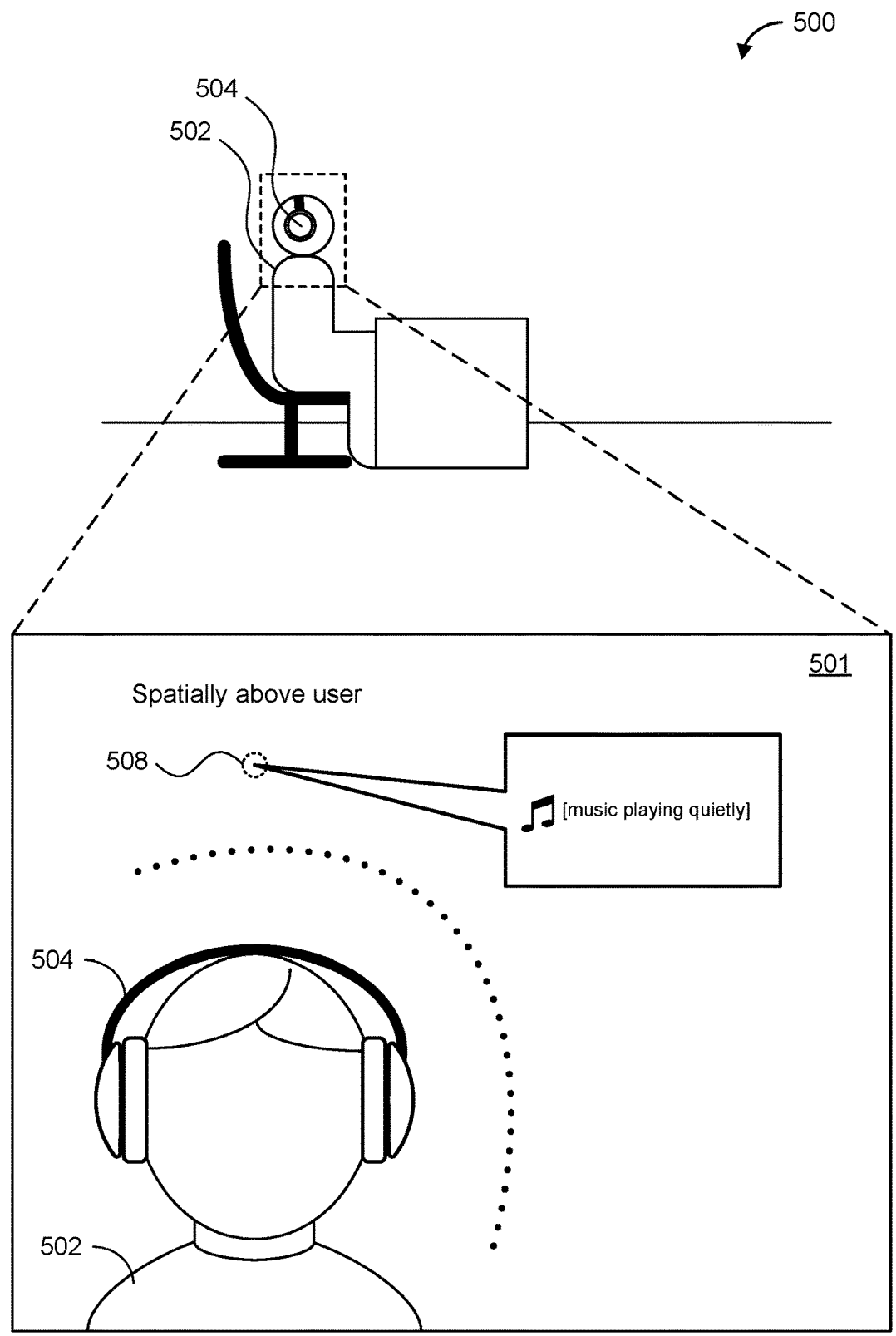
Figure 5E:
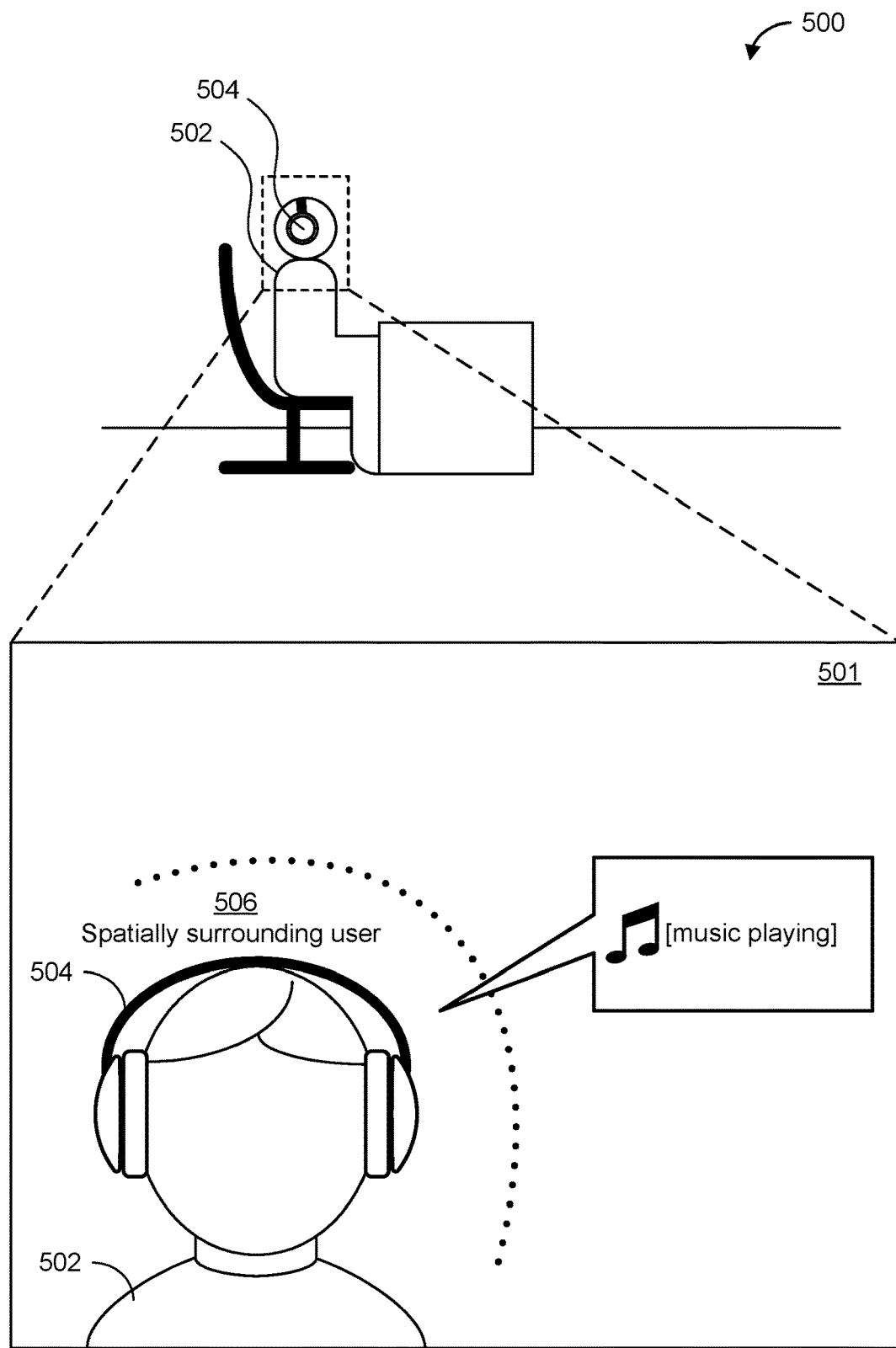

FIGS. 5D-5E illustrate a transition from FIGS. 5B-5C. In particular, FIG. 5D illustrates that user 502 has resumed the same seated pose as in FIG. 5A. In response to the change in pose of user 502 from standing (FIG. 5C) to sitting (FIG. 5D), headphones 504 resume playing music as in FIG. 5A. In some embodiments, as shown in FIGS. 5D-5E, headphones 504 gradually resume music playback, for example by initially playing music at simulated spatial location 508 above user 502's head (FIG. 5D) and later moving the simulated spatial location of the music so that the music sounds as if it is coming from simulated spatial region 506 surrounding user 502's head (FIG. 5E). In addition, in some embodiments, headphones 504 gradually increase the music volume from zero to a reduced volume initially relative to the original volume as in FIG. 5A (as shown in expanded view 501 in FIG. 5D) and later to the original volume as in FIG. 5A (as shown in expanded view 501 in FIG. 5E). In some embodiments, the simulated spatial location of the music is changed gradually in conjunction with gradual increases in the music volume. In some embodiments where headphones 504 do not fade music playback out completely in response to a change in user pose (e.g., in embodiments where the scenario illustrated in FIG. 5C does not take place), user 502 resuming a seated pose results in a transition from the scenario of FIG. 5B to the scenario of FIG. 5E without first transitioning through the intermediate scenario of FIG. 5D.

Figure 5F:
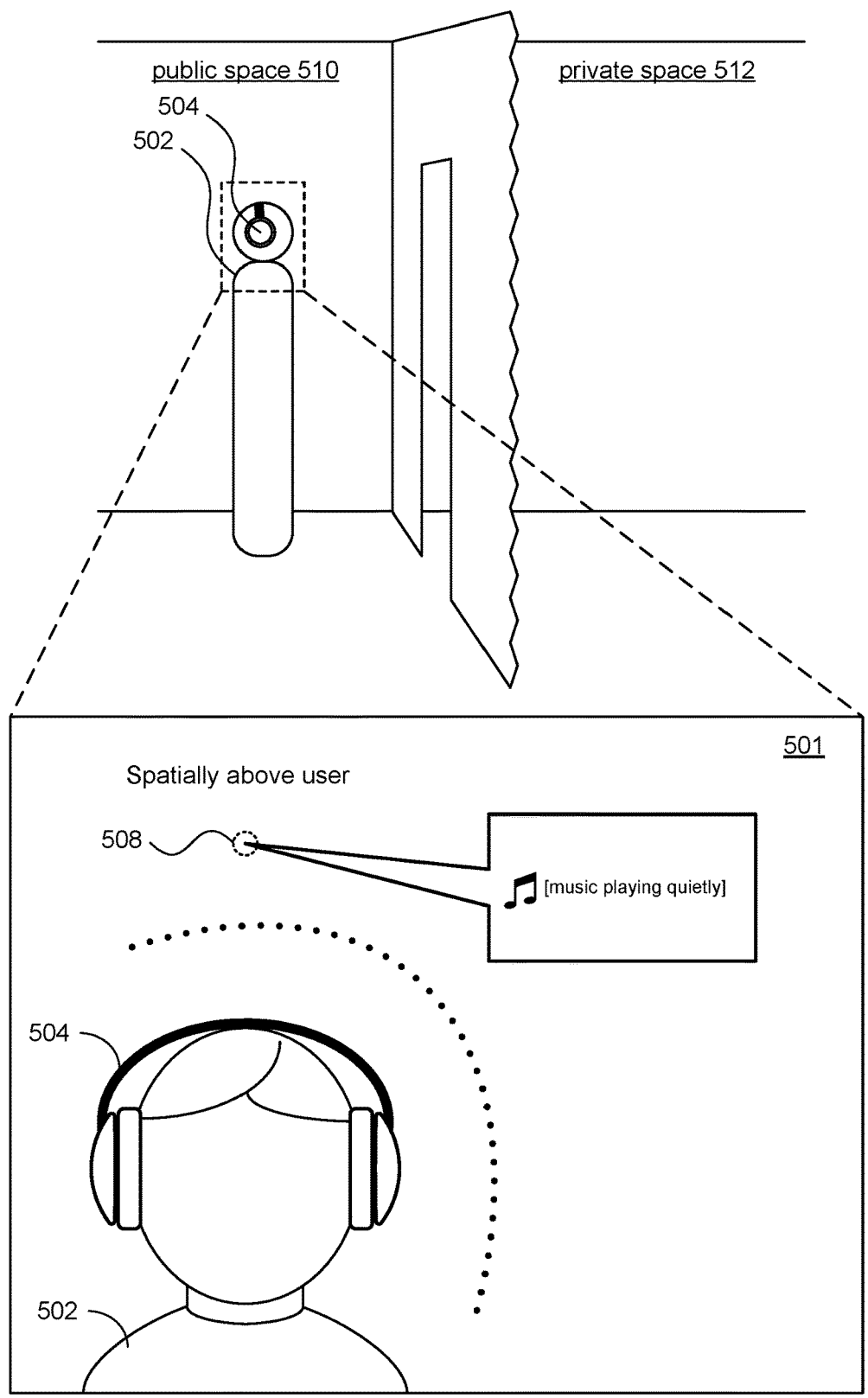
Figure 5G:
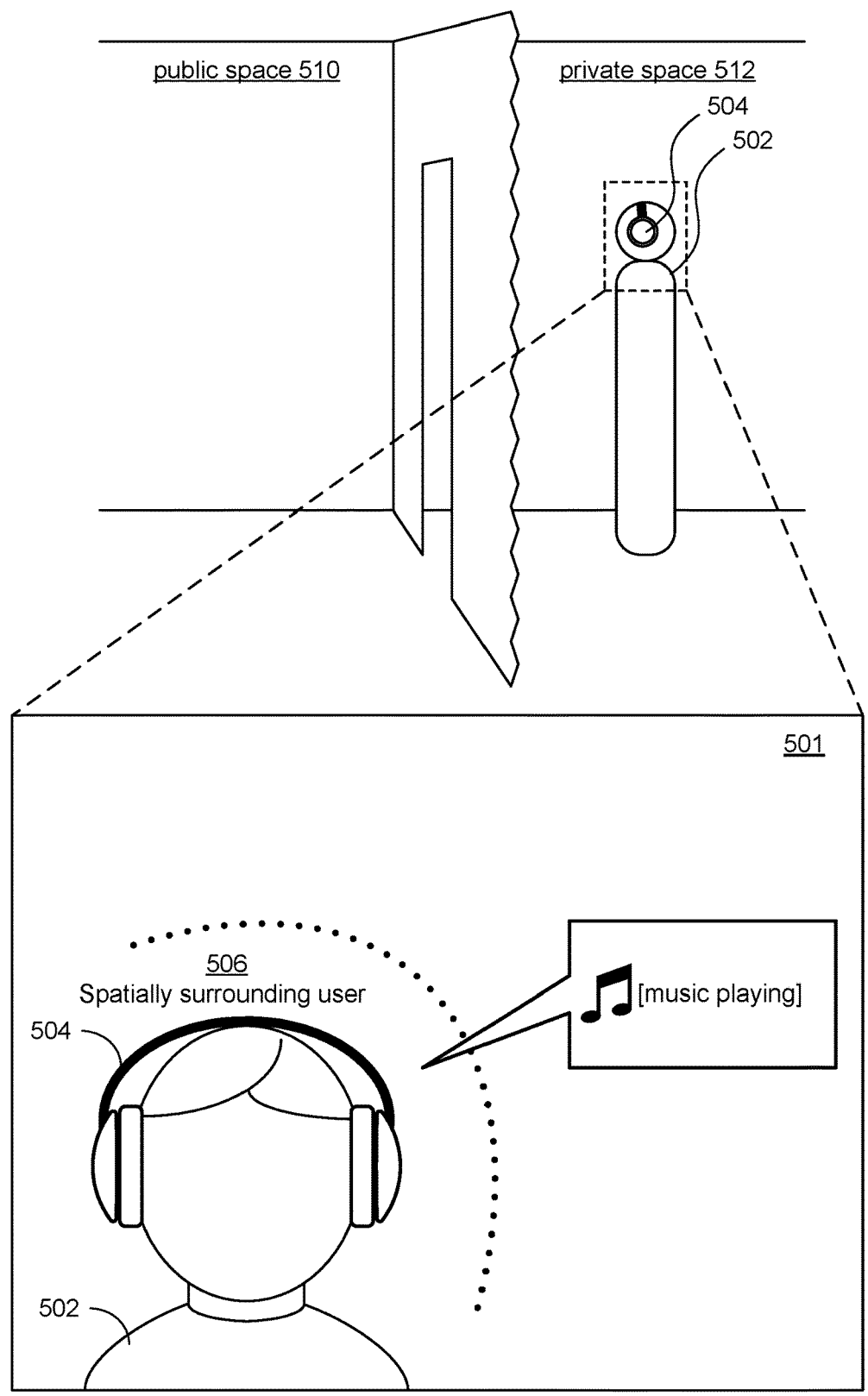

FIGS. 5F-5G illustrate changes in audio outputs provided by headphones 504 in response to a change in the pose of user 502 that includes movement between different types of spaces. FIG. 5F illustrates user 502 standing in public space 510. Expanded view 501 in FIG. 5F illustrates that, while user 502 is standing in public space 510, headphones 504 play music quietly, and so that the music sounds as if it is coming from simulated spatial location 508 that is above user 502's head. FIG. 5G illustrates that user 502 has moved to private space 512. Expanded view 501 in FIG. 5G illustrates that, in response to user 502 moving from public space 510 to private space 512, headphones 504 increase the volume of music playback and move the simulated spatial location of the music so that the music sounds as if it is coming from simulated spatial region 506 surrounding user 502's head.

In other words, in FIG. 5F, user 502 is provided with a less immersive and thus less obstructive audio experience while in a public space (e.g., public space 510), to make it easier for user 502 to interact with his surrounding physical environment. In contrast, in FIG. 5G, user 502 is provided with a more immersive audio experience while in a private space (e.g., private space 512), where user 502 may be less likely to interact with his surrounding physical environment.

Figure 5H:
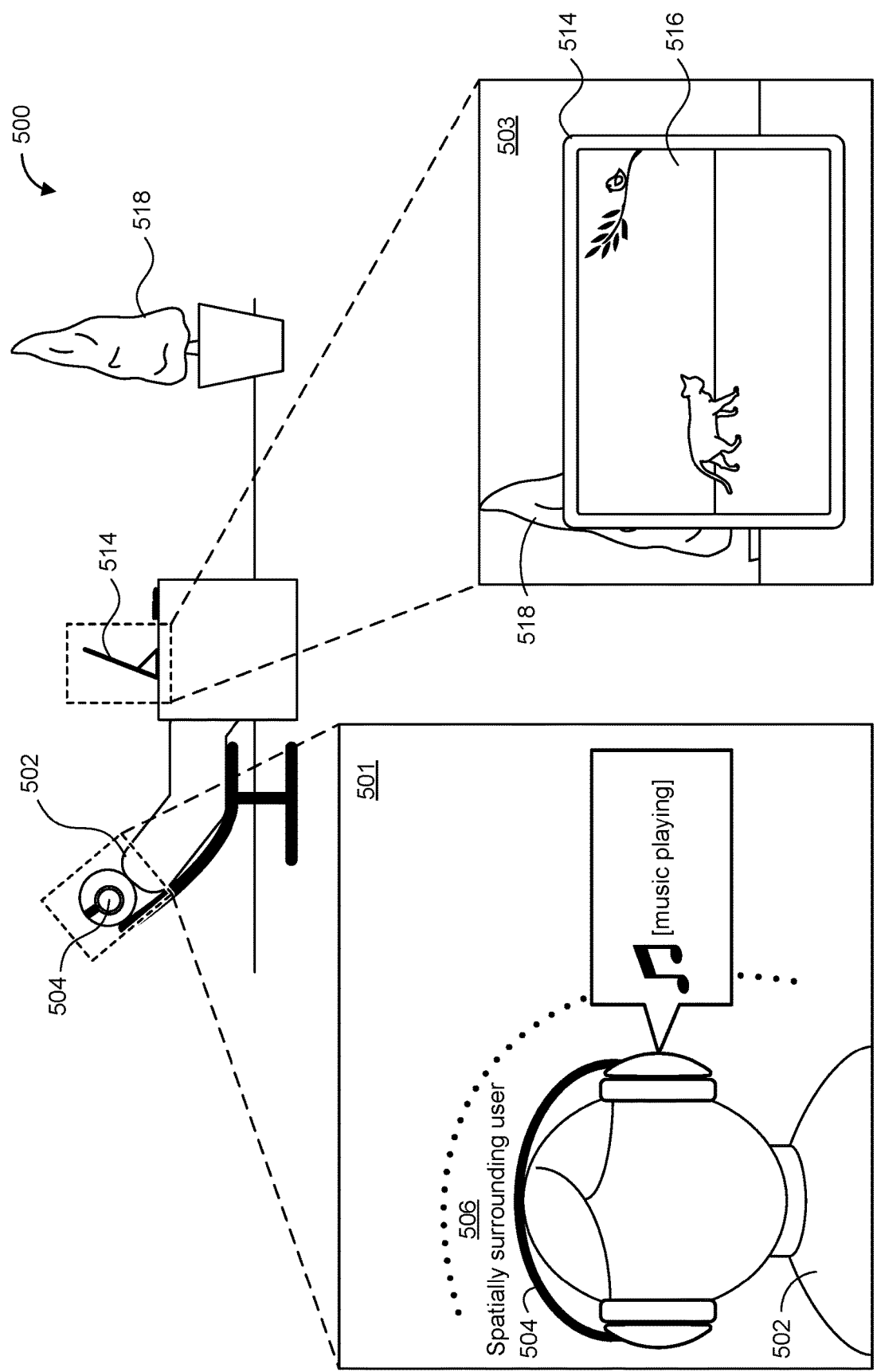

FIG. 5H-5L illustrate changes in audio outputs provided by headphones 504 worn by user 502, as well as changes in visual feedback provided on a display of an electronic device that is in communication with headphones 504, in response to changes in the pose of user 502 between reclining and sitting positions. FIG. 5H illustrates user 502 reclining in physical environment 500. Expanded view 501 illustrates headphones 504 playing music so that the music sounds as if it is coming from simulated spatial region 506 surrounding user 502's head. Expanded view 503 illustrates a view of physical environment 500 from the perspective of user 502, including a view of device 514 and of a portion of plant 518 that is visible behind device 514. Device 514 displays a full-screen user interface for playing video 516. In the example shown in FIG. 5H, the music being played by headphones 504 is an audio track for the video content of video 516.

Figure 5I:
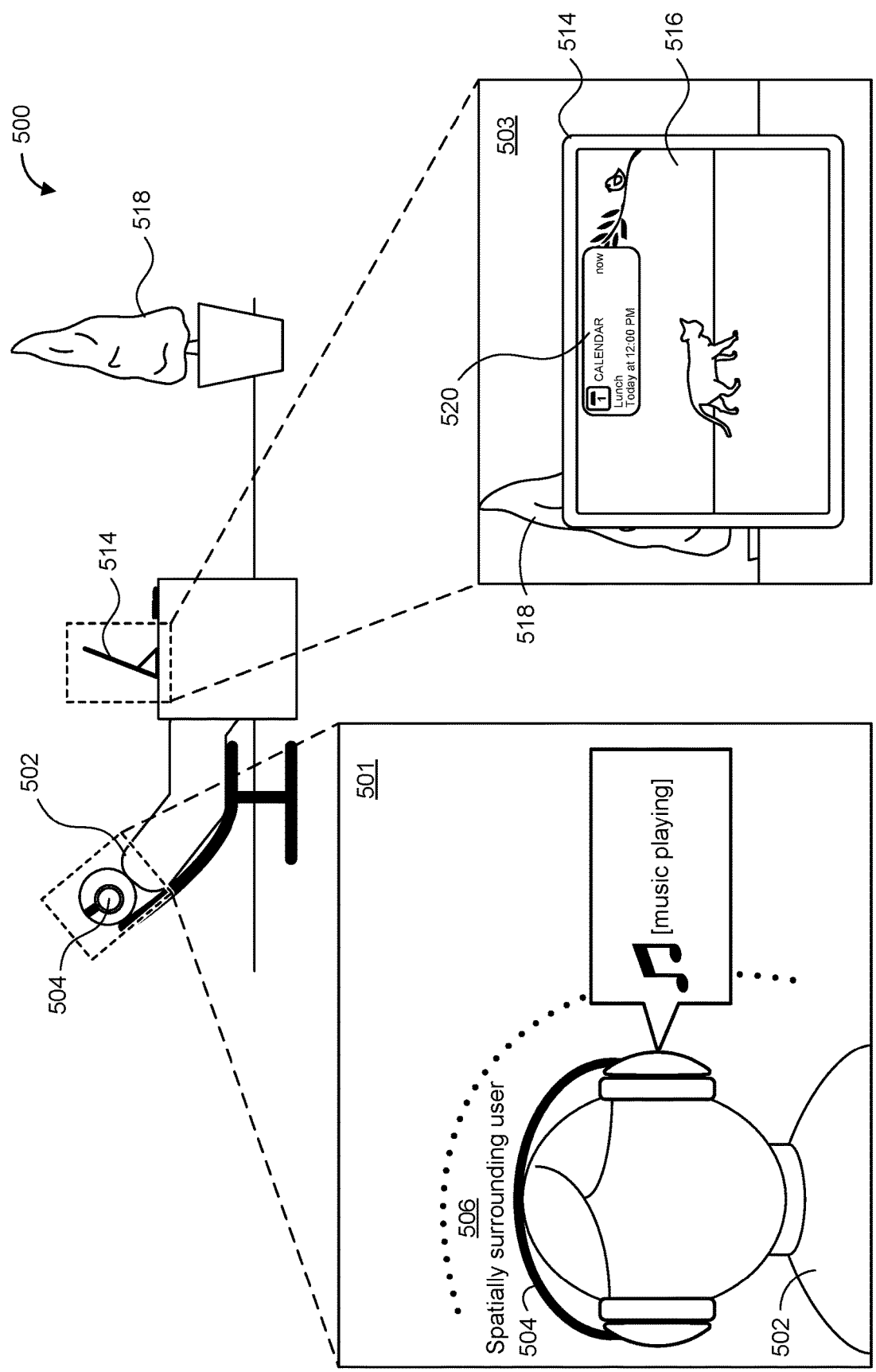
Figure 5J:
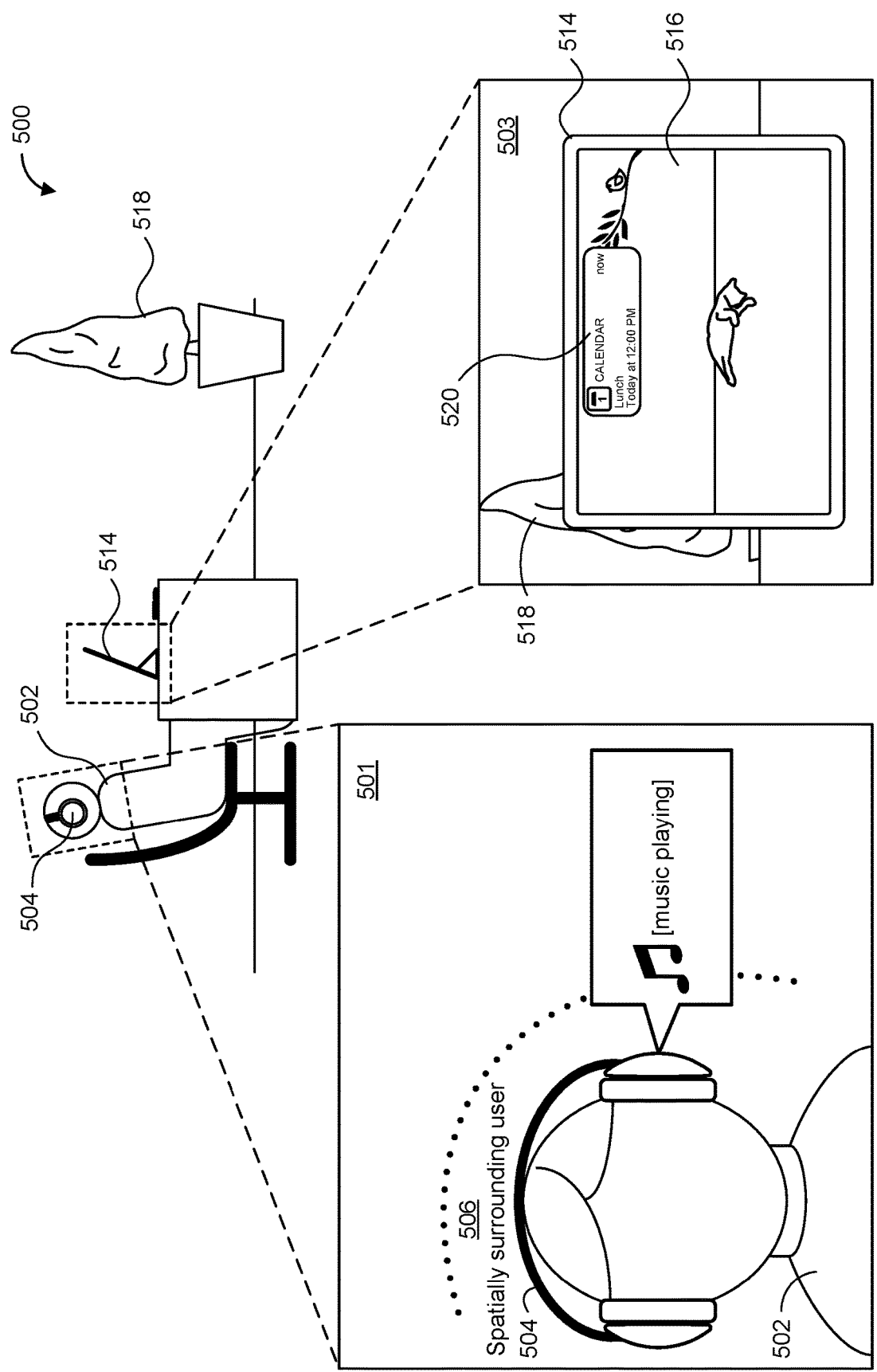

FIG. 5I illustrates that, as user 502 continues to watch video content 516, a notification 520 is displayed on device 514. FIG. 5J illustrates that, in response to notification 520, user 502 sits up, thus changing pose from reclining to sitting upright.

Figure 5K:
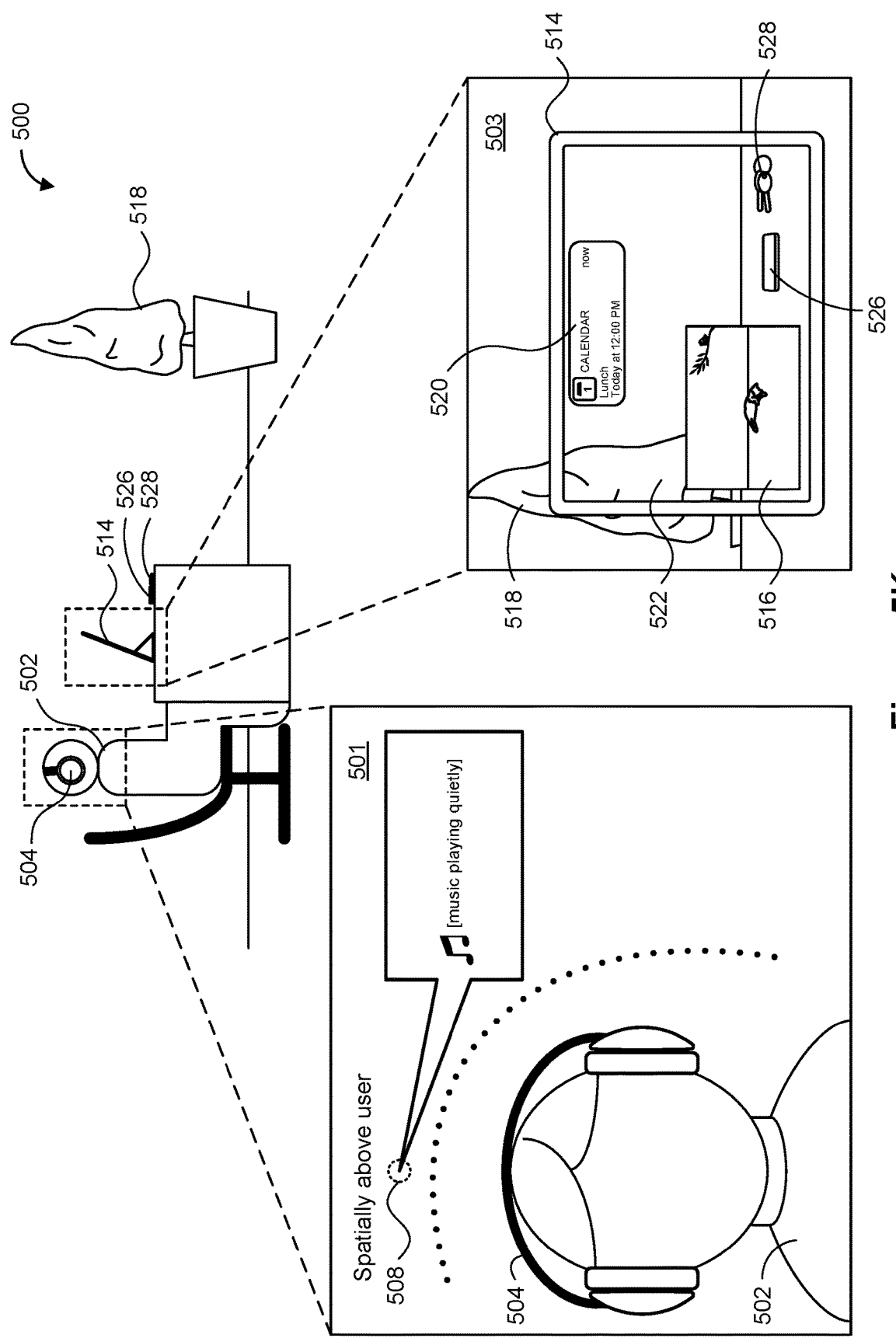

FIG. 5K illustrates a transition from FIG. 5J in accordance with some embodiments. In FIG. 5K, in response to the change in the pose of user 502 from reclining to sitting upright, the levels of immersion with respect to both video 516 displayed on device 514 and the music provided by headphones 504 are reduced. In particular, device 514 pauses playback of video 516, reduces the scale of video 516 so that video 516 is displayed (e.g., while paused) in an inset window, and moves the inset window to a corner of the display of device 514. Device 514 also displays live view 522 of physical environment 500 (e.g., from one or more cameras of device 514). In addition, headphones 504 move the simulated spatial location of the music so that the music sounds as if it is coming from simulated spatial location 508 above user 502's head, and decrease the volume at which the music is being played. In some embodiments, headphones 504 fade the music playback out completely, as described herein with reference to FIGS. 5B-5C.

Figure 5L:
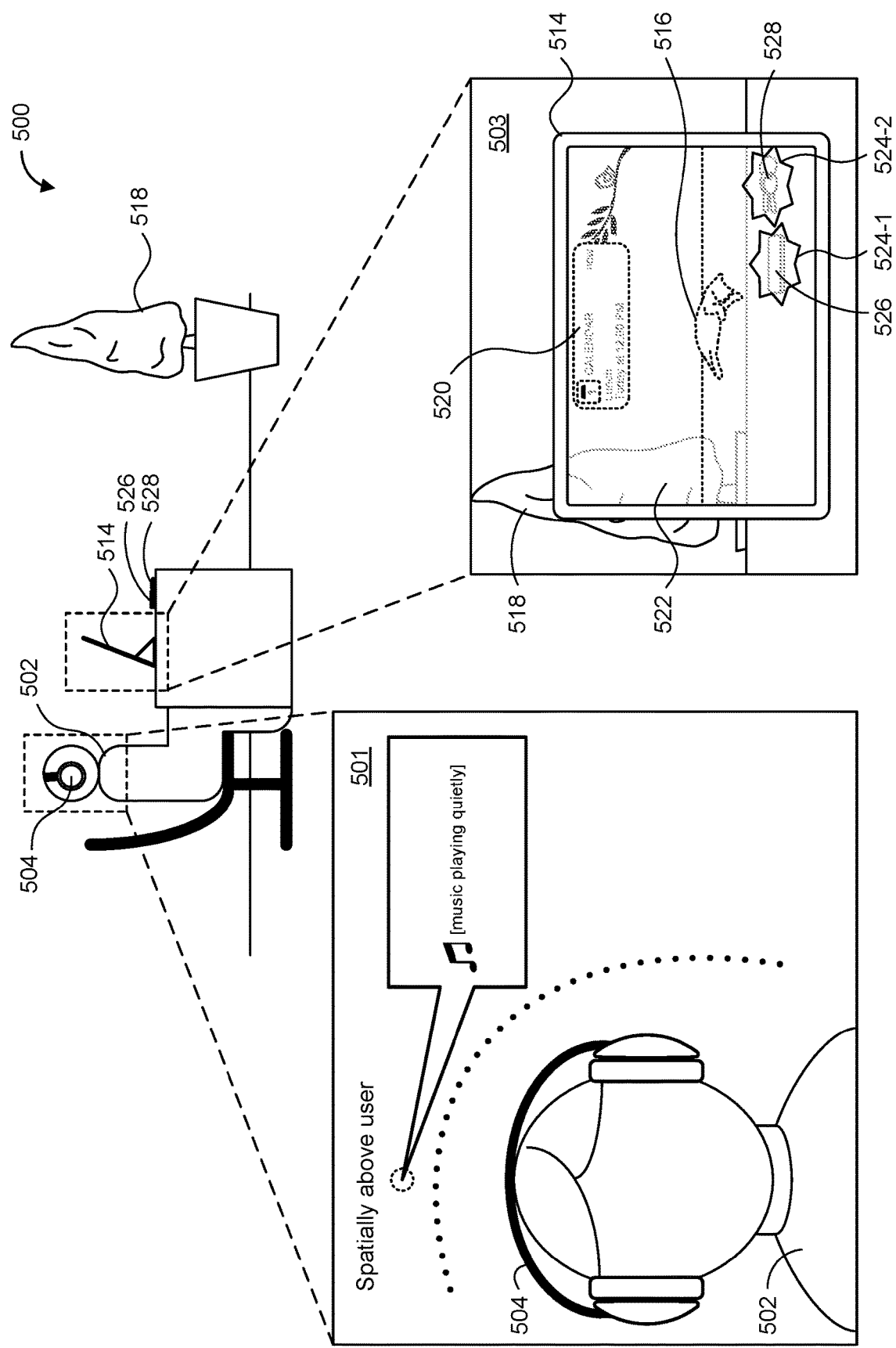

FIG. 5L illustrates an alternate transition from FIG. 5J in accordance with some embodiments. Like in FIG. 5K, in FIG. 5L, in response to the change in the pose of user 502 from reclining to sitting upright, the levels of immersion with respect to both video 516 displayed on device 514 and the music provided by headphones 504 are reduced, in part by device 514 pausing playback of video 516 and by headphones 504 moving the simulated spatial location of the music so that the music sounds as if it is coming from simulated spatial location 508 above user 502's head, and decreasing the volume at which the music is being played. However, in FIG. 5L, instead of shrinking video 516 to an inset window and moving video 516 to a corner of the display, device 514 increases the transparency of video 516 and displays at least a portion of live view 522 of physical environment 500 (e.g., from one or more cameras of device 514) so that the live view of physical environment 500 appears as if it is being viewed through a partially-transparent video 516. In addition, device 514 displays beacons 524-1 and 524-2 highlighting user 502's wallet 526 and keys 528, respectively, to help user 502 respond to notification 520 (e.g., to remind user 502 of items to take when leaving to attend the meeting indicated by notification 520).

FIGS. 6A-6J illustrate example adaptive audio outputs in response to example changes in the audio properties of a surrounding physical environment in accordance with some embodiments.

Figure 6A:
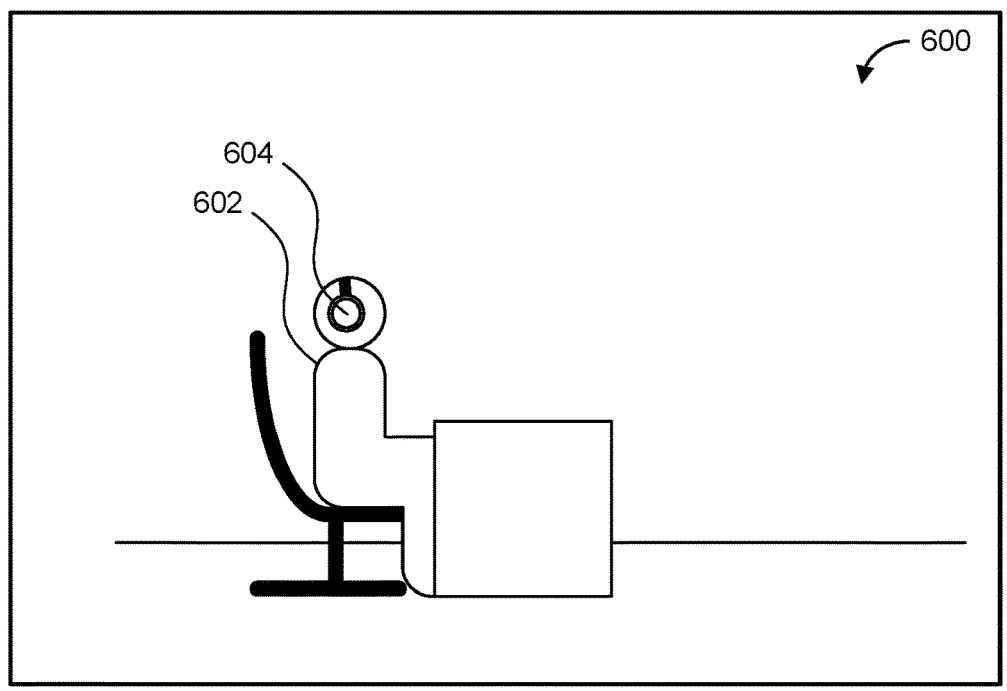
FIGS. 6A-6J illustrate example adaptive audio outputs in response to example changes in the audio properties of a surrounding physical environment in accordance with some embodiments.
Figure 6A:
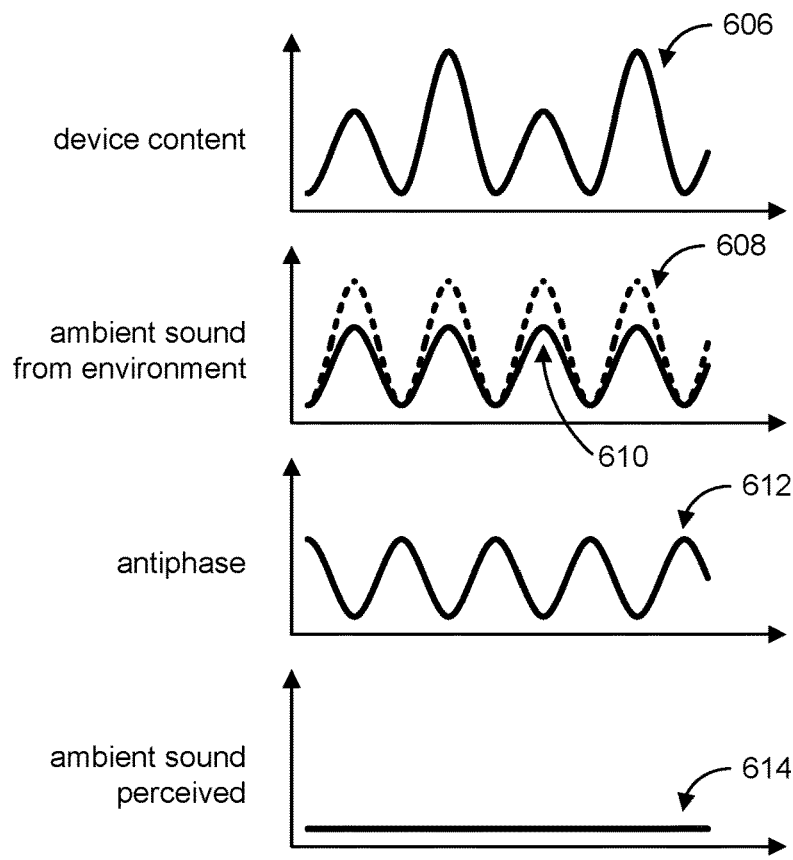

FIGS. 6A-6D illustrate changes in audio outputs provided by headphones worn by a user in response to increase and decreases in ambient sound, and particularly speech, in a physical environment surrounding the user. FIG. 6A illustrates user 602 seated and wearing headphones 604 in physical environment 600. Headphones 604 are in communication with an electronic device (e.g., device 100, FIG. 1A) and provide audio output corresponding to audio content from the device, represented by device content waveform 606. Ambient sound present in physical environment 600 is represented by ambient sound waveform 608. Ambient sound from physical environment 600 that is not completely blocked by headphones 604 (e.g., due to imperfect passive attenuation by headphones 604, as described herein with reference to FIG. 3C) and that can be heard inside the earcups of headphones 604 is represented by attenuated ambient sound waveform 610. In the example illustrated in FIG. 6A, the ambient sound present in physical environment 600 is considered to satisfy predefined audio output criteria (e.g., audio output criteria associated with providing device audio content, for example at a volume level selected by user 602 or automatically determined by headphones 604 or by the device in communication with headphones 604). In addition, active noise control is enabled for headphones 604, and thus a noise-cancelling signal, represented by antiphase waveform 612, is provided to cancel attenuated ambient sound waveform 610. As a result of the active noise control, no ambient sound is perceived by user 602, as indicated by perceived ambient sound waveform 614.

Figure 6B:
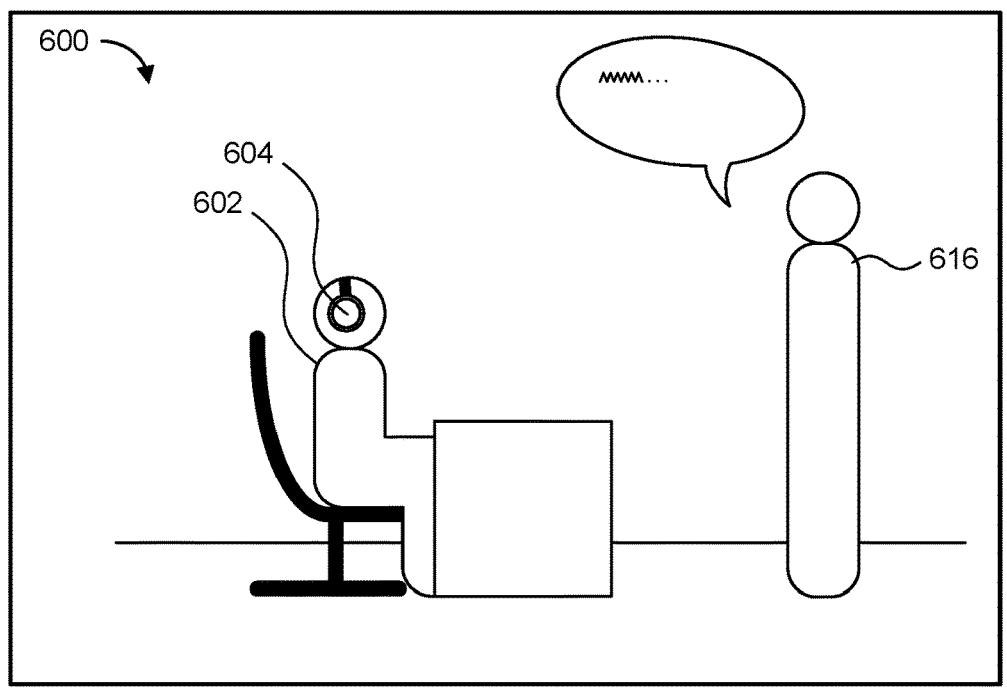
Figure 6B:
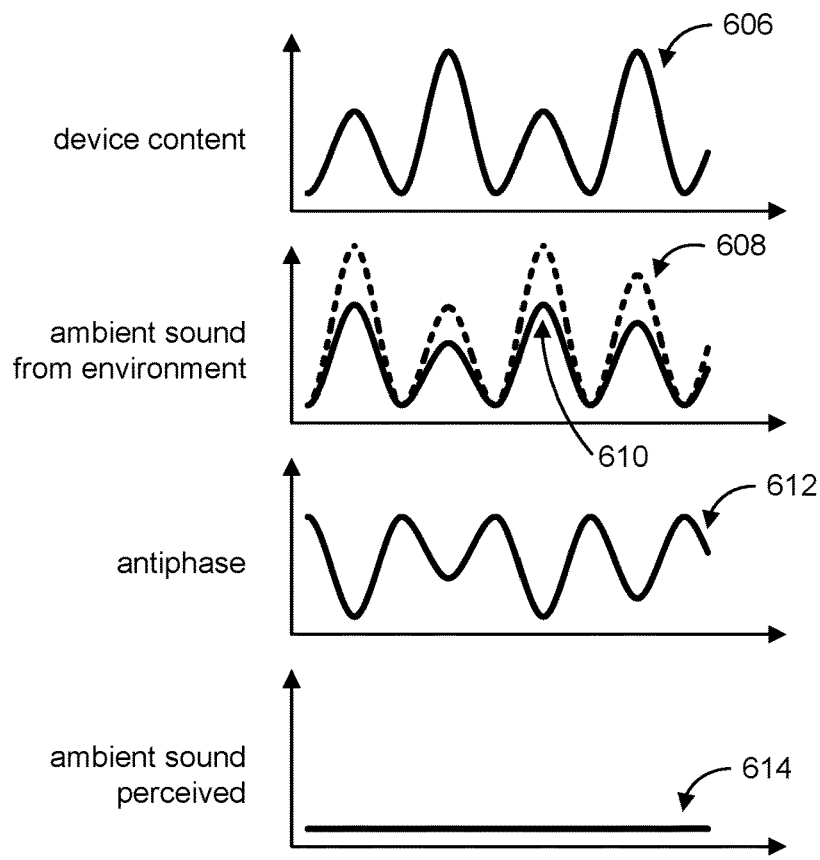
Figure 6C:
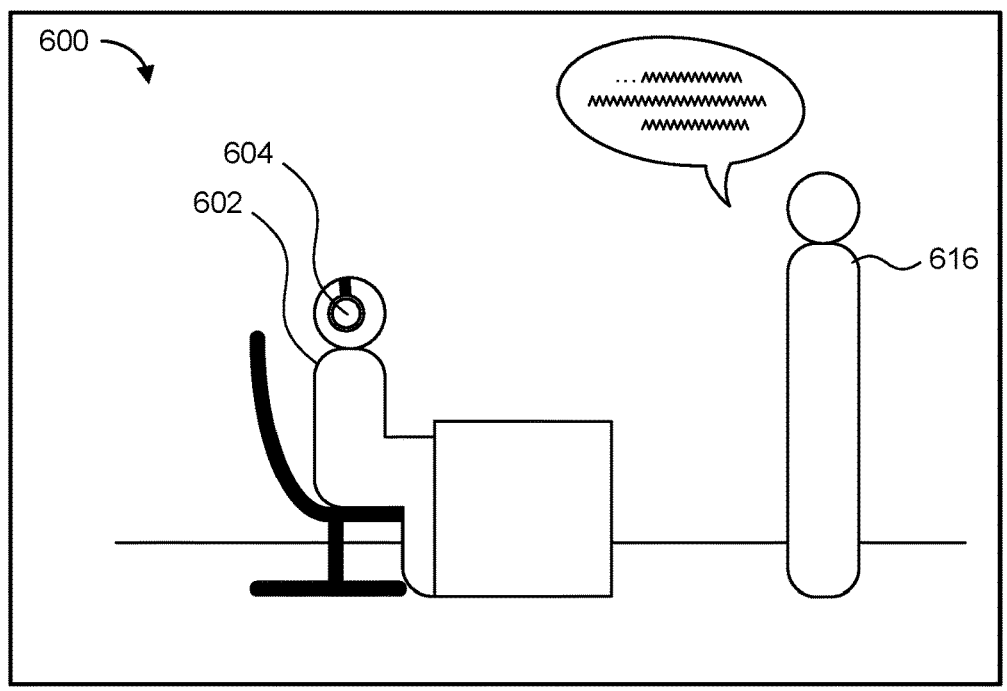
Figure 6C:
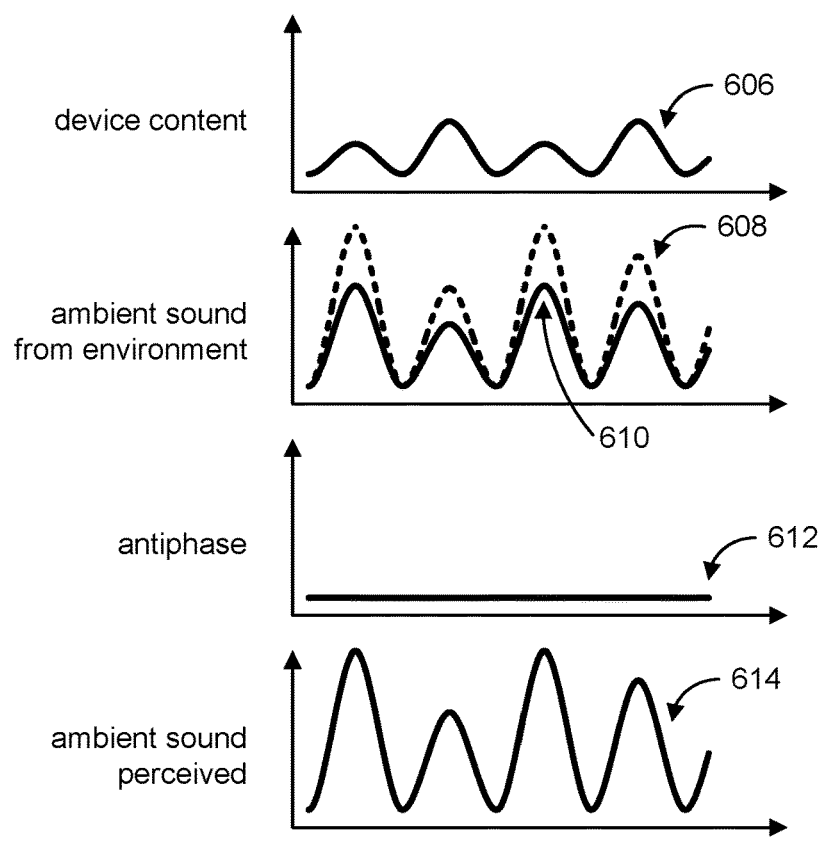

FIGS. 6B-6C illustrate a transition from FIG. 6A. In particular, FIG. 6B illustrates that another person 616 has approached user 602 and begun speaking to user 602. The increase in the ambient sound in physical environment 600 due to person 616 speaking is shown by ambient sound waveform 608 and by attenuated ambient sound waveform 610. As a result, the ambient sound present in physical environment 600 is no longer considered to satisfy the predefined audio output criteria (e.g., audio output criteria associated with providing device audio content). In some embodiments, the ambient sound present in physical environment 600 in FIGS. 6B-6C is considered to satisfy different, second predefined audio output criteria (e.g., audio output criteria associated with a bias toward ambient sound). Initially after person 616 begins speaking, headphones 604 continue to output audio content from the device, as shown by device content waveform 606, and also continue to cancel ambient sound, as shown by antiphase waveform 612. As a result, user 602 continues to hear device content without hearing ambient sound.

FIG. 6C illustrates modification of the audio outputs provided by headphones 604 in response to detecting the increase in ambient sound in physical environment 600 (here, due to person 616 speaking) and in response to the ambient sound in physical environment 600 no longer satisfying the predefined audio output criteria. Device content waveform 606 in FIG. 6C shows that the volume level of the audio content from the device is reduced relative to the level shown by device content waveform 606 in preceding FIG. 6B. Also, active noise control is disabled, as shown by antiphase waveform 612 in FIG. 6C. In addition, headphones 604 begin to actively pass through ambient sound from physical environment 600 (e.g., using a microphone, such as microphone 302-1, FIG. 3C, to acquire ambient sound from physical environment 600 that is outside the earcups of headphones 604), so that user 602 hears ambient sound at a volume level above the attenuated ambient sound level resulting from passive attenuation by headphones 604. In some embodiments, user 602 hears the ambient sound at a volume level that is approximately equal to (e.g., within 10 percent, 15 percent or 20 percent of) the volume level of the ambient sound in physical environment 600 (e.g., to reverse the attenuation by headphones 604, so that user 602 can hear and respond to sounds in physical environment 600 as if user 602 were not wearing headphones 604). In some embodiments, headphones 604 amplify the ambient sound from physical environment 600 so that user 602 hears the ambient sound at a volume level above the volume level of ambient sound in physical environment 600 (e.g., to assist users that are hard of hearing).

Figure 6D:
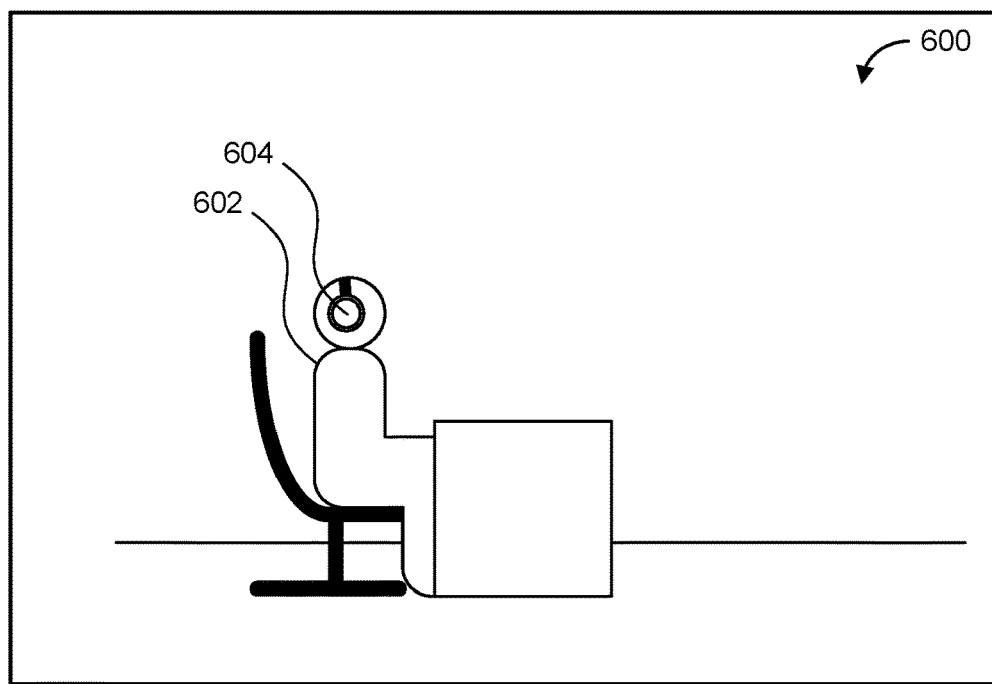
Figure 6D:
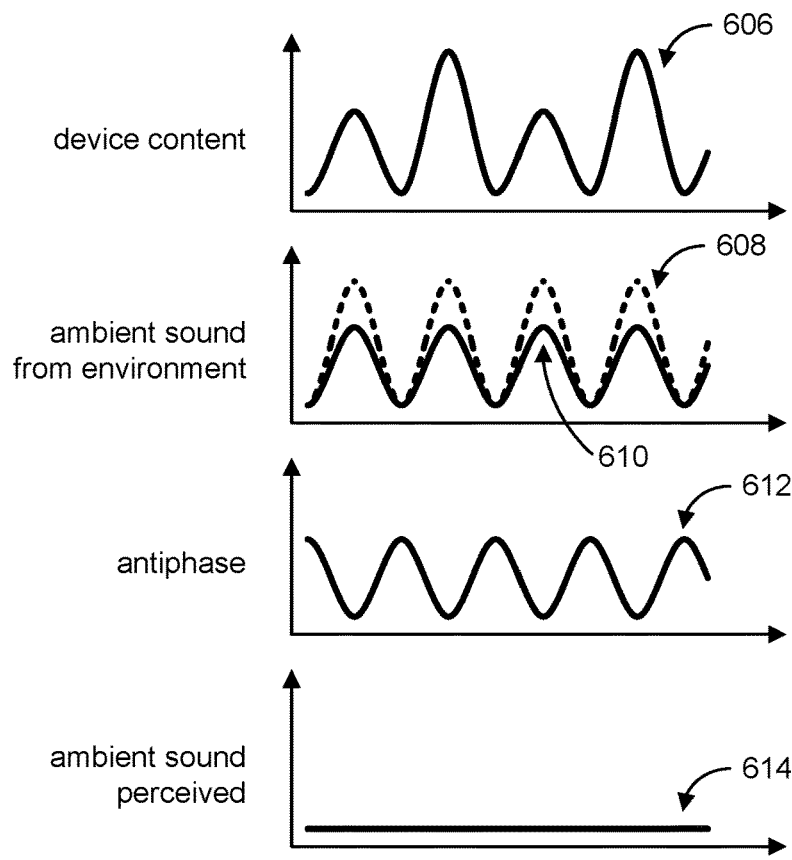

FIG. 6D illustrates a transition from FIG. 6C. In particular, FIG. 6D indicates that person 616 has stopped speaking and left physical environment 600. As a result, the ambient sound present in physical environment 600, as shown by ambient sound waveform 608, and the attenuated ambient sound, as shown by attenuated ambient sound waveform 610, return to the same volume levels as shown in FIG. 6A. Accordingly, the ambient sound present in physical environment 600 again satisfies the predefined audio output criteria. In some embodiments, the ambient sound present in physical environment 600 in FIG. 6D is considered to no longer satisfy the second predefined audio output criteria described with reference to FIGS. 6B-6C. In response, headphones 604 resume playback of the audio content from the device at the same volume level as in FIG. 6A, as shown by device content waveform 606 in FIG. 6D. Headphones 604 also resume active noise control, and accordingly resume generating a noise-cancelling signal, as shown by antiphase waveform 612, to cancel the attenuated ambient sound. As a result of the resumed active noise control, no ambient sound is perceived by user 602, as indicated by perceived ambient sound waveform 614.

Figure 6E:
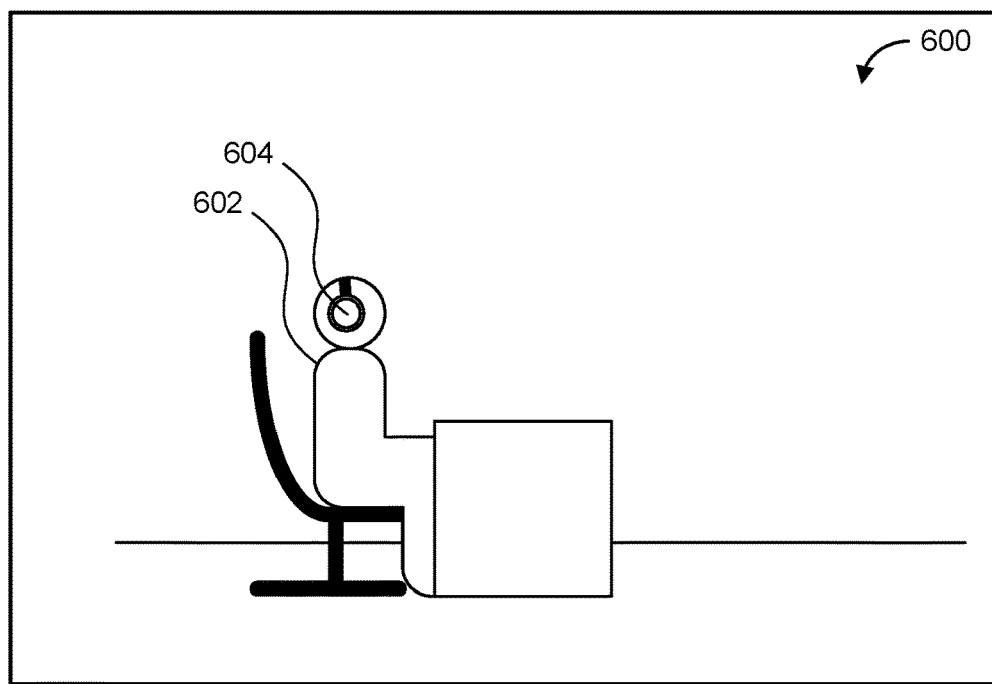
Figure 6E:
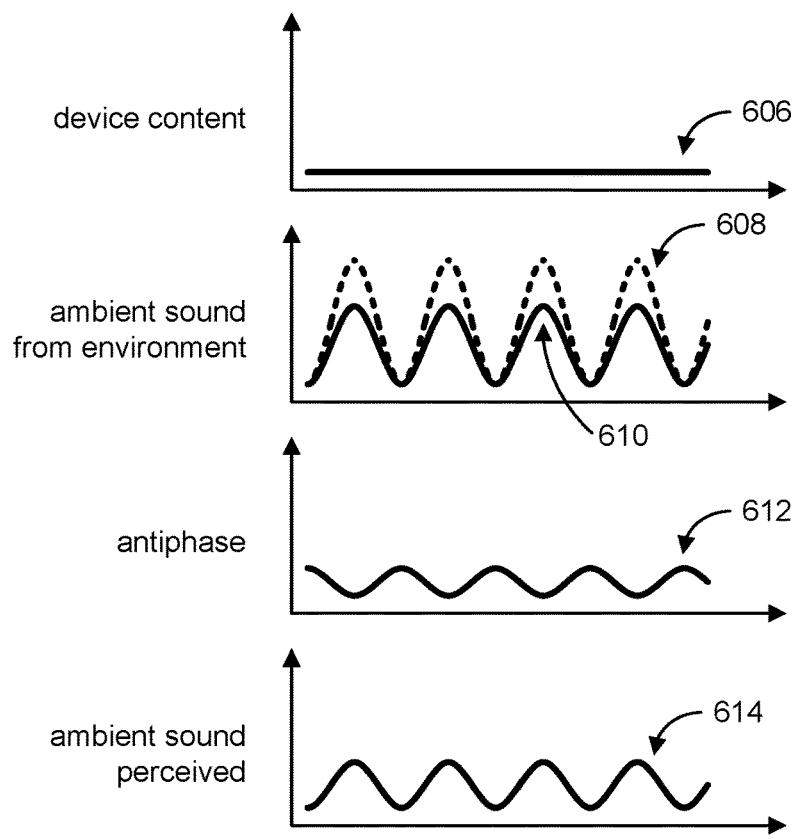

FIG. 6E illustrates an example scenario in which user 602 is not listening to audio content from a device (e.g., when using headphones 604 only for noise reduction and not for listening to audio content). Ambient sound present in physical environment 600 is shown by ambient sound waveform 608, and the attenuated ambient sound inside (e.g., the earcups of) headphones 604 (e.g., the ambient sound that is not blocked by headphones 604 as physical barriers over user 602's ears) is shown by attenuated ambient sound waveform 610. In FIG. 6E, because user 602 is not listening to audio content from the device, as shown by device content waveform 606, the balance between device audio content and ambient sound from physical environment 600 is biased more toward the ambient sound and less toward device audio content than in FIG. 6A, for example. Thus, instead of generating an antiphase signal that completely cancels out the attenuated ambient sound from physical environment 600 (as shown in FIG. 6A, for example), headphones 604 in FIG. 6E generate an antiphase signal, shown by antiphase waveform 612, that only partially cancels out attenuated ambient sound waveform 610. As a result, user 602 perceives some, but not all, of the attenuated ambient sound, as shown by perceived ambient sound waveform 614 (e.g., user 602 perceives some ambient sound, but at a volume level that is below the volume level of even the attenuated ambient sound).

Figure 6F:
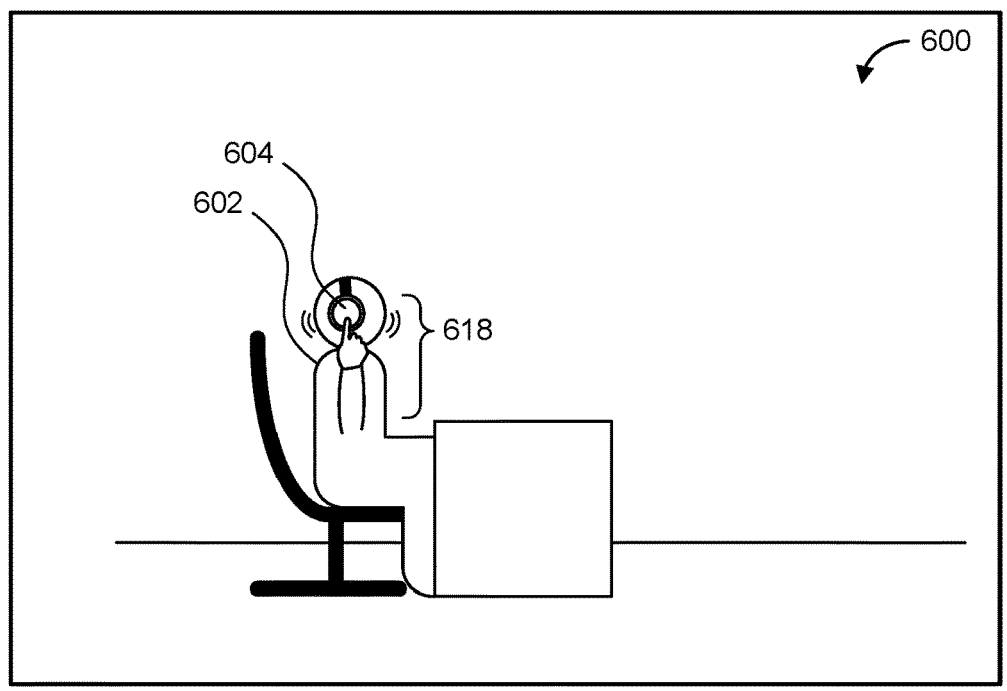
Figure 6F:
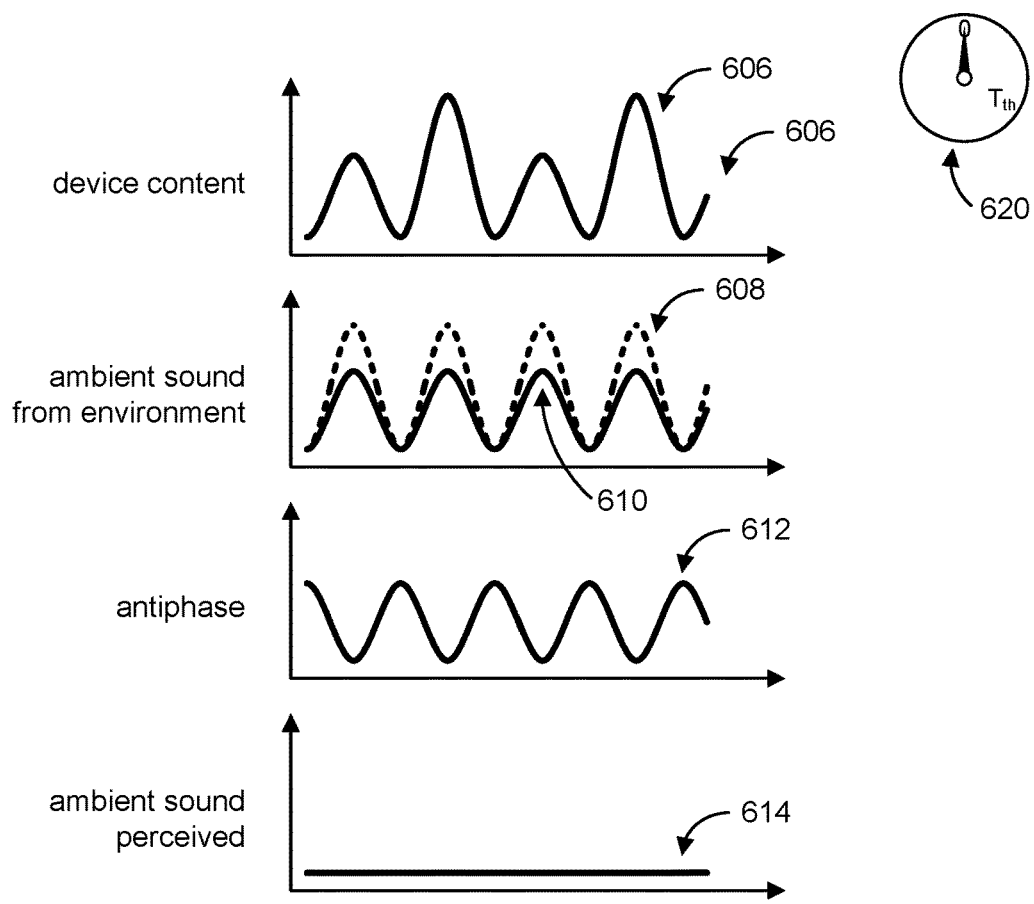

FIGS. 6F-6J illustrate initiating a temporary audio output state using an input gesture via headphones 604. In FIG. 6F, as in FIG. 6A, user 602 is seated and wearing headphones 604 in physical environment 600. User 602 is listening to device audio content, as shown by device content waveform 606. Ambient sound present in physical environment 600 is shown by ambient sound waveform 608, and the attenuated ambient sound inside headphones 604 is shown by attenuated ambient sound waveform 610. Headphones 604 also provide a noise-cancelling signal, shown by antiphase waveform 612, to cancel attenuated ambient sound waveform 610. As a result of the active noise control, no ambient sound is perceived by user 602, as indicated by perceived ambient sound waveform 614. In addition, FIG. 6F illustrates user 602 providing input 618 (e.g., a tap gesture) via headphones 604 at time t=0, as indicated by timer 620. As described in more detail herein with reference to FIGS. 6G-6J, input 618 initiates a temporary audio output state that lasts until time $t=T_{th}$ (e.g., for a duration $T_{th}$), as indicated by timer 620.

Figure 6G:
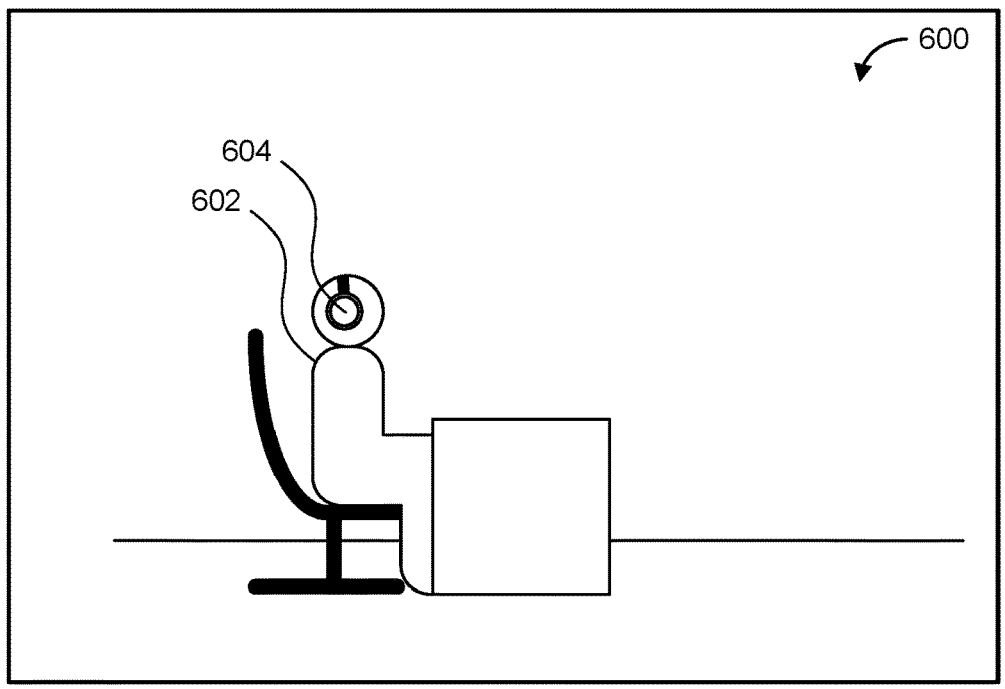
Figure 6G:
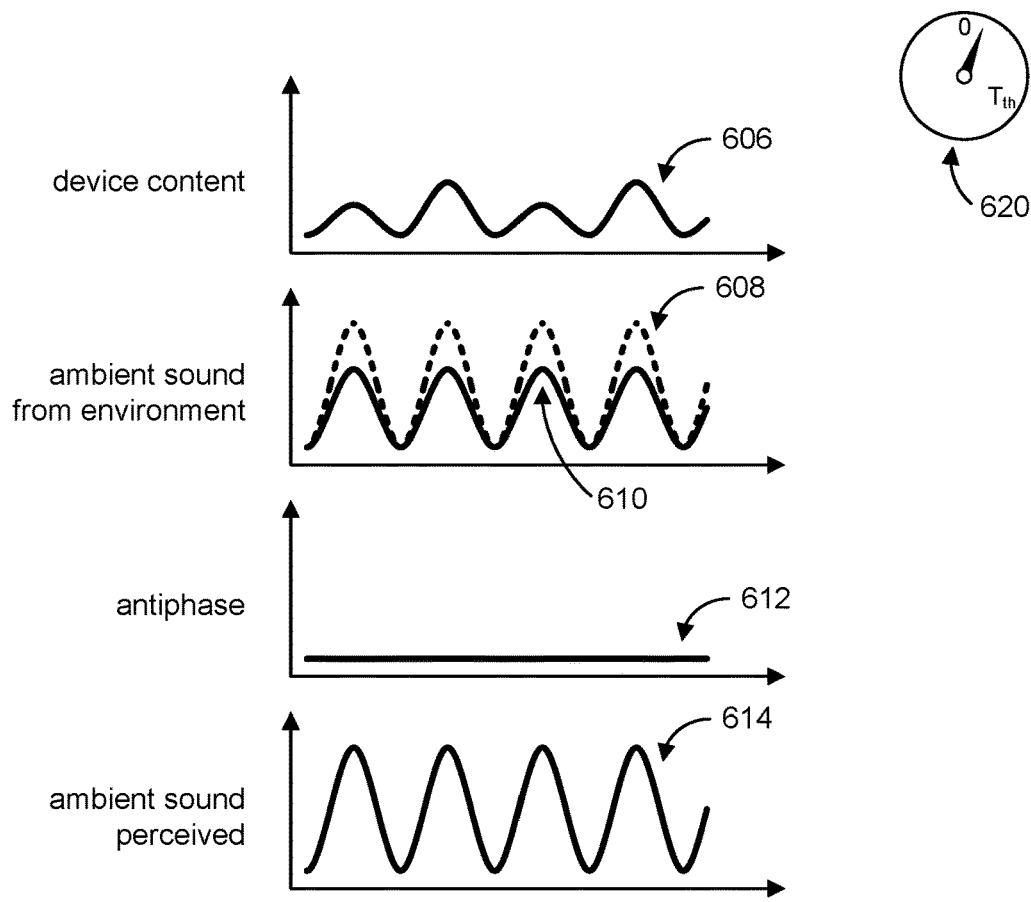

FIG. 6G illustrates a transition from FIG. 6F. In FIG. 6G, in response to detecting input 618 via headphones 604, headphones 604 transition to a temporary audio output state. In the temporary audio output state illustrated in FIG. 6G, the volume level of the device audio content is lowered, as shown by device content waveform 606, and active noise control is disabled, as shown by antiphase waveform 612. In addition, headphones 604 begin to actively pass through ambient sound from physical environment 600, so that user 602 hears ambient sound at a volume level that is above the attenuated ambient sound level resulting from passive attenuation by headphones 604 and that is approximately equal to (e.g., within 10 percent, 15 percent or 20 percent of) the actual volume level of ambient sound in physical environment 600, as shown by perceived ambient sound waveform 614.

Figure 6H:
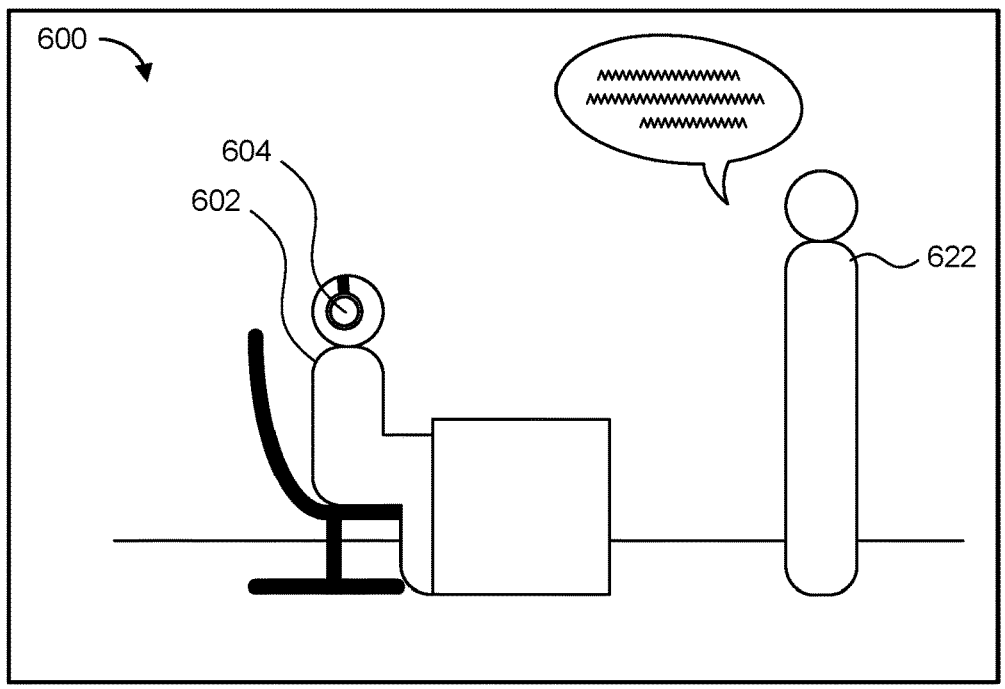
Figure 6H:
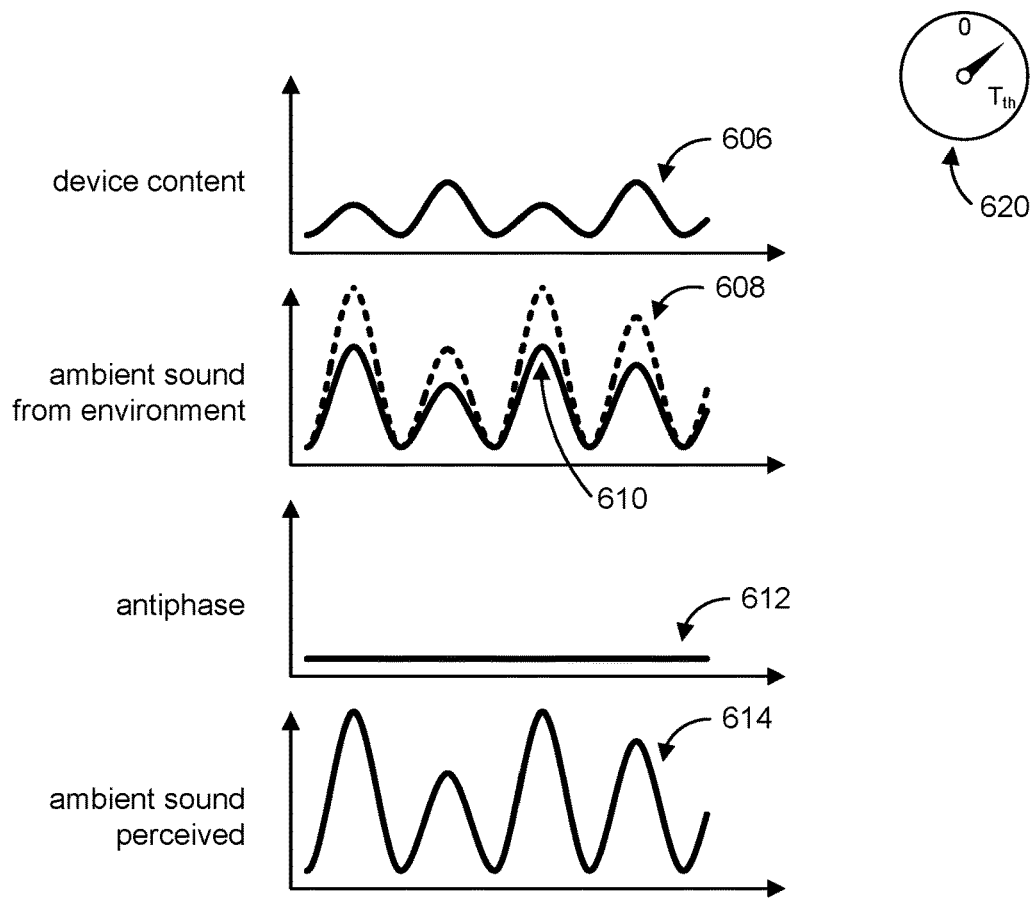

FIG. 6H illustrates a transition from FIG. 6G. In FIG. 6H, another person 622 has approached user 602 and is speaking to user 602. The increase in ambient sound in physical environment 600 due to person 622 speaking is shown by ambient sound waveform 608 and by attenuated ambient sound waveform 610. Because headphones 604 are in the temporary audio output state (e.g., because $t<T_{th}$, as indicated by timer 620), headphones 604 continue to output audio content from the device at a reduced volume level, as shown by device content waveform 606. Headphones 604 also continue to pass through ambient sound from physical environment 600 without active noise control, as shown by antiphase waveform 612. As a result, user 602 hears person 622 speaking and other ambient sound at a volume level that is above the attenuated ambient sound level resulting from passive attenuation by headphones 604 and that is approximately equal to (e.g., within 10 percent, 15 percent or 20 percent of) the actual volume level of speech and other ambient sound in physical environment 600, as shown by perceived ambient sound waveform 614.

Figure 6I:
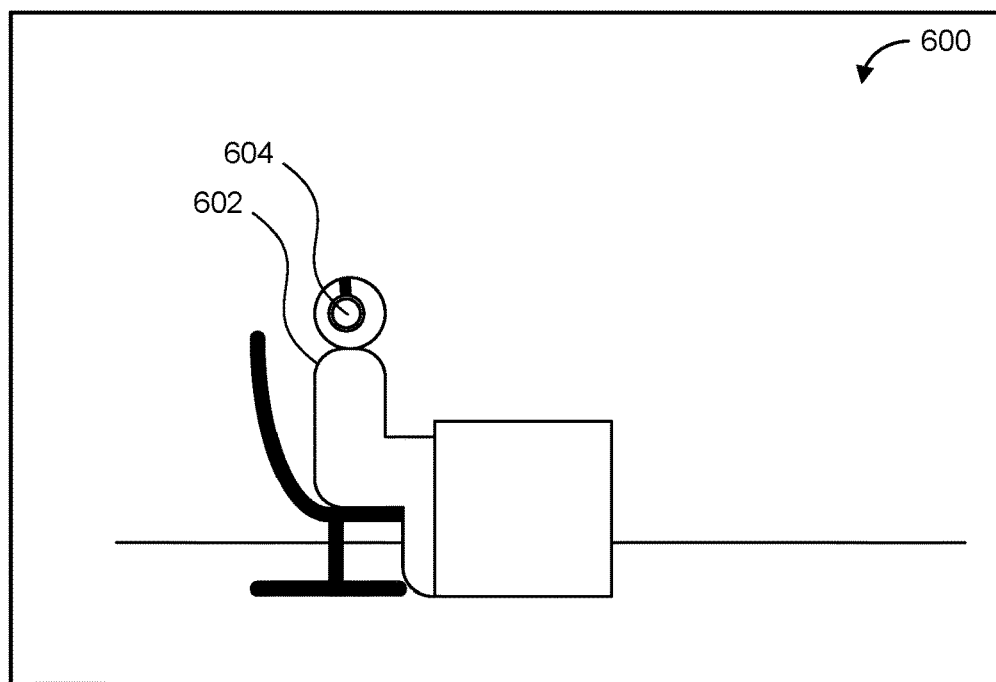
Figure 6I:
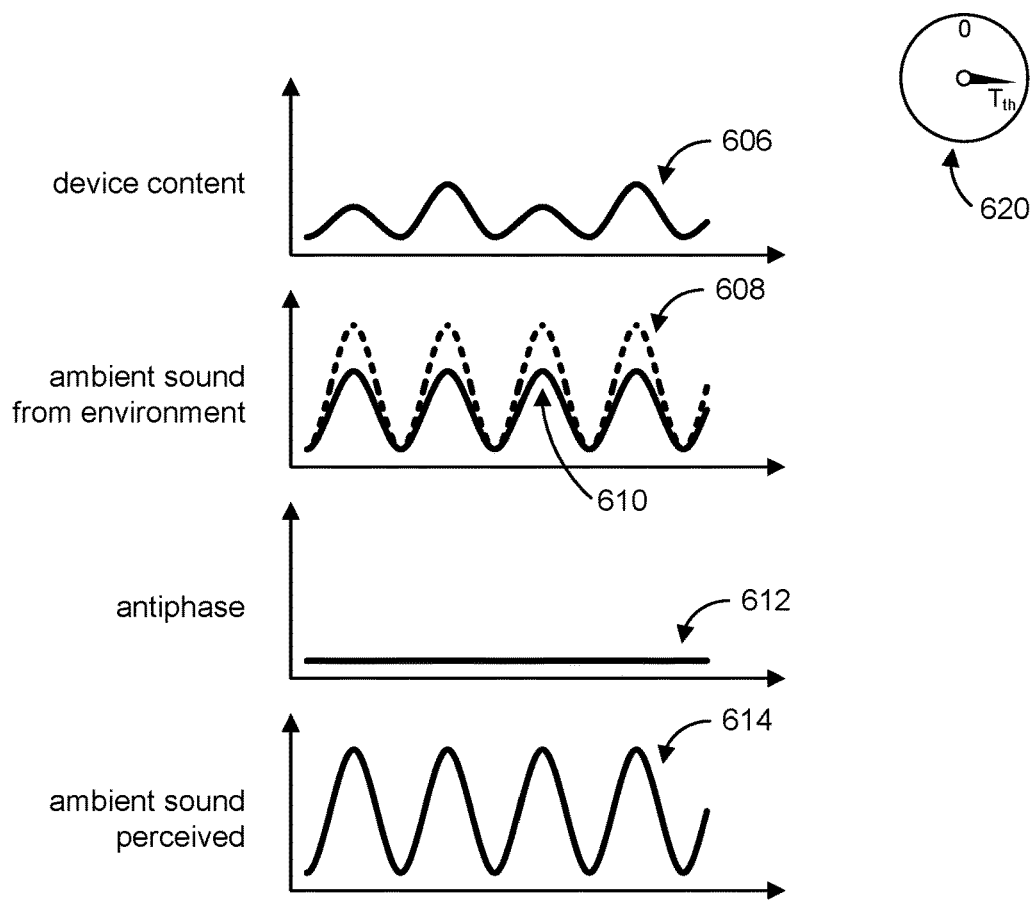

FIG. 6I illustrates a transition from FIG. 6H. In particular, FIG. 6I indicates that person 622 has stopped speaking and left physical environment 600. As a result, the ambient sound present in physical environment 600, as shown by ambient sound waveform 608, and the attenuated ambient sound, as shown by attenuated ambient sound waveform 610, return to the same volume levels as shown in FIG. 6G. In addition, because headphones 604 are still in the temporary audio output state (e.g., because $t<T_{th}$, as indicated by timer 620), headphones 604 continue to output audio content from the device at a reduced volume level, as shown by device content waveform 606. Headphones 604 also continue to pass through ambient sound from physical environment 600 without active noise control, as shown by antiphase waveform 612. As a result, user 602 hears ambient sound at a volume level that is above the attenuated ambient sound level resulting from passive attenuation by headphones 604 and that is approximately equal to (e.g., within 10 percent, 15 percent or 20 percent of) the actual volume level of ambient sound in physical environment 600, as shown by perceived ambient sound waveform 614.

Figure 6J:
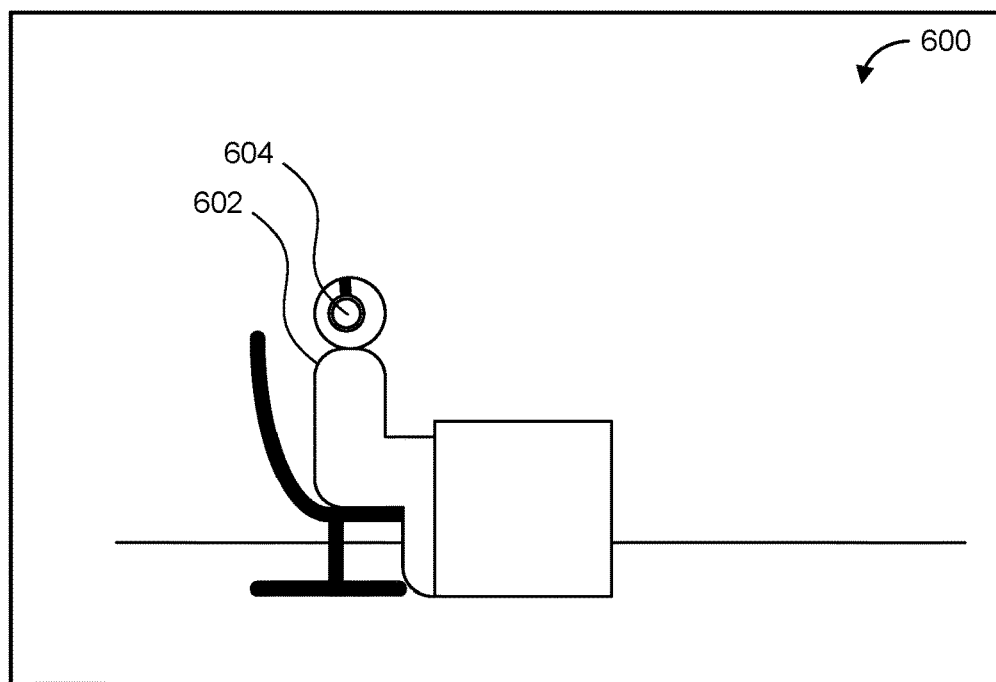
Figure 6J:
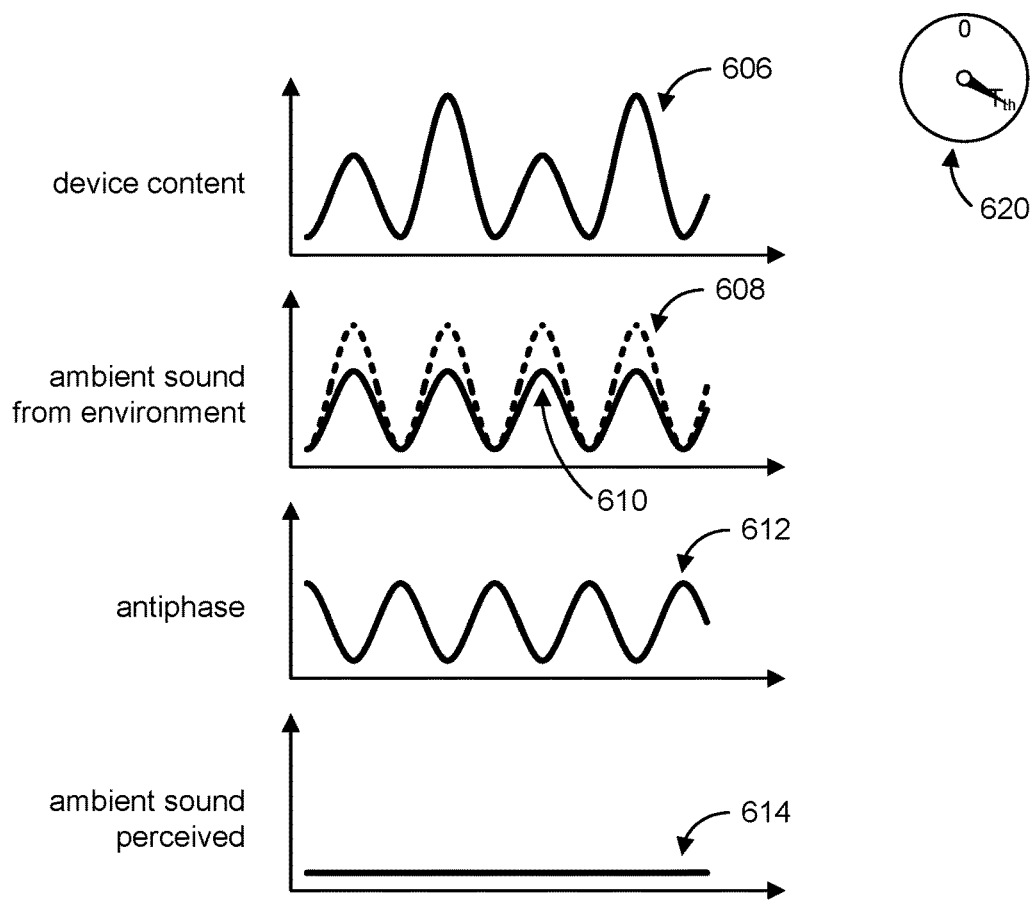

FIG. 6J illustrates a transition from FIG. 6I. In FIG. 6J, the temporary audio output state initiated by input 618 (FIG. 6F) has expired, as indicated by timer 620 showing $t=T_{th}$. As a result, headphones 604 resume providing audio outputs at the same volume levels as before the temporary audio output state was initiated. In particular, headphones 604 resume playback of device audio content at the same volume level as in FIG. 6F, as shown by device content waveform 606 in FIG. 6J. Headphones 604 also resume active noise control, and accordingly resume generating a noise-cancelling signal, as shown by antiphase waveform 612, to cancel the attenuated ambient sound. As a result of the resumed active noise control, no ambient sound is perceived by user 602, as indicated by perceived ambient sound waveform 614. In an example further transition from FIG. 6J, in which another person approaches and begins speaking to user 602 after the temporary audio output state has expired (and before another temporary audio output state is initiated), headphones 604 respond to the change in the ambient sound in physical environment 600 as described herein with reference to FIGS. 6A-6C.

FIGS. 7A-7B are flow diagrams illustrating method 700 of adaptively changing simulated spatial locations of audio outputs in response to changes in user pose in accordance with some embodiments. Method 700 is performed at an electronic device (e.g., portable multifunction device 100, FIG. 1A, device 300, FIG. 3A, or wearable audio output device 301, FIG. 3B) that includes or is in communication with one or more pose sensors for detecting a pose (e.g., orientation and/or position) of a user of the electronic device relative to a first physical environment, and that includes or is in communication with one or more audio output devices (e.g., speaker 111, FIG. 1A, or speaker(s) 306 of wearable audio output device 301, FIG. 3B). In some embodiments, the pose sensors include one or more cameras (e.g., optical sensor(s) 164, FIG. 1A or sensor(s) 359, FIG. 3A), gyroscopes, inertial measurement units, or other sensors (e.g., accelerometer(s) 168, FIG. 1A or sensor(s) 359, FIG. 3A) that enable the electronic device to detect changes in an orientation (also called attitude) and/or position of the user. In some embodiments, the electronic device detects changes in the pose of the user by detecting changes in the orientation and/or position of the electronic device or of component(s) of the electronic device (e.g., a display generation component, such as touch-sensitive display system 112 in FIG. 1A, display 340 in FIG. 3A, a projector, a heads-up display, a head-mounted display, etc.). In some embodiments, the electronic device detects changes in the pose of the user by detecting changes in the orientation and/or position of component(s) with which the electronic device is in communication and that are held or worn by the user (e.g., using pose sensor(s) 304 of wearable audio output device 301, FIG. 3B), relative to a physical environment in which the electronic device is located. Some operations in method 700 are, optionally, combined and/or the order of some operations is, optionally, changed.

As described below, method 700 provides audio outputs in an intuitive manner by varying output properties of the audio output, such as spatial location, volume, content, etc. of the audio output, in response to changes in a user's pose (e.g., position and/or orientation). It is noted that spatial location, sometimes called simulated spatial location, is a perceptual property of audio outputs. Spatial location can be controlled or varied using well known audio synthesis techniques, so as to make audio outputs be perceived as coming from a particular spatial location in three-dimensional space that is different from the physical location of the speakers that produce the audio outputs. Generally, at least two speakers are required to vary the spatial location of an audio output. Varying output properties of audio output, such as by moving the simulated spatial location of the audio output, in response to changes in user pose allows for the manner in which audio output is provided to be dynamically adjusted to be better suited for the current activity of the user, without requiring additional input from the user. Providing an adaptive and more intuitive user experience while reducing the number of inputs needed to achieve such an experience enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

While a first pose of the user meets first presentation criteria (702), the device provides (704) audio content at a first simulated spatial location relative to the user. In some embodiments, the audio is provided via one or more audio output devices (e.g., wearable audio output device 301, FIG. 3B) that are in communication with (and, in some embodiments, separate from) the electronic device. In some embodiments, the pose of the user corresponds to and indicates that the user is in a particular position (e.g., lying down, reclining/leaning back, sitting, or standing). In some embodiments, the pose of the user meets the first presentation criteria when the first pose of the user is in a predefined range or set of poses (e.g., corresponding to a particular position of the user, such as when the user is reclined to within a predefined angular range with respect to horizontal). For example, as described herein with reference to FIG. 5A, FIG. 5A illustrates audio content being provided in simulation spatial region 506 while user 502 is sitting upright. In some embodiments, the pose of the user meets the first presentation criteria when the user is in a particular type of space (e.g., a private space). For example, as described herein with reference to FIG. 5G, FIG. 5G illustrates audio content being provided in simulated spatial region 506 while user 502 is in private space 512.

The device detects (706) a change in the pose of the user from the first pose to a second pose. In some embodiments, the first pose of the user is (708) one of a lying down pose, a sitting pose, and a standing pose, and the second pose of the user is a different one of a lying down pose, a sitting pose, and a standing pose. In some embodiments, the user changes pose when moving between standing, sitting, and lying down positions. For example, as described herein with reference to FIGS. 5A-5B, FIGS. 5A-5B illustrate a change in the pose of user 502 from sitting (FIG. 5A) to standing (FIG. 5B). In another example, as described herein with reference to FIGS. 5I-5K, FIGS. 5I-5K illustrate a change in the pose of user 502 from reclining (FIG. 5I) to sitting upright (FIGS. 5J-5K).

In some embodiments, the degree of immersion of the provided audio is highest when a user is lying down, and lowest when a user is standing up or moving about the physical environment. In some circumstances, when a user is lying down, audio is provided at one or more simulated spatial locations inside or surrounding the user's head, such that the audio sounds as though it were coming from or being played inside or surrounding the user's head. In some other circumstances, when a user stands up, the audio is provided at a simulated spatial location above the user's head, such that the audio sounds as though it were coming from or being played above the user's head, and optionally at a lower volume.

In some embodiments where a simulated three-dimensional environment that includes one or more virtual objects is displayed on, or using, a display generation component in conjunction with providing audio at a respective simulated spatial location, the degree of immersion of the displayed simulated three-dimensional environment is highest when a user is lying down, and lowest when a user is standing up or moving about the physical environment. In some circumstances, when a user is lying down, the simulated three-dimensional environment includes more virtual objects and fewer (or no) representations of physical objects in the physical environment. In other circumstances, when a user sits up from a lying down position, the electronic device ceases to display at least a portion of one or more virtual objects and/or displays representations of additional portions of the physical environment (e.g., displaying additional representations of physical objects in the physical environment). In other circumstances, when a user stands up, the electronic device ceases to display even more virtual objects or portions of virtual objects and/or displays representations of even more of the physical environment.

Moving the simulated spatial location at which audio content is provided based on changes in user pose between lying down, sitting, and/or standing allows for the manner in which audio output is provided to be dynamically adjusted to be better suited for the current activity of the user (e.g., inferred based on whether the user is lying down, sitting, or standing), without requiring additional input from the user. Providing an adaptive and more intuitive user experience while reducing the number of inputs needed to achieve such an experience enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, detecting the change in the pose of the user includes (710) detecting a change in the position of the user from the first physical environment to a second physical environment that is different from the first physical environment (e.g., movement of the user from one room in a building to a different room in a building; or movement of the user from a first type of physical environment to a second type of physical environment, such as between private and public spaces, for example from a bedroom to a living room or vice versa). For example, as described herein with reference to FIGS. 5F-5G, FIGS. 5F-5G illustrate a change in the pose of user 502 through movement of user 502 from public space 510 to private space 512.

Moving the simulated spatial location at which audio content is provided based on movement of the user between private and public spaces allows for the manner in which audio output is provided to be dynamically adjusted to be better suited for the current environment of the user (e.g., inferred based on whether the user is in a public space, in which less audio immersion is typically wanted, or in a private space, in which greater audio immersion is typically wanted), without requiring additional input from the user. Providing an adaptive and more intuitive user experience while reducing the number of inputs needed to achieve such an experience enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In response to detecting the change in the pose of the user, and in accordance with a determination that the second pose of the user does not meet the first presentation criteria (712), the device provides (714) audio content at a second simulated spatial location relative to the user that is different from the first simulated spatial location (e.g., via the one or more audio output devices). For example, as described herein with reference to FIGS. 5A-5B, 5F-5G, and 5I-5K, the simulated spatial location of the audio output (e.g., music) is moved in response to detected changes in user pose. In some embodiments, the provided audio corresponds to audio content from the electronic device. In some embodiments, the audio content is stored on the electronic device. In some embodiments, the audio content is obtained by the electronic device from an external source (e.g., the Internet, a content streaming source, or the like). In some embodiments, the audio content from the electronic device is distinct from sound in the physical environment (e.g., sound detected via a microphone directed toward the physical environment).

In some embodiments, the second simulated spatial location is (716) above the user. In some embodiments, providing the audio at the second simulated spatial location includes providing the audio so that the audio sounds as though it were coming from above the user. For example, as described herein with reference to FIGS. 5B, 5F, and 5K, audio output (e.g., music) is provided at simulated spatial location 508 that is above user 502's head. Moving the simulated spatial location at which audio content is provided to a simulated spatial location above the user in response to a change in user pose reduces the level of immersion of the provided audio content so that the user can better interact with the surrounding physical environment, without requiring additional input from the user. Providing an adaptive and more intuitive user experience while reducing the number of inputs needed to achieve such an experience enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the device detects (718) a change in the pose of the user from the second pose to a third pose, and, in response to detecting the change in the pose of the user from the second pose to the third pose, and in accordance with a determination that the third pose of the user meets the first presentation criteria, the device provides audio content at the first simulated spatial location relative to the user. For example, as described herein with reference to FIGS. 5C-5D, FIGS. 5C-5D illustrate user resuming a seated pose (FIG. 5D) after previously assuming a standing pose (e.g., FIGS. 5B-5C illustrating user 502 standing up from being seated as illustrated in FIG. 5A). In response, and because user 502's seated pose in FIG. 5D also meets the presentation criteria (e.g., that were previously met by user 502's seated pose in FIG. 5A), the simulated spatial location of the audio output being provided is moved back to simulated spatial region 506. In some embodiments, the third pose is the same as the first pose. In some embodiments, in conjunction with providing the audio content at the first simulated spatial location relative to the user, the device provides (or, in some embodiments, resumes providing) video content.

Moving the simulated spatial location at which audio content is provided to a previous location in response to the user resuming a corresponding previous pose allows for the manner in which audio output is provided to be dynamically adjusted to be better suited for the current environment of the user, without requiring additional input from the user. Providing an adaptive and more intuitive user experience while reducing the number of inputs needed to achieve such an experience enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the device detects (720), via one or more microphones (e.g., microphone 113, FIG. 1A or microphone(s) 302, FIG. 3B), sound in the physical environment. For example, as described herein with reference to FIG. 6B, FIG. 6B illustrates detection of an increase in sound (e.g., due to person 616 beginning to speak) in physical environment 600. In some embodiments, providing the audio content at the second simulated spatial location includes reducing an output level of the audio content relative to the detected sound from the physical environment. In some embodiments, reducing the output level of the provided audio content relative to the detected sound from the physical environment includes reducing a volume of the provided audio content. For example, as described herein with reference to FIG. 6C, FIG. 6C illustrates reduction of the volume of device audio content. In some embodiments, the audio content is paused (e.g., after at least a portion of the audio content is provided at the second simulation spatial location). In some embodiments, reducing the output level of the provided audio content relative to the detected sound from the physical environment includes reducing an amount of noise-cancellation (e.g., reducing or ceasing to provide audio configured to cancel ambient sound, sometimes called "antiphase" audio). For example, as described herein with reference to FIG. 6C, FIG. 6C illustrates that active noise control has been disabled. In some embodiments, reducing the output level of the provided audio content relative to the detected sound from the physical environment includes providing (e.g., beginning to provide, or increasing an amount of) audio corresponding to the detected sound from the physical environment (e.g., by actively providing at least a portion of the detected sound from the physical environment). For example, as described herein with reference to FIG. 6C, FIG. 6C illustrates active passthrough of ambient sound from physical environment 600.

In some embodiments, the output level of the provided audio content is reduced relative to the detected sound from the physical environment gradually (e.g., the audio content gradually fades away). In some embodiments, the simulated spatial location of the provided audio content is changed from the first simulated spatial location to the second spatial location gradually (e.g., the audio content sounds as if it is moving gradually to a different simulated spatial location). In some embodiments, the gradual reduction in the output level of the provided audio content relative to the detected sound from the physical environment is performed in concert with gradually changing the simulated spatial location of the provided audio content from the first simulated spatial location to the second simulated spatial location (e.g., the audio content sounds as if it is moving gradually to a different simulated spatial location while also fading away).

Reducing an output level (such as the volume) of provided audio content relative to sound detected in the surrounding physical environment reduces the level of immersion of the provided audio content so that the user can better interact with the surrounding physical environment, without requiring additional input from the user. Providing an adaptive and more intuitive user experience while reducing the number of inputs needed to achieve such an experience enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the device determines (722) an event associated with the change in the pose of the user from the first pose to the second pose (e.g., the device determines an event that occurred immediately or within a predefined time period prior to detecting the change in the user's pose, that can be inferred to have caused the user to change pose), and, in response to detecting the change in the pose of the user, and in accordance with the determination that the second pose of the user does not meet the first presentation criteria, the device performs an operation to assist the user to respond to the event. In some examples, the event includes another person entering the room and speaking (e.g., to the user), and the operation performed to assist the user to respond to the event includes ceasing to provide at least a portion of media content being provided (e.g., lowering the volume of or pausing audio being played, increasing transparency of or pausing and/or ceasing to display a video being presented, etc.). In other examples, the event includes a notification, such as an alert for an upcoming calendar event, and the operation performed to assist the user to respond to the event includes operations such as displaying details for the upcoming calendar event, launching a maps application with navigation directions to the location of the upcoming calendar event, and/or providing reminders of one or more physical objects to retrieve for the upcoming calendar event (e.g., keys, wallet, coat, and/or items needed at the upcoming calendar event). For example, as described herein with reference to FIGS. 5I-5J and 5L, FIGS. 5I-5J illustrate user 502 changing pose by sitting up from a reclined pose in response to notification 520, and FIG. 5L illustrates display of beacons 524-1 and 524-2 to help user 502 respond to the event, notification 520, that prompted user 502 to change pose.

Assisting the user to respond to an event that caused the user to change pose, such as by providing reminders of physical objects to take along to a meeting, or reducing a level of immersion of provided audio and/or video content, allows for the manner in which audio and/or visual outputs are provided to be dynamically adjusted to be better suited for the current activity of the user, and helps the user to better interact with the surrounding physical environment, without requiring additional input from the user. Providing an adaptive and more intuitive user experience while reducing the number of inputs needed to achieve such an experience enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the electronic device includes (or is in communication with) a display generation component (e.g., a display such as display 340 in FIG. 3A, a touchscreen such as touch-sensitive display system 112 in FIG. 1A, a projector, a heads-up display, a head-mounted display, etc.). In some embodiments, while the first pose of the user meets the first presentation criteria (724), the device displays, via the display generation component, video content corresponding to the audio content, and, in response to detecting the change in the pose of the user, and in accordance with a determination that the second pose of the user does not meet the first presentation criteria, the device ceases to display at least a portion of the video content (e.g., by pausing playback of the video content). For example, as described herein with reference to FIGS. 5H-5L, FIGS. 5H-5I illustrates playback of video 516 while user 502 is reclined, and, in response to user 502 sitting up in FIG. 5J, playback of video 516 is paused, as shown in FIGS. 5J-5L. In some embodiments, the video content corresponding to the audio content is stored on the electronic device, optionally in conjunction with the audio content. In some embodiments, the video content is obtained by the electronic device from an external source (e.g., the Internet, a content streaming source, or the like), optionally in conjunction with the audio content. In some embodiments, the video content is distinct from a view (e.g., a representation) of the physical environment (e.g., a live view of a camera directed toward the physical environment). For example, video 516 (FIG. 5K) is distinct from live view 522 (FIG. 5K).

Where video content is provided in conjunction with providing corresponding audio content, ceasing to display at least a portion of the video content in response to changes in user pose reduces the level of immersion of the provided video content to help the user readjust to and better interact with the surrounding physical environment, without requiring additional input from the user. Providing an adaptive and more intuitive user experience while reducing the number of inputs needed to achieve such an experience enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments where the electronic device includes a display generation component, while the first pose of the user meets the first presentation criteria (726), the device displays, via the display generation component, a simulated three-dimensional environment that includes one or more virtual objects, and, in response to detecting the change in the pose of the user, and in accordance with a determination that the second pose of the user does not meet the first presentation criteria, the device ceases to display at least a portion of one or more virtual objects in the simulated three-dimensional environment. For example, as described herein with reference to FIGS. 5H-5L, FIGS. 5H-5I illustrates playback of video 516 (e.g., as a full-screen virtual object in a simulated three-dimensional environment) while user 502 is reclined, and, in response to user 502 sitting up in FIG. 5J, playback of video 516 is paused, as shown in FIGS. 5J-5L, and, optionally, the transparency of video 516 is increased, as shown in FIG. 5L.

Where a simulated three-dimensional environment (e.g., an augmented and/or virtual reality environment) is provided in conjunction with providing corresponding audio content, ceasing to display at least a portion of the video content in response to changes in user pose reduces the level of immersion of the simulated three-dimensional environment to help the user readjust to and better interact with the surrounding physical environment, without requiring additional input from the user. Providing an adaptive and more intuitive user experience while reducing the number of inputs needed to achieve such an experience enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, in response to detecting the change in the pose of the user (728), and in accordance with the determination that the second pose of the user does not meet the first presentation criteria, the device displays, via the display generation component, a representation of at least a portion of the first physical environment. For example, as described herein with reference to FIGS. 5J-5L, in response to user 502 sitting up in FIG. 5J, live view 522 is at least partially displayed, as shown in FIGS. 5K-5L. In some embodiments, the electronic device displays representations (e.g., live views) of physical objects in the first physical environment (e.g., plant 518, wallet 526, and keys 528, FIGS. 5K-5L). In some embodiments, the electronic device displays an animated transition from the simulated three-dimensional environment to the representation of at least the portion of the physical environment. In some embodiments, the electronic device increases an apparent transparency of video content and/or other virtual objects displayed in the simulated three-dimensional environment in conjunction with displaying the representation of at least the portion of the first physical environment (e.g., to create the illusion that the physical environment is becoming visible "through" the video content and/or other virtual objects). For example, FIG. 5L illustrates that the transparency of video 516 (which in some embodiments is considered to be a virtual object) has been increased so that live view 522 of physical environment 500, including physical objects plant 518, wallet 526, and keys 528, are at least partially visible "through" video 516.

Displaying a representation (e.g., a live view from a camera) of at least a portion of a surrounding physical environment in response to changes in user pose reduces the level of immersion of a displayed simulated three-dimensional environment or other displayed user interface to help the user readjust to and better interact with the surrounding physical environment, without requiring additional input from the user. Providing an adaptive and more intuitive user experience while reducing the number of inputs needed to achieve such an experience enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, in response to detecting the change in the pose of the user (730), and in accordance with the determination that the second pose of the user does not meet the first presentation criteria, the device changes respective positions of one or more virtual objects in the simulated three-dimensional environment. In some embodiments, the one or more virtual objects are moved out of a particular area in the simulated three-dimensional environment (e.g., so as to clear an area for displaying/viewing a live view of the physical environment). In some embodiments, where video content is displayed in the simulated three-dimensional environment, the video content is displayed at a first location (e.g., a location in a direction that the user is facing) while the first pose of the user meets the first presentation criteria. In some embodiments, in response to detecting the change in the pose of the user to a second pose that does not meet the first presentation criteria, the video content is moved to a second location (e.g., location above or to the side of an area in the direction that the user is facing). For example, as described herein with reference to FIGS. 5J-5K, in response to user 502 sitting up in FIG. 5J, video 516 is scaled down and moved to a corner of the displayed simulated three-dimensional environment, as shown in FIG. 5K.

Moving the positions of one or more virtual objects displayed in a simulated three-dimensional environment in response to changes in user pose (e.g., so as to clear an area for displaying a live view of the surrounding physical environment) reduces the level of immersion of the displayed simulated three-dimensional environment to help the user readjust to and better interact with the surrounding physical environment, without requiring additional input from the user. Providing an adaptive and more intuitive user experience while reducing the number of inputs needed to achieve such an experience enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

It should be understood that the particular order in which the operations in FIGS. 7A-7B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 800) are also applicable in an analogous manner to method 700 described above with respect to FIGS. 7A-7B. For example, the audio outputs, simulated spatial locations, and physical environments described above with reference to method 700 optionally have one or more of the characteristics of the poses, presentation criteria, audio content, simulated spatial locations, and physical environments described herein with reference to other methods described herein (e.g., method 800). For brevity, these details are not repeated here.

FIGS. 8A-8B are flow diagrams illustrating method 800 of adaptively changing audio output levels in response to changes in the audio properties of a surrounding physical environment in accordance with some embodiments. Method 800 is performed at one or more wearable audio output devices (e.g., wearable audio output device 301, FIG. 3B) that are in a respective physical environment and that are in communication (e.g., via a wireless connection, via a wired connection, or integrated) with an electronic device (e.g., portable multifunction device 100, FIG. 1A or device 300, FIG. 3). Some operations in method 800 are, optionally, combined and/or the order of some operations is, optionally, changed.

As described below, method 800 provides audio outputs in an intuitive manner by adjusting the levels of different audio components in an audio output in response to changes in the audio properties of the surrounding physical environment. In some examples, the provided audio output is automatically adjusted to allow the user to hear more ambient sound when speech (or an increase in speech) is detected in the surrounding physical environment. Varying the levels of different audio components, and the balance between the different audio components, in an audio output allows for the manner in which audio output is provided to be dynamically adjusted to be better suited to the current state of the surrounding physical environment, without requiring additional input from the user. Providing an adaptive and more intuitive user experience while reducing the number of inputs needed to achieve such an experience enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

While one or more audio properties of the respective physical environment satisfy first audio criteria (802), the wearable audio output device(s) provide audio output corresponding to the first audio criteria. In some embodiments, the one or more audio properties of the respective physical environment satisfy the first audio criteria when the respective physical environment includes a respective type of sound, such as white noise, or when an energy density of sound (e.g., corresponding to a respective range of frequencies, and/or within a respective moving window of time) in the respective physical environment meets a predefined threshold. The provided audio output includes: audio corresponding to audio content from the electronic device at a first device-content audio level; and audio corresponding to ambient sound from the respective physical environment at a first ambient-sound audio level. In some embodiments, the ambient-sound audio level (e.g., of the audio corresponding to ambient sound from the respective physical environment) is zero (e.g., no ambient sound is being actively passed through by the one or more wearable audio output devices, although a user wearing the one or more wearable audio output devices may perceive some ambient sound due to imperfect passive attenuation by the wearable audio output devices). For example, as described herein with reference to FIG. 6A, while the ambient sound present in physical environment 600 satisfies predefined audio output criteria, headphones 604 provide device audio content at the level shown by device content waveform 606 in FIG. 6A, and do not actively pass through ambient sound from physical environment 600. In another example, as described herein with reference to FIG. 6C, while the ambient sound present in physical environment 600 satisfies different (e.g., second) predefined audio output criteria, headphones 604 provide device audio content at the level shown by device content waveform 606 in FIG. 6C, and actively pass through ambient sound from physical environment (e.g., at a non-zero level), as described with reference to perceived ambient sound waveform 614.

The wearable audio output device(s) detect (804) a change in the one or more audio properties of the respective physical environment. In some embodiments, detecting a change in the one or more audio properties of the respective physical environment includes detecting a change in speech relative to the ambient sound (e.g., detecting an increase in speech corresponding to a person speaking or beginning to speak, or detecting a decrease in speech corresponding to a person finishing speaking). For example, as described herein with reference to FIG. 6B, FIG. 6B illustrates an increase in speech by person 616 in physical environment 600. In another example, as described herein with reference to FIG. 6D, FIG. 6D illustrates a decrease in speech in physical environment 600.

In response to detecting the change in the one or more audio properties of the respective physical environment (806), the wearable audio output device(s) provide audio corresponding to ambient sound from the respective physical environment at a second ambient-sound audio level that is different from the first ambient-sound audio level. For example, as described herein with reference to FIGS. 6B-6C, in response to detecting the increase in speech by person 616, headphones 604 change (e.g., increase) the level at which ambient sound from physical environment 600 is provided to user 602, in part by beginning to pass through ambient sound from physical environment 600, as described with reference to perceived ambient sound waveform 614 in FIG. 6C. In another example, as described herein with reference to FIG. 6D, in response to detecting the decrease in speech by person 616, headphones 604 change (e.g., decrease) the level at which ambient sound from physical environment 600 is provided to user 602, in part by ceasing to pass through ambient sound from physical environment 600, as described with reference to perceived ambient sound waveform 614 in FIG. 6D.

In some embodiments, the detecting and adjusting are performed using hardware circuitry and/or software modules on the one or more wearable audio output devices for better responsiveness to changes in the physical environment. In some examples, detecting the change in the one or more audio properties of the respective physical environment includes detecting an increase in speech in the physical environment, and the second ambient-sound audio level is greater than the first ambient-sound audio level (e.g., the amount of ambient sound passed through from the physical environment is increased in response to detecting an increase in speech in the physical environment, as described herein with reference to FIGS. 6B-6C).

In some embodiments, in response to detecting the change in the one or more audio properties of the respective physical environment (808), the wearable audio output device(s) provide audio corresponding to audio content from the electronic device at a second device-content audio level that is different from the first device-content audio level. In some embodiments where detecting the change in the one or more audio properties of the physical environment includes detecting an increase in (e.g., beginning of) speech, the device-content audio level (e.g., of the audio corresponding to audio content from the electronic device) is decreased (e.g., to a lower device-content audio level above zero) or in some cases paused (e.g., the device-content audio level is decreased to zero). For example, as described herein with reference to FIGS. 6B-6C, in response to detecting the increase in speech by person 616, headphones 604 change (e.g., decrease) the level at which audio content from the device is provided, as described with reference to device content waveform 606 in FIG. 6C. In some embodiments where detecting the change in the one or more audio properties of the physical environment includes detecting a decrease in (e.g., end of) speech, the device-content audio level (e.g., of the audio corresponding to audio content from the electronic device) is increased (e.g., from a lower device-content audio level above zero to a higher device-content audio level) or in some cases resumed (e.g., the device-content audio level is increased from zero). For example, as described herein with reference to FIG. 6D, in response to detecting the decrease in speech by person 616, headphones 604 change (e.g., increase) the level at which audio content from the electronic device is provided, as described with reference to device content waveform 606 in FIG. 6D.

Changing the level of provided audio content from a device in response to changes in the audio properties of the surrounding physical environment balances the user's ability to hear provided device audio content against the user's ability to interact with the surrounding physical environment, without requiring additional input from the user.

Providing an adaptive and more intuitive user experience while reducing the number of inputs needed to achieve such an experience enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the one or more wearable audio output devices include one or more pose sensors (e.g., pose sensor(s) 304, FIG. 3B) for detecting a pose of the one or more wearable audio output devices. In some embodiments, the one or more pose sensors include one or more gyroscopes, inertial measurement units, or other sensors that enable the one or more wearable audio output devices to detect changes in an orientation and/or position of the one or more wearable audio output devices or of component(s) of the one or more wearable audio output devices (e.g., when worn by a user), relative to a physical environment in which the one or more wearable audio output devices are located. In some embodiments, the wearable audio output device(s) detect a change in the pose of the wearable audio output device(s), and the audio corresponding to ambient sound from the respective physical environment is provided at the second ambient-sound audio level further in response to detecting the change in the pose of the one or more wearable audio output devices (e.g., in addition to being provided in response to detecting the change in the one or more audio properties of the respective physical environment). For example, the audio outputs described herein with reference to FIGS. 5A-5L can include different types of audio (e.g., device audio content, ambient audio, or antiphase audio), as described herein with reference to FIGS. 6A-6J, and the volume levels of the different types of audio can be changed in response to changes in user pose (e.g., as described herein with reference to FIGS. 5A-5B, 5F-5G, and 5I-5K) instead of or in addition to being changed in response to changes in the audio properties of the surrounding physical environment).

Adjusting the levels of different audio components in an audio output in response to changes in user pose (as well as changes in the audio properties of the surrounding physical environment) allows for the manner in which audio output is provided to be dynamically adjusted to be better suited for the current activity of the user (in addition to being better suited to the current state of the surrounding physical environment), without requiring additional input from the user. Providing an adaptive and more intuitive user experience while reducing the number of inputs needed to achieve such an experience enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, while the one or more audio properties of the respective physical environment satisfy the first audio criteria (812), the audio output further includes audio configured to cancel at least a portion of ambient sound from the respective physical environment at a first audio-cancelling audio level. In some embodiments, the audio at the first audio-cancelling audio level is greater than zero, and configured to cancel at least a portion of ambient sound from the respective physical environment that otherwise would be perceived by the user due to imperfect passive attenuation by the wearable audio output devices, even if the ambient-sound audio level for audio actively provided by the one or more wearable audio output devices is zero. For example, as described herein with reference to FIG. 6A, antiphase waveform 612 is provided and configured to cancel attenuated ambient sound waveform 610, even when headphones 604 are not actively passing ambient sound through from physical environment 600. In some embodiments, in response to detecting the change in the one or more audio properties of the respective physical environment, the wearable audio output device(s) provide audio configured to cancel at least a portion of ambient sound from the respective physical environment at a second audio-cancelling audio level that is different from the first audio-cancelling audio level.

In some embodiments where detecting the change in the one or more audio properties of the physical environment includes detecting an increase in (e.g., beginning of) speech, the audio-cancelling audio level (e.g., of the audio configured to cancel at least a portion of ambient sound from the respective physical environment) is decreased (e.g., to a lower audio-cancelling audio level above zero) or in some cases stopped (e.g., the audio-cancelling audio level is decreased to zero). For example, as described herein with reference to FIGS. 6B-6C, in response to detecting the increase in speech by person 616, headphones 604 decrease (e.g., to zero) the level of antiphase audio that is provided, as described with reference to antiphase waveform 612. In some embodiments where detecting the change in the one or more audio properties of the physical environment includes detecting a decrease in (e.g., end of) speech, the audio-cancelling audio level (e.g., of the audio configured to cancel at least a portion of ambient sound from the respective physical environment) is increased (e.g., from a lower audio-cancelling audio level above zero to a higher audio-cancelling audio level) or in some cases resumed (e.g., the audio-cancelling audio level is increased from zero). For example, as described herein with reference to FIG. 6D, in response to detecting the decrease in speech by person 616, headphones 604 increase the level of antiphase audio that is provided, as described with reference to antiphase waveform 612.

Changing the level of noise-cancellation in response to changes in the audio properties of the surrounding physical environment balances the amount of noise reduction against the user's ability to interact with the surrounding physical environment, without requiring additional input from the user. Providing an adaptive and more intuitive user experience while reducing the number of inputs needed to achieve such an experience enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, detecting the change in the one or more audio properties of the respective physical environment includes (814) detecting an increase in speech in the physical environment, and, in response to detecting the change in the one or more audio properties of the respective physical environment, the second audio-cancelling audio level is zero. Stated another way, in some embodiments, in response to detecting an increase in speech in the physical environment, the one or more wearable audio output devices stop providing the audio configured to cancel at least a portion of ambient sound. For example, as described herein with reference to FIGS. 6B-6C, in response to detecting the increase in speech by person 616, headphones 604 decrease the level of antiphase audio that is provided to zero, as described with reference to antiphase waveform 612. Turning off noise-cancellation (e.g., reducing the level of noise-cancellation to zero) in response to detecting an increase in speech in the surrounding physical environment helps the user to better interact with the surrounding physical environment, without requiring additional input from the user. Providing an adaptive and more intuitive user experience while reducing the number of inputs needed to achieve such an experience enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the audio configured to cancel at least a portion of ambient sound from the respective physical environment is (816) based on an amount by which ambient sound from the respective physical environment is reduced by the one or more wearable audio output devices when worn by a user. In some embodiments, the one or more wearable audio output devices determine the amount by which ambient sound from the respective physical environment is reduced by the one or more wearable audio output devices when worn by a user (sometimes called "passive attenuation") and use the determined amount in generating the audio configured to cancel ambient sound (sometimes called "antiphase" audio). In some embodiments, the one or more wearable audio output devices include one or more sensors for determining the passive attenuation of the one or more wearable audio output devices. For example, as described herein with reference to FIG. 3C, where the one or more wearable audio output devices are over-ear headphones, the headphones include one or more first sensors configured to measure ambient sound in the respective physical environment and one or more second sensors configured to measure ambient sound perceivable by the user when wearing the one or more wearable audio output devices. In some embodiments, the one or more first sensors include one or more microphones (e.g., microphone(s) 302-1, FIG. 3C) measuring ambient sound outside the headphone earcup(s) (e.g., represented by waveform 322, FIG. 3C). In some embodiments, the one or more second sensors include one or more microphones (e.g., microphone(s) 302-2, FIG. 3C) measuring ambient sound inside the headphone earcup(s) (e.g., due to imperfect passive attenuation by the headphones and earcup(s) when worn by the user, represented by waveform 324, FIG. 3C) that is distinct from audio generated by and provided by the headphones (e.g., distinct from device audio content, antiphase audio, and passthrough audio).

Taking into account the level of passive attenuation (e.g., provided by headphones as physical barriers over a user's ears) when providing noise-cancelling audio improves the noise-cancelling effect and reduces overcompensation for ambient sound, which in turn reduces overuse of audio circuitry. Providing an improved user experience and protecting audio circuitry enhances the operability of the device and makes the user-device interface more efficient (e.g., by helping the user to achieve an intended outcome and reducing user mistakes when operating/interacting with the device), and, additionally, reduces power usage and improves battery life of the device by enabling the user to use the device more quickly and efficiently.

In some embodiments, while providing audio corresponding to audio content from the electronic device (818), audio corresponding to ambient sound from the respective physical environment is provided at an ambient-sound audio level that is lower than an ambient-sound audio level at which audio corresponding to ambient sound from the respective physical environment is provided while not providing audio corresponding to audio content from the electronic device. For example, as described herein with reference to FIG. 6A in comparison with FIG. 6E, when providing device audio content (e.g., shown by device content waveform 606, FIG. 6A), the amount of ambient sound that is perceived (e.g., shown by perceived ambient sound waveform 614, FIG. 6A) is less than the amount of ambient sound that is perceived (e.g., shown by perceived ambient sound waveform 614, FIG. 6E) when not providing device audio content (e.g., shown by device content waveform 606, FIG. 6E). One of ordinary skill will recognize that changing the ambient-sound audio level may be achieved by reducing the amount of noise-cancellation and/or increasing the amount of audio passthrough.

Providing less ambient sound when a user is listening to device audio content, compared to the amount of ambient sound provided when a user is not listening to device content, balances the user's ability to hear provided audio content against the user's ability to interact with the surrounding physical environment, without requiring additional input from the user. Providing an adaptive and more intuitive user experience while reducing the number of inputs needed to achieve such an experience enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, prior to detecting a second change in the one or more audio properties of the respective physical environment (820), the wearable audio output device(s) detect a user input via the one or more wearable audio output devices (e.g., a gesture, such as a tap or swipe, performed on the one or more wearable audio output devices). For example, as described herein with reference to FIG. 6F, input 618 is detected via headphones 604.

In some embodiments, in response to detecting the user input, the one or more wearable audio output devices change one or more respective audio levels of respective audio, for example to one or more respective preset audio levels. For example, if a user input is detected while device-content audio and ambient-sound audio are being provided at respective levels determined (e.g., automatically, by the one or more wearable audio output devices) based on audio properties of the respective physical environment (e.g., as described herein with reference to FIG. 6F), the one or more wearable audio output devices temporarily change the audio level of the device-content audio (e.g., as described herein with reference to FIG. 6G) to a predefined device-content audio level (e.g., set by a user using an audio settings user interface on the electronic device), and the audio level of the ambient-sound audio to a predefined ambient-sound audio level (e.g., set by a user using the audio settings user interface on the electronic device). In some embodiments, after a predefined time period since detecting the user input, the device reverts the respective audio levels of the device-content audio and the ambient-sound audio from the predefined (e.g., user-set) levels to levels determined (e.g., automatically) based on audio properties of the respective physical environment (e.g., as described herein with reference to FIG. 6J). In some embodiments, regardless of whether the one or more wearable audio output devices initially change the respective audio levels of the provided audio to predefined levels in response to detecting the input, generally, detecting the user input causes the one or more wearable audio output devices to forgo changing (e.g., automatically) the respective audio levels of the provided audio during the predefined time period since detecting the input (e.g., as described herein with reference to FIGS. 6G-6I).

In some embodiments, the wearable audio output device(s) detect the second change in the one or more audio properties of the respective physical environment. In some embodiments, in accordance with a determination that the second change in the one or more audio properties of the respective physical environment is detected after a predefined time period since detecting the user input (e.g., a time period that begins when the input is detected), the wearable audio output device(s) change a respective audio level of respective audio (e.g., by changing the device-content audio level of audio corresponding to audio content from the electronic device, changing the ambient-sound audio level of audio corresponding to ambient sound from the respective physical environment, and/or changing the audio-cancelling audio level of audio configured to cancel at least a portion of ambient sound from the respective physical environment). For example, as described herein with reference to FIG. 6J, detecting subsequent speech after the temporary audio output state has expired (and before another temporary audio output state is initiated) results in changes to respective audio levels of respective audio provided by headphones 604 as described herein with reference to FIGS. 6A-6C.

In some embodiments, in accordance with a determination that the second change in the one or more audio properties of the respective physical environment (e.g., person 622 speaking, FIG. 6H) is detected within the predefined time period since detecting the user input (e.g., before time $T_{th}$, FIG. 6H), the wearable audio output device(s) forgo changing the respective audio level of the respective audio (e.g., as described herein with reference to FIG. 6H). For example, in response to detecting the input, the one or more wearable audio output devices are temporarily placed in a state in which automatic adjustment of audio levels of respective audio (e.g., the device-content audio level of audio corresponding to audio content from the electronic device, the ambient-sound audio level of audio corresponding to ambient sound from the respective physical environment, and/or the audio-cancelling audio level of audio configured to cancel at least a portion of ambient sound from the respective physical environment) is not performed in response to detecting one or more changes in the one or more audio properties of the physical environment (e.g., as described herein with reference to FIGS. 6G-6I). In some embodiments, the wearable audio output device(s) detect multiple changes in the one or more audio properties of the respective physical environment, the multiple changes including a first respective change that is detected within the predefined time period since detecting a user input to initiate a temporary audio output state, and a second respective change that is detected outside of (e.g., before, or after) the predefined time period since detecting a user input to initiate a temporary audio output state.

Allowing a user to initiate a temporary audio output state, in which the levels of different audio components in an audio output are not automatically adjusted in response to changes in the audio properties of the surrounding physical environment, provides the user with additional control over audio output using a single input via the headphones rather than requiring the user to interact with a displayed user interface for adjusting audio settings. Reducing the number of inputs needed to control audio output, and providing additional control options without requiring a display to be powered on enhances the operability of the device and makes the user-device interface more efficient (e.g., by helping the user to achieve an intended outcome and reducing user mistakes when operating/interacting with the device), and, additionally, reduces power usage and improves battery life of the device by enabling the user to use the device more quickly and efficiently.

It should be understood that the particular order in which the operations in FIGS. 8A-8B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 800 described above with respect to FIGS. 8A-8B. For example, the audio outputs, simulated spatial locations, and physical environments described above with reference to method 800 optionally have one or more of the characteristics of the audio outputs, simulated spatial locations, and physical environments described herein with reference to other methods described herein (e.g., method 700). For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer readable storage medium storing one or more programs, the one or more programs comprising instructions that, when executed by an electronic device that includes one or more pose sensors for detecting a pose of a user of the electronic device relative to a first physical environment and that is in communication with one or more audio output devices, cause the electronic device to:
   while a first pose of the user meets first presentation criteria:
      provide audio content at a first simulated spatial location relative to the user;
   detect a change in the pose of the user from the first pose to a second pose; and
   in response to detecting the change in the pose of the user, and in accordance with a determination that the second pose of the user does not meet the first presentation criteria:
      provide audio content at a second simulated spatial location relative to the user that is different from the first simulated spatial location, including moving a simulated spatial location of the audio content relative to the first physical environment.

2. The non-transitory computer readable storage medium of claim 1, wherein the second simulated spatial location is above the user.

3. The non-transitory computer readable storage medium of claim 1, wherein the first pose of the user is one of a lying down pose, a sitting pose, and a standing pose, and the second pose of the user is a different one of a lying down pose, a sitting pose, and a standing pose.

4. The non-transitory computer readable storage medium of claim 1, wherein detecting the change in the pose of the user includes detecting a change in position of the user from the first physical environment to a second physical environment that is different from the first physical environment.

5. The non-transitory computer readable storage medium of claim 1, wherein the one or more programs include instructions that, when executed by the electronic device, cause the electronic device to detect, via one or more microphones, sound in the first physical environment, wherein providing the audio content at the second simulated spatial location includes reducing an output level of the audio content relative to the detected sound in the first physical environment.

6. The non-transitory computer readable storage medium of claim 1, wherein the one or more programs include instructions that, when executed by the electronic device, cause the electronic device to:
determine an event associated with the change in the pose of the user from the first pose to the second pose; and
in response to detecting the change in the pose of the user, and in accordance with the determination that the second pose of the user does not meet the first presentation criteria:
perform an operation to assist the user to respond to the event.

7. The non-transitory computer readable storage medium of claim 1, wherein the one or more programs include instructions that, when executed by the electronic device, cause the electronic device to:
detect a change in the pose of the user from the second pose to a third pose; and
in response to detecting the change in the pose of the user from the second pose to the third pose, and in accordance with a determination that the third pose of the user meets the first presentation criteria:
provide audio content at the first simulated spatial location relative to the user.

8. The non-transitory computer readable storage medium of claim 1, wherein the electronic device includes a display generation component, and the one or more programs include instructions that, when executed by the electronic device, cause the electronic device to:
while the first pose of the user meets the first presentation criteria:
display, via the display generation component, video content corresponding to the audio content; and
in response to detecting the change in the pose of the user, and in accordance with a determination that the second pose of the user does not meet the first presentation criteria:
cease to display at least a portion of the video content.

9. The non-transitory computer readable storage medium of claim 1, wherein the electronic device includes a display generation component, and the one or more programs include instructions that, when executed by the electronic device, cause the electronic device to:
while the first pose of the user meets the first presentation criteria:
display, via the display generation component, a simulated three-dimensional environment that includes one or more virtual objects; and
in response to detecting the change in the pose of the user, and in accordance with a determination that the second pose of the user does not meet the first presentation criteria:
cease to display at least a portion of one or more virtual objects in the simulated three-dimensional environment.

10. The non-transitory computer readable storage medium of claim 9, wherein the one or more programs include instructions that, when executed by the electronic device, cause the electronic device to, in response to detecting the change in the pose of the user, and in accordance with the determination that the second pose of the user does not meet the first presentation criteria:
display, via the display generation component, a representation of at least a portion of the first physical environment.

11. The non-transitory computer readable storage medium of claim 9, wherein the one or more programs include instructions that, when executed by the electronic device, cause the electronic device to, in response to detecting the change in the pose of the user, and in accordance with the determination that the second pose of the user does not meet the first presentation criteria:
change respective positions of one or more virtual objects in the simulated three-dimensional environment.

12. An electronic device, comprising:
one or more pose sensors for detecting a pose of a user of the electronic device relative to a first physical environment, wherein the electronic device is in communication with one or more audio output devices;
one or more processors; and
memory storing one or more programs, wherein the one or more programs are configured to be executed by the one or more processors, the one or more programs including instructions for:
while a first pose of the user meets first presentation criteria:
providing audio content at a first simulated spatial location relative to the user;
detecting a change in the pose of the user from the first pose to a second pose; and
in response to detecting the change in the pose of the user, and in accordance with a determination that the second pose of the user does not meet the first presentation criteria:
providing audio content at a second simulated spatial location relative to the user that is different from the first simulated spatial location, including moving a simulated spatial location of the audio content relative to the first physical environment.

13. The electronic device of claim 12, wherein the second simulated spatial location is above the user.

14. The electronic device of claim 12, wherein the first pose of the user is one of a lying down pose, a sitting pose, and a standing pose, and the second pose of the user is a different one of a lying down pose, a sitting pose, and a standing pose.

15. The electronic device of claim 12, wherein detecting the change in the pose of the user includes detecting a change in position of the user from the first physical environment to a second physical environment that is different from the first physical environment.

16. The electronic device of claim 12, wherein the one or more programs include instructions for detecting, via one or more microphones, sound in the first physical environment, wherein providing the audio content at the second simulated spatial location includes reducing an output level of the audio content relative to the detected sound in first physical environment.

17. The electronic device of claim 12, wherein the one or more programs include instructions for:
determining an event associated with the change in the pose of the user from the first pose to the second pose; and
in response to detecting the change in the pose of the user, and in accordance with the determination that the second pose of the user does not meet the first presentation criteria:
performing an operation to assist the user to respond to the event.

18. The electronic device of claim 12, wherein the one or more programs include instructions for:
detecting a change in the pose of the user from the second pose to a third pose; and
in response to detecting the change in the pose of the user from the second pose to the third pose, and in accordance with a determination that the third pose of the user meets the first presentation criteria:
providing audio content at the first simulated spatial location relative to the user.

19. The electronic device of claim 12, wherein the electronic device includes a display generation component, and the one or more programs include instructions for:
while the first pose of the user meets the first presentation criteria:
displaying, via the display generation component, video content corresponding to the audio content; and
in response to detecting the change in the pose of the user, and in accordance with a determination that the second pose of the user does not meet the first presentation criteria:
ceasing to display at least a portion of the video content.

20. The electronic device of claim 12, wherein the electronic device includes a display generation component, and the one or more programs include instructions for:
while the first pose of the user meets the first presentation criteria:
displaying, via the display generation component, a simulated three-dimensional environment that includes one or more virtual objects; and
in response to detecting the change in the pose of the user, and in accordance with a determination that the second pose of the user does not meet the first presentation criteria:
ceasing to display at least a portion of one or more virtual objects in the simulated three-dimensional environment.

21. The electronic device of claim 20, wherein the one or more programs include instructions for, in response to detecting the change in the pose of the user, and in accordance with the determination that the second pose of the user does not meet the first presentation criteria:
displaying, via the display generation component, a representation of at least a portion of the first physical environment.

22. The electronic device of claim 20, wherein the one or more programs include instructions for, in response to detecting the change in the pose of the user, and in accordance with the determination that the second pose of the user does not meet the first presentation criteria:
changing respective positions of one or more virtual objects in the simulated three-dimensional environment.

23. A method, comprising:
at an electronic device including one or more pose sensors for detecting a pose of a user of the electronic device relative to a first physical environment, wherein the electronic device is in communication with one or more audio output devices:
while a first pose of the user meets first presentation criteria:
providing audio content at a first simulated spatial location relative to the user;
detecting a change in the pose of the user from the first pose to a second pose; and
in response to detecting the change in the pose of the user, and in accordance with a determination that the second pose of the user does not meet the first presentation criteria:
providing audio content at a second simulated spatial location relative to the user that is different from the first simulated spatial location, including moving a simulated spatial location of the audio content relative to the first physical environment.

24. The method of claim 23, wherein the second simulated spatial location is above the user.

25. The method of claim 23, wherein the first pose of the user is one of a lying down pose, a sitting pose, and a standing pose, and the second pose of the user is a different one of a lying down pose, a sitting pose, and a standing pose.

26. The method of claim 23, wherein detecting the change in the pose of the user includes detecting a change in position of the user from the first physical environment to a second physical environment that is different from the first physical environment.

27. The method of claim 23, wherein the method includes detecting, via one or more microphones, sound in the first physical environment, wherein providing the audio content at the second simulated spatial location includes reducing an output level of the audio content relative to the detected sound in the first physical environment.

28. The method of claim 23, wherein the method includes:
determining an event associated with the change in the pose of the user from the first pose to the second pose; and
in response to detecting the change in the pose of the user, and in accordance with the determination that the second pose of the user does not meet the first presentation criteria:
performing an operation to assist the user to respond to the event.

29. The method of claim 23, wherein the method includes:
detecting a change in the pose of the user from the second pose to a third pose; and
in response to detecting the change in the pose of the user from the second pose to the third pose, and in accordance with a determination that the third pose of the user meets the first presentation criteria:
providing audio content at the first simulated spatial location relative to the user.

30. The method of claim 23, wherein the electronic device includes a display generation component, and the method includes:

while the first pose of the user meets the first presentation criteria:

displaying, via the display generation component, video content corresponding to the audio content; and in response to detecting the change in the pose of the user, and in accordance with a determination that the second pose of the user does not meet the first presentation criteria:

ceasing to display at least a portion of the video content.

31. The method of claim 23, wherein the electronic device includes a display generation component, and the method includes:

while the first pose of the user meets the first presentation criteria:

displaying, via the display generation component, a simulated three-dimensional environment that includes one or more virtual objects; and in response to detecting the change in the pose of the user, and in accordance with a determination that the second pose of the user does not meet the first presentation criteria:

ceasing to display at least a portion of one or more virtual objects in the simulated three-dimensional environment.

32. The method of claim 31, wherein the method includes, in response to detecting the change in the pose of the user, and in accordance with the determination that the second pose of the user does not meet the first presentation criteria:

displaying, via the display generation component, a representation of at least a portion of the first physical environment.

33. The method of claim 31, wherein the method includes, in response to detecting the change in the pose of the user, and in accordance with the determination that the second pose of the user does not meet the first presentation criteria:

changing respective positions of one or more virtual objects in the simulated three-dimensional environment.

\* \* \* \* \*